US012681801B2

(12) United States Patent
Noda et al.

(10) Patent No.: US 12,681,801 B2
(45) Date of Patent: Jul. 14, 2026

(54) MEMORY SYSTEM

(71) Applicant: Kioxia Corporation, Tokyo (JP)

(72) Inventors: Yuko Noda, Kawasaki Kanagawa (JP);
Kiwamu Watanabe, Kawasaki
Kanagawa (JP); Masahiro Saito, Tokyo
(JP); Yoshiki Takai, Fujisawa
Kanagawa (JP)

(73) Assignee: Kioxia Corporation, Tokyo (JP)

( * ) Notice: Subject to any disclaimer, the term of this
patent is extended or adjusted under 35
U.S.C. 154(b) by 16 days.

(21) Appl. No.: 18/584,508

(22) Filed: Feb. 22, 2024

(65) Prior Publication Data

US 2024/0311232 A1     Sep. 19, 2024

(30) Foreign Application Priority Data

Mar. 14, 2023     (JP) ................................. 2023-039246

(51) Int. Cl.
*G06F 11/10*          (2006.01)
*G06F 11/07*          (2006.01)
(52) U.S. Cl.
CPC ........ *G06F 11/1016* (2013.01); *G06F 11/076*
(2013.01); *G06F 11/1068* (2013.01)
(58) Field of Classification Search
CPC .............. G06F 11/1016; G06F 11/076; G06F
11/1068; G11C 16/34; G11C 16/04;
G11C 16/26
See application file for complete search history.

(56) References Cited

U.S. PATENT DOCUMENTS

| | | | | |
|---|---|---|---|---|
| 7,701,768 B2 * | 4/2010 | Hwang | ............... | G11C 11/5628 |
| | | | | 365/185.17 |
| 7,796,440 B2 * | 9/2010 | Lee | .................... | G11C 16/0483 |
| | | | | 365/185.12 |
| 9,025,376 B2 * | 5/2015 | Ryu | ........................ | G11C 16/04 |
| | | | | 365/230.02 |
| 9,159,412 B1 * | 10/2015 | Hung | ................. | G11C 13/0004 |
| 9,225,356 B2 * | 12/2015 | Mu | ..................... | G11C 13/0064 |
| 9,645,765 B2 * | 5/2017 | Vanaraj | ................. | G06F 3/0619 |
| 9,941,015 B2 * | 4/2018 | Abe | ......................... | G11C 16/32 |

(Continued)

FOREIGN PATENT DOCUMENTS

| | | | | | |
|---|---|---|---|---|---|
| CN | 106910520 A | * | 6/2017 | ............. | G11C 16/10 |
| JP | 2020-030881 A | | 2/2020 | | |
| JP | 2021-047970 A | | 3/2021 | | |

*Primary Examiner* — Albert Decady
*Assistant Examiner* — Grace V Braden
(74) *Attorney, Agent, or Firm* — Kim & Stewart LLP

(57) ABSTRACT

A memory system includes a nonvolatile memory including
a memory cell, and a controller. The controller is configured
to write multi-bit data into the memory cell through a first
write operation of writing a first part, and not a second part,
of the multi-bit data and then a second write operation of
writing the first and second parts. The controller is config-
ured to, during writing of the multi-bit data, determine an
amount of time that has passed since the first write opera-
tion, perform the second write operation in a first manner by
inputting the second part, and not the first part, from the
controller, when the determined amount is less than a
threshold amount, and perform the second write operation in
a second manner by inputting the first and second parts from
the controller, when the determined amount is greater than
the threshold amount.

20 Claims, 46 Drawing Sheets

10

(56) References Cited

U.S. PATENT DOCUMENTS

| | | | | |
|---|---|---|---|---|
| 10,698,610 B2 * | 6/2020 | Yang | ................... | G11C 11/5628 |
| 10,929,292 B2 * | 2/2021 | Li | ...................... | G06F 12/0815 |
| 11,093,384 B2 * | 8/2021 | Moon | ................ | G06F 12/0246 |
| 12,050,808 B2 * | 7/2024 | Shen | .................... | G06F 3/0619 |
| 2014/0254262 A1 * | 9/2014 | Chen | ................. | G11C 16/3427 |
| | | | | 365/185.12 |
| 2015/0262674 A1 * | 9/2015 | Shirakawa | ............. | G11C 16/08 |
| | | | | 365/185.12 |
| 2015/0262679 A1 * | 9/2015 | Shimura | ........... | G11C 16/3459 |
| | | | | 365/185.22 |
| 2016/0313917 A1 * | 10/2016 | Xu | ...................... | G06F 11/3485 |
| 2019/0050285 A1 * | 2/2019 | Lin | .................... | G06F 11/1048 |
| 2020/0286568 A1 * | 9/2020 | Sheperek | ........... | G11C 11/5628 |
| 2021/0064285 A1 | 3/2021 | Ji | | |
| 2021/0082497 A1 | 3/2021 | Hara et al. | | |
| 2021/0295909 A1 | 9/2021 | Shirakawa et al. | | |
| 2021/0406122 A1 | 12/2021 | Sharon | | |
| 2022/0215873 A1 | 7/2022 | Islam et al. | | |
| 2022/0342585 A1 | 10/2022 | Sharma et al. | | |
| 2023/0420051 A1 * | 12/2023 | Cai | ........................ | G11C 16/10 |

* cited by examiner

FIG. 9
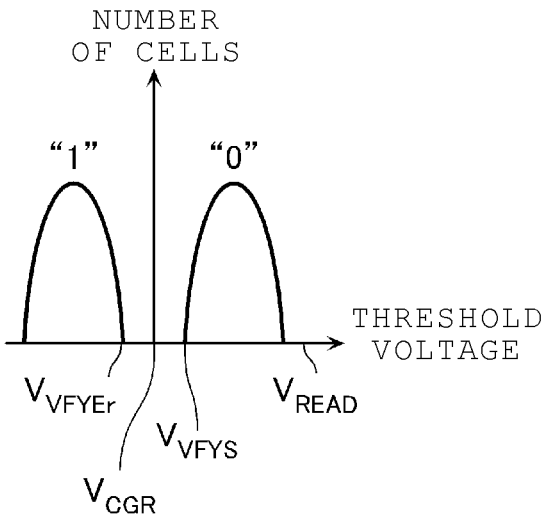
FIG. 10A
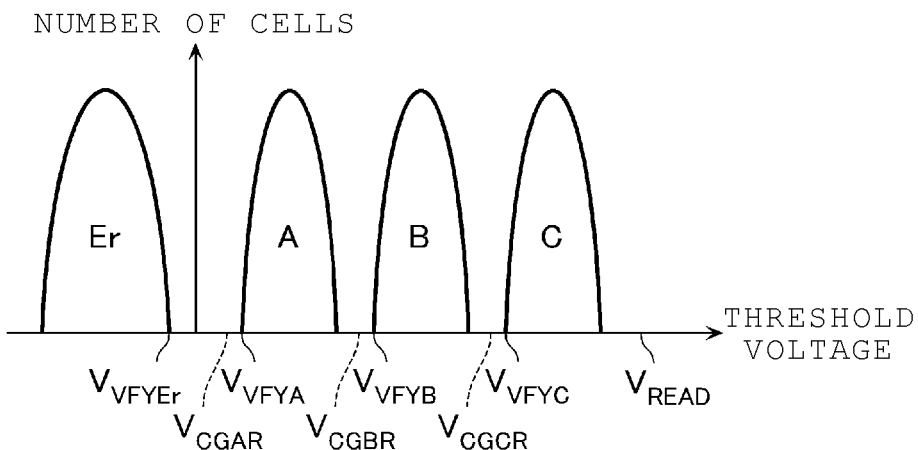
FIG. 10B
|  | Er | A | B | C |
|---|---|---|---|---|
| Middle | 1 | 0 | 0 | 1 |
| Lower | 1 | 1 | 0 | 0 |

| | Er | S1 | S2 | S3 | S4 | S5 | S6 | S7 | S8 | S9 | S10 | S11 | S12 | S13 | S14 | S15 |
|---|---|---|---|---|---|---|---|---|---|---|---|---|---|---|---|---|
| Top | 1 | 0 | 0 | 1 | 1 | 1 | 1 | 0 | 0 | 0 | 0 | 1 | 1 | 1 | 0 | 0 |
| Upper | 1 | 1 | 0 | 0 | 0 | 1 | 1 | 1 | 1 | 0 | 0 | 0 | 0 | 1 | 1 | 0 |
| Middle | 1 | 1 | 1 | 1 | 0 | 0 | 0 | 0 | 0 | 0 | 0 | 0 | 1 | 1 | 1 | 1 |
| Lower | 1 | 1 | 1 | 1 | 1 | 1 | 0 | 0 | 1 | 1 | 0 | 0 | 0 | 0 | 0 | 0 |

FIG. 14

```
┌─────────────────────────────────────────┐
│                   MD                      │
│  ┌───────────────────────────────────┐   │
│  │                MCA                 │   │
│  │  ┌─────────────────────────────┐  │   │
│  │  │             BLK             │  │   │
│  │  │  ┌───────────────────────┐  │  │   │
│  │  │  │          PGP          │  │  │   │
│  │  │  │  ┌─────────────────┐  │  │  │   │
│  │  │  │  │    PG(DAT0)      │  │  │  │   │
│  │  │  │  └─────────────────┘  │  │  │   │
│  │  │  │  ┌─────────────────┐  │  │  │   │
│  │  │  │  │     PG(−)        │  │  │  │   │
│  │  │  │  └─────────────────┘  │  │  │   │
│  │  │  │          ⋮            │  │  │   │
│  │  │  │  ┌─────────────────┐  │  │  │   │
│  │  │  │  │     PG(−)        │  │  │  │   │
│  │  │  │  └─────────────────┘  │  │  │   │
│  │  │  └───────────────────────┘  │  │   │
│  │  │  ┌───────────────────────┐  │  │   │
│  │  │  │          PGP          │  │  │   │
│  │  │  └───────────────────────┘  │  │   │
│  │  │          ⋮                  │  │   │
│  │  │  ┌───────────────────────┐  │  │   │
│  │  │  │          PGP          │  │  │   │
│  │  │  └───────────────────────┘  │  │   │
│  │  └─────────────────────────────┘  │   │
│  │  ┌─────────────────────────────┐  │   │
│  │  │             BLK             │  │   │
│  │  └─────────────────────────────┘  │   │
│  │  ┌─────────────────────────────┐  │   │
│  │  │             BLK             │  │   │
│  │  └─────────────────────────────┘  │   │
│  │          ⋮                        │   │
│  │  ┌─────────────────────────────┐  │   │
│  │  │             BLK             │  │   │
│  │  └─────────────────────────────┘  │   │
│  └───────────────────────────────────┘   │
│  ┌───────────────────────────────────┐   │
│  │                PC                  │   │
│  │  ┌─────────────────────────────┐  │   │
│  │  │             SAM             │  │   │
│  │  │  ┌───────────────────────┐  │  │   │
│  │  │  │         SDLP          │  │  │   │
│  │  │  └───────────────────────┘  │  │   │
│  │  │  ┌───────────────────────┐  │  │   │
│  │  │  │      DL0P(DAT0)       │  │  │   │
│  │  │  └───────────────────────┘  │  │   │
│  │  │  ┌───────────────────────┐  │  │   │
│  │  │  │       DL1P(−)         │  │  │   │
│  │  │  └───────────────────────┘  │  │   │
│  │  │          ⋮                  │  │   │
│  │  │  ┌───────────────────────┐  │  │   │
│  │  │  │       DLnP(−)         │  │  │   │
│  │  │  └───────────────────────┘  │  │   │
│  │  └─────────────────────────────┘  │   │
│  └───────────────────────────────────┘   │
└─────────────────────────────────────────┘
```

| MD |
| --- |

| MCA |
| --- |

| BLK |
| --- |

| PGP |
| --- |

| PG(−) |
| --- |

| PG(−) |
| --- |

⋮

| PG(−) |
| --- |

| PGP |
| --- |

⋮

| PGP |
| --- |

| BLK |
| --- |

| BLK |
| --- |

⋮

| BLK |
| --- |

| PC |
| --- |

| SAM |
| --- |

| SDLP(DAT6) |
| --- |

| DL0P(DAT4) |
| --- |

| DL1P(DAT5) |
| --- |

⋮

| DLnP(−) |
| --- |

Figure 28:
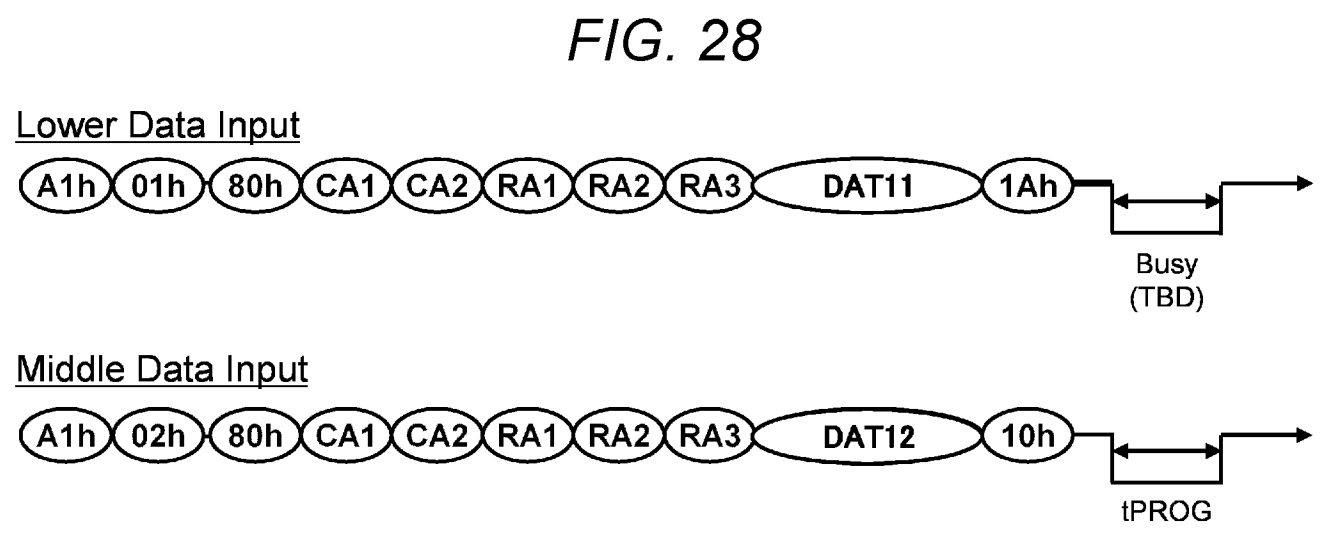

Lower Data Input

A1h — 01h — 80h — CA1 — CA2 — RA1 — RA2 — RA3 — DAT11 — 1Ah

Busy (TBD)

Middle Data Input

A1h — 02h — 80h — CA1 — CA2 — RA1 — RA2 — RA3 — DAT12 — 10h tPROG

Figure 36:
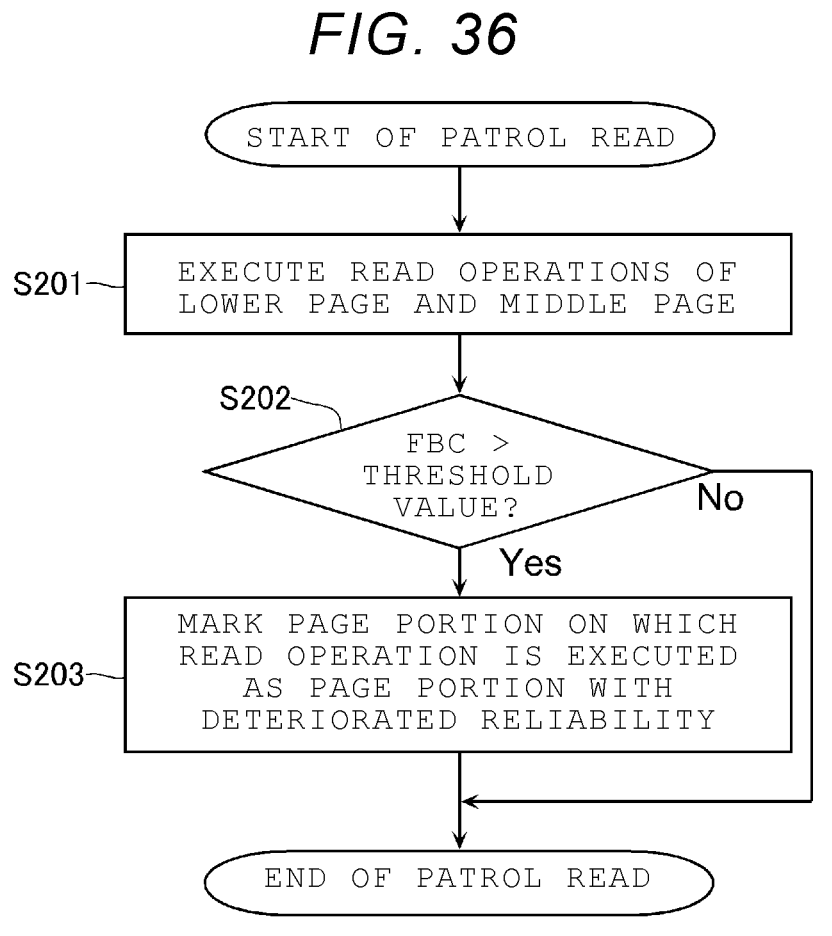

START OF PATROL READ

S201 — EXECUTE READ OPERATIONS OF LOWER PAGE AND MIDDLE PAGE

S202 — FBC > THRESHOLD VALUE?

No

Yes

S203 — MARK PAGE PORTION ON WHICH READ OPERATION IS EXECUTED AS PAGE PORTION WITH DETERIORATED RELIABILITY

END OF PATROL READ

Figure 42:
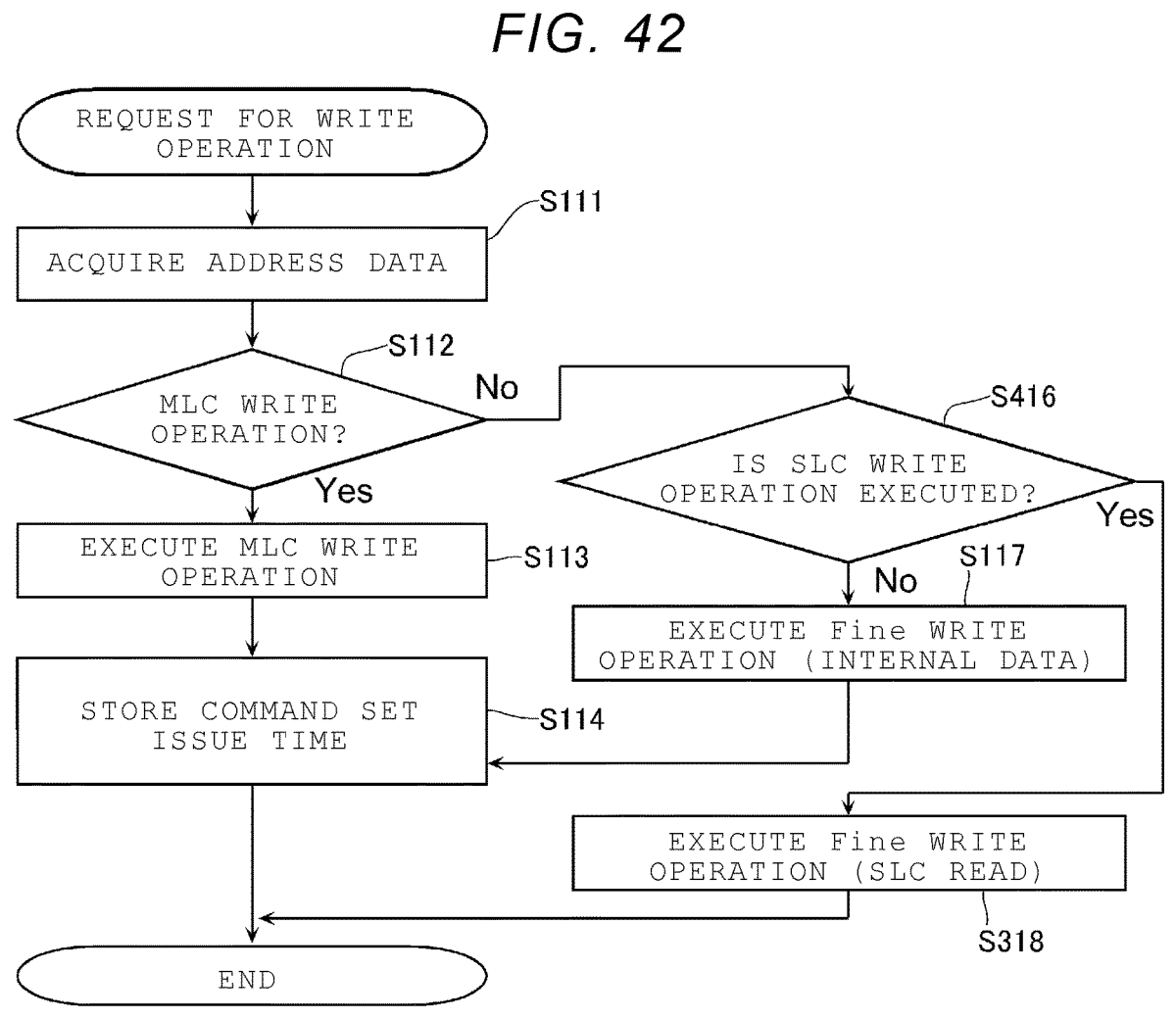

REQUEST FOR WRITE
OPERATION

↓

ACQUIRE ADDRESS DATA —S111

↓

MLC WRITE OPERATION? —S112 — No → IS SLC WRITE OPERATION EXECUTED? —S416

— Yes →

Yes ↓ (MLC) — No ↓ —S117

EXECUTE MLC WRITE OPERATION —S113

EXECUTE Fine WRITE OPERATION (INTERNAL DATA)

↓

STORE COMMAND SET ISSUE TIME —S114

EXECUTE Fine WRITE OPERATION (SLC READ)

S318

↓

END

FIG. 44

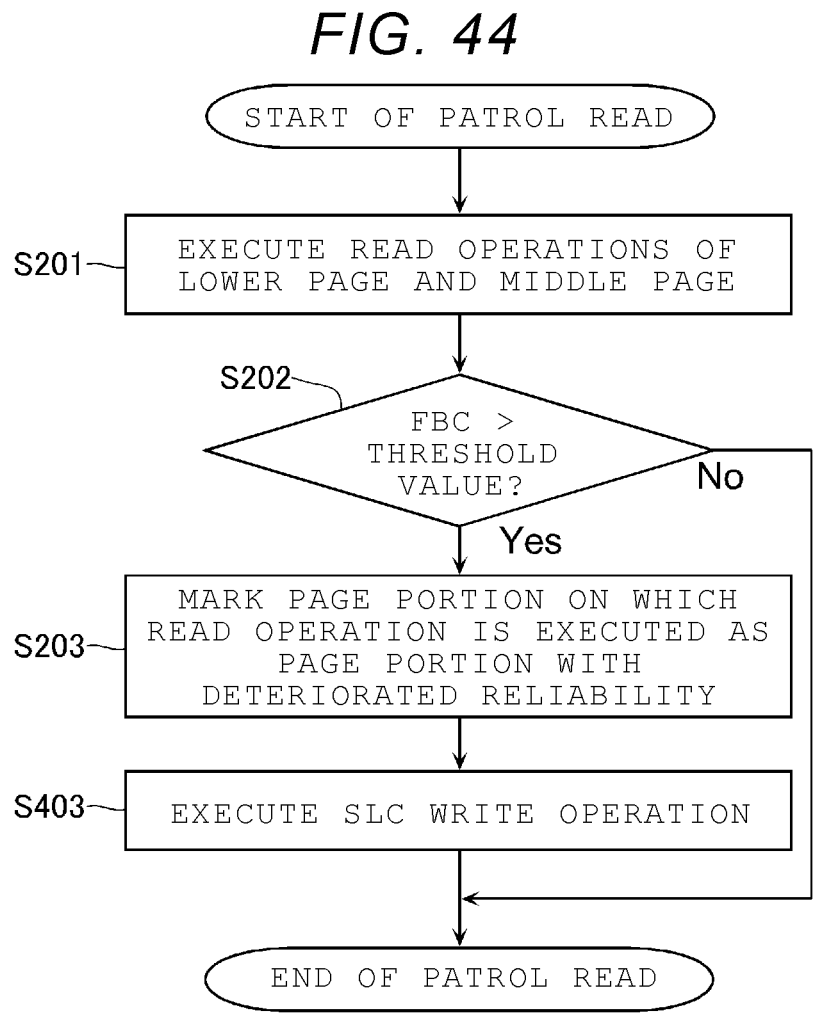

```
        ( START OF PATROL READ )
                   │
                   ▼
S201 ─┐ ┌─────────────────────────────┐
      └─│ EXECUTE READ OPERATIONS OF  │
        │ LOWER PAGE AND MIDDLE PAGE  │
        └─────────────────────────────┘
                   │
                   ▼
S202 ─┐         ╱         ╲
      └──────╱   FBC >      ╲
            ╲  THRESHOLD    ╱────── No ──┐
             ╲  VALUE?    ╱              │
               ╲       ╱                 │
                   │                     │
                  Yes                    │
                   ▼                     │
S203 ─┐ ┌─────────────────────────────┐ │
      └─│ MARK PAGE PORTION ON WHICH  │ │
        │ READ OPERATION IS EXECUTED AS│ │
        │    PAGE PORTION WITH        │ │
        │ DETERIORATED RELIABILITY    │ │
        └─────────────────────────────┘ │
                   │                     │
                   ▼                     │
S403 ─┐ ┌─────────────────────────────┐ │
      └─│ EXECUTE SLC WRITE OPERATION │ │
        └─────────────────────────────┘ │
                   │                     │
                   ▼◄────────────────────┘
        ( END OF PATROL READ )
```

FIG. 45

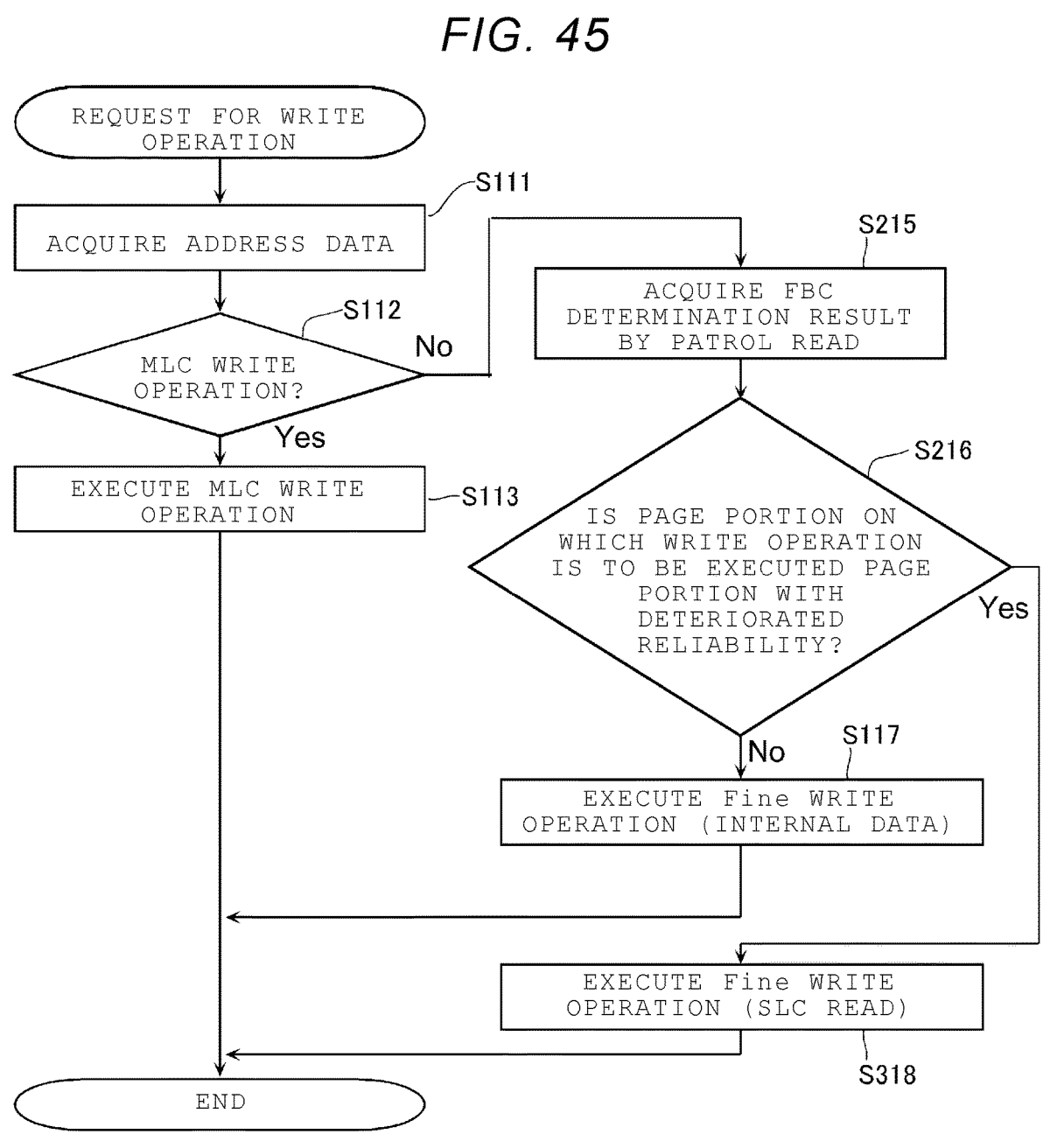

REQUEST FOR WRITE OPERATION

ACQUIRE ADDRESS DATA — S111

MLC WRITE OPERATION? — S112

No

ACQUIRE FBC DETERMINATION RESULT BY PATROL READ — S215

IS PAGE PORTION ON WHICH WRITE OPERATION IS TO BE EXECUTED PAGE PORTION WITH DETERIORATED RELIABILITY? — S216

Yes

Yes

EXECUTE MLC WRITE OPERATION — S113

No

EXECUTE Fine WRITE OPERATION (INTERNAL DATA) — S117

EXECUTE Fine WRITE OPERATION (SLC READ) — S318

END

MEMORY SYSTEM

CROSS-REFERENCE TO RELATED APPLICATION

This application is based upon and claims the benefit of priority from Japanese Patent Application No. 2023-039246, filed Mar. 14, 2023, the entire contents of which are incorporated herein by reference.

FIELD

Embodiments described herein relate generally to a memory system.

BACKGROUND

A memory system that includes a nonvolatile memory and a controller connected to the nonvolatile memory and connectable to a host device is known.

BRIEF DESCRIPTION OF THE DRAWINGS

FIG. 1 is a schematic block diagram showing a configuration of a memory system according to a first embodiment.

FIG. 2 is a schematic block diagram showing a configuration of a part of a memory die MD.

FIG. 9 is a schematic histogram illustrating a threshold voltage of a memory cell MC in which 1 bit of data is stored.

FIGS. 10A and 10B are schematic diagrams illustrating a threshold voltage of a memory cell MC in which 2 bits of data is stored.

FIG. 14 is a schematic block diagram illustrating data processing executed during the read operation.

FIG. 15 is a schematic block diagram illustrating data processing executed during the read operation.

FIG. 16 is a timing chart illustrating a data output operation.

FIG. 19 is a schematic block diagram illustrating data processing executed during a program operation.

FIG. 20 is a schematic block diagram illustrating data processing executed during the program operation.

FIG. 22 is a schematic cross-sectional view diagram illustrating a verification operation.

FIG. 23 is a schematic cross-sectional view diagram illustrating an execution order of the write operations.

FIG. 25 is a schematic cross-sectional view diagram illustrating another execution order of the write operations.

FIG. 28 is a timing chart illustrating the data processing in FIG. 27.

FIG. 34 is a timing chart illustrating the data processing in FIG. 33.

FIG. 36 is a schematic flowchart illustrating an operation of a controller CD according to a second embodiment.

FIG. 41 is a timing chart illustrating the data processing in FIG. 40.

FIG. 42 is a schematic flowchart illustrating an operation of a controller CD according to a fourth embodiment.

FIG. 44 is a schematic flowchart illustrating an operation of a controller CD according to a fifth embodiment.

FIG. 45 is another schematic flowchart illustrating the operation of the controller CD according to the fifth embodiment.

DETAILED DESCRIPTION

Figure 3:
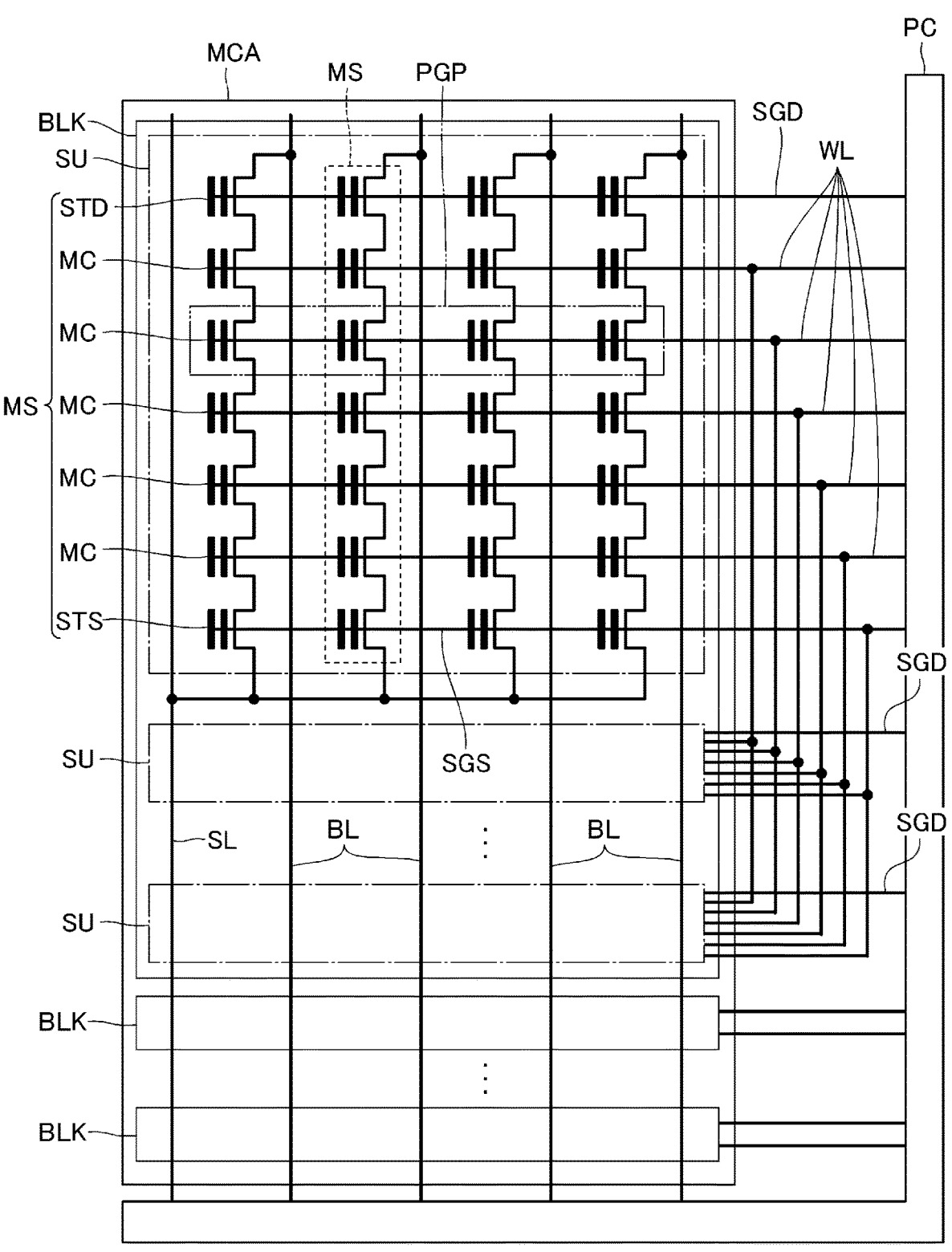
FIG. 3 is a schematic circuit diagram showing a configuration of a part of a memory cell array MCA.

Embodiments provide a memory system that reduces the time required to write data while preventing deterioration in reliability.

In general, according to an embodiment, a memory system includes a nonvolatile memory including a memory cell, and a controller. The controller is configured to write multibit data into the memory cell through a first write operation of writing a first part of the multi-bit data and not a second part of the multi-bit data and then a second write operation of writing the first and second parts of the multi-bit data. The controller is configured to, during writing of the multi-bit data, determine an amount of time that has passed since the first write operation, perform the second write operation in a first manner when the determined amount of time is less than a threshold amount, and perform the second write operation in a second manner when the determined amount of time is greater than the threshold amount. In the second write operation in the first manner, the controller inputs the second part of the multi-bit data, and not the first part, into the nonvolatile memory, and causes the nonvolatile memory to read the first part of the multi-bit data from the memory cell and write the read first part of the multi-bit data and the input second part of the multi-bit data into the memory cell. In the second write operation in the second manner, the controller inputs the first and second parts of the multi-bit data into the nonvolatile memory, and causes the nonvolatile memory to write the input first and second parts of the multi-bit data into the memory cell.

Next, memory systems according to embodiments will be described in detail with reference to the drawings. The following embodiments are merely examples, and are not intended to limit the present disclosure. Further, the following drawings are schematic, and some configurations may be omitted for convenience of description. Further, common elements in a plurality of embodiments are denoted by the same reference numerals, and the description thereof may be omitted.

In this specification, when it is described that a first configuration is "electrically connected" to a second configuration, the first configuration may be directly connected to the second configuration, or the first configuration may be connected to the second configuration via a wiring, a semiconductor member, a transistor, or the like. For example, when three transistors are connected in series, the first transistor is "electrically connected" to the third transistor even if the second transistor is in an OFF state.

In this specification, when it is described that a first configuration is "connected between" a second configuration and a third configuration, it may mean that the first configuration, the second configuration, and the third configuration are connected in series, and the second configuration is connected to the third configuration via the first configuration.

In this specification, when it is described that a circuit or the like "makes" two wirings and the like "into conductive with each other", it may mean, for example, that this circuit or the like includes a transistor or the like, this transistor or the like is provided on a current path between the two wirings, and this transistor or the like is in an ON state.

Further, in this specification, when it is described that a predetermined direction parallel to an upper surface of a substrate is referred to as an X-direction, a direction parallel to the upper surface of the substrate and perpendicular to the X-direction is referred to as a Y-direction, and a direction perpendicular to the upper surface of the substrate is referred to as a Z-direction.

In this specification, when it is described that a direction along a predetermined surface may be referred to as a first direction, a direction along this predetermined surface and intersecting the first direction may be referred to as a second direction, and a direction intersecting this predetermined surface may be referred to as a third direction. The first direction, the second direction, and the third direction may or may not correspond to any one of the X-direction, the Y-direction, and the Z-direction.

Furthermore, in this specification, expressions such as "upper" and "lower" are based on the substrate. For example, a direction away from the substrate along the Z-direction is referred to as the upper, and a direction toward the substrate along the Z-direction is referred to as the lower. When referring to a lower surface or a lower end of a certain configuration, it means a surface or an end portion of this configuration on the substrate side, and when referring to an upper surface or an upper end of a certain configuration, it means a surface or an end portion of this configuration on the side opposite to the substrate. A surface that intersects the X-direction or the Y-direction is referred to as a side surface or the like.

First Embodiment

Memory System 10

Figure 1:
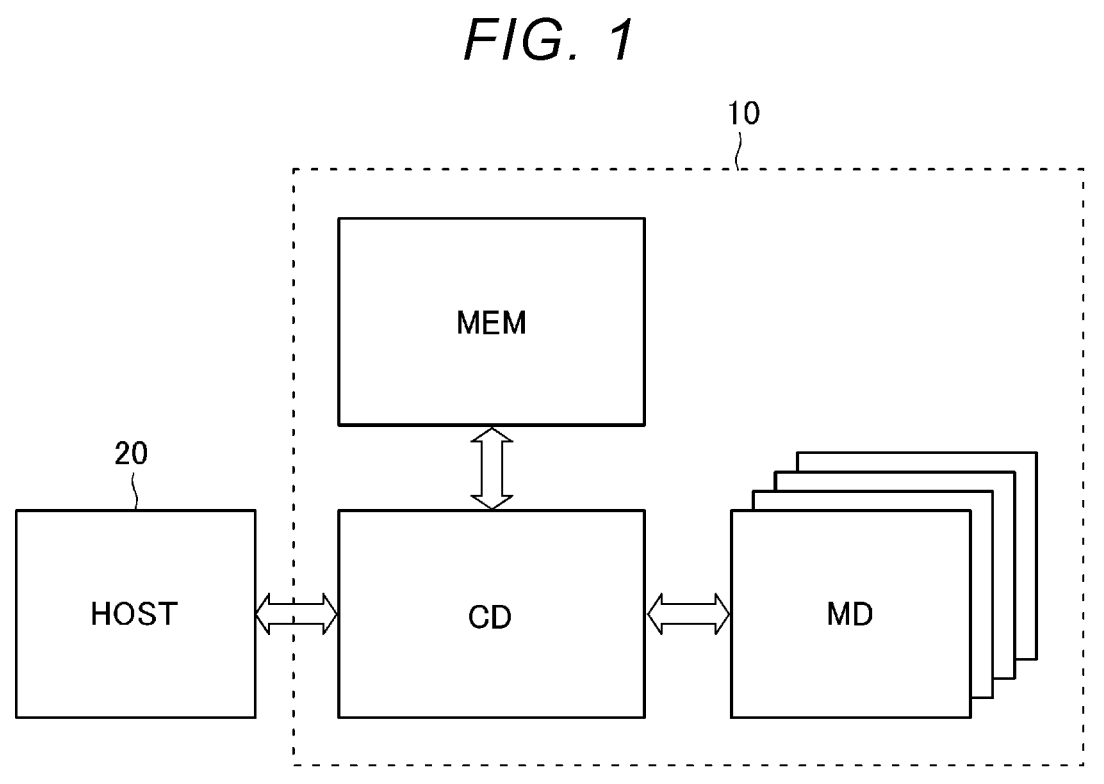

FIG. 1 is a schematic block diagram showing a configuration of a memory system 10 according to a first embodiment.

The memory system 10 performs a read operation, a write operation, an erase operation, and the like of user data in accordance with a signal transmitted from a host computer 20 (may be referred to as a host device). The memory system 10 is, for example, a memory chip, a memory card, an SSD, or any other system capable of storing the user data. The memory system 10 includes a plurality of memory dies MD (may be referred to as nonvolatile memories), a controller CD, and a storage device MEM. The memory die MD stores the user data. The controller CD also stores data in the memory die MD by background processing, regardless of the signal from the host device.

The controller CD is connected to the plurality of memory dies MD, the storage device MEM, and the host computer 20. The controller CD includes, for example, a processor, and a RAM. The storage device MEM is a memory such as a dynamic random access memory (DRAM), and stores data or the like used to control the plurality of memory dies MD.

Hereinafter, configurations of the memory die MD and the controller CD will be described in order.

Memory Die MD

Figure 2:
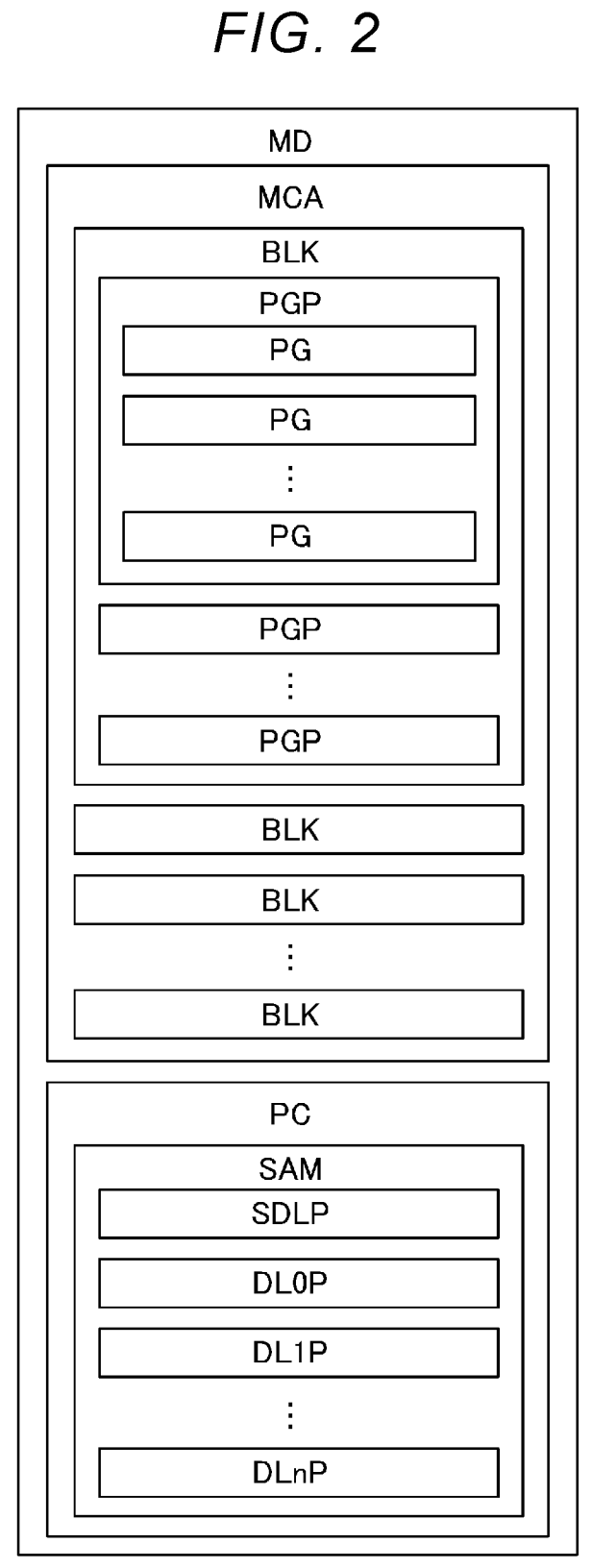

FIG. 2 is a schematic block diagram showing a configuration of a part of the memory die MD.

The memory die MD includes a memory cell array MCA and a peripheral circuit PC.

The memory cell array MCA includes a plurality of memory blocks BLK. Each of the plurality of memory blocks BLK includes a plurality of page portions PGP. Each of the plurality of page portions PGP includes a plurality of pages PG. Each page PG is an execution unit of the read operation and the write operation. The memory block BLK is an execution unit of the erase operation.

The peripheral circuit PC includes a sense amplifier module SAM. The sense amplifier module SAM includes a plurality of latch portions SDLP, DL0P, DL1P, . . . , DLnP (n is an integer of 4 or more). Each of the plurality of latch portions SDLP, DL0P, DL1P, . . . , DLnP can store an amount of data corresponding to one page PG. Each of the plurality of latch portions SDLP, DL0P, DL1P, . . . , DLnP stores data read by the read operation, data written by the write operation, or the like.

Hereinafter, more detailed configurations of the memory cell array MCA and the peripheral circuit PC will be described in order.

Memory Cell Array MCA

FIG. 3 is a schematic circuit diagram showing a configuration of a part of the memory cell array MCA.

Each of the plurality of memory blocks BLK in the memory cell array MCA includes a plurality of string units SU. Each of the plurality of string units SU includes a plurality of memory strings MS. One end of each of the plurality of memory strings MS is connected to the peripheral circuit PC via a bit line BL. Further, the other end of each of the plurality of memory strings MS is connected to the peripheral circuit PC via a common source line SL.

The memory string MS includes a drain-side select transistor STD, a plurality of memory cells MC (memory transistors), and a source-side select transistor STS. The drain-side select transistor STD, the plurality of memory cells MC, and the source-side select transistor STS are connected in series between the bit line BL and the source line SL. Hereinafter, the drain-side select transistor STD and the source-side select transistor STS may be simply referred to as select transistors STD and STS.

The memory cell MC is a field effect transistor. The memory cell MC includes a semiconductor layer, a gate insulating film, and a gate electrode. The semiconductor layer functions as a channel region. The gate insulating film includes a charge storage film. A threshold voltage of the memory cell MC changes depending on an amount of charge in the charge storage film. The memory cell MC stores data as the magnitude of the threshold voltage.

Word lines WL are respectively connected to the gate electrodes of the plurality of memory cells MC corresponding to one memory string MS. Each of these word lines WL is commonly connected to all memory strings MS in one memory block BLK. The plurality of memory cells MC connected to one word line WL in one string unit configure one page portion PGP (see FIG. 2).

The memory cell MC stores one bit or multiple bits of data. When one memory cell MC stores 1 bit of data, one page portion PGP stores data corresponding to one page PG (see FIG. 2). When one memory cell MC stores 2 bits of data, one page portion PGP stores data corresponding to two pages PG (see FIG. 2). Similarly, when one memory cell MC stores n (n is a positive integer) bits of data, one page portion PGP stores data corresponding to n pages PG (see FIG. 2).

Each of the select transistors STD and STS is a field effect transistor. Each of the select transistors STD and STS includes a semiconductor layer, a gate insulating film, and a gate electrode. The semiconductor layer functions as a channel region.

Select gate lines SGD and SGS are connected to the gate electrodes of the select transistors STD and STS, respectively. One drain-side select gate line SGD is commonly connected to all memory strings MS in one string unit SU. One source-side select gate line SGS is commonly connected to all memory strings MS in one memory block BLK.

Figure 4:
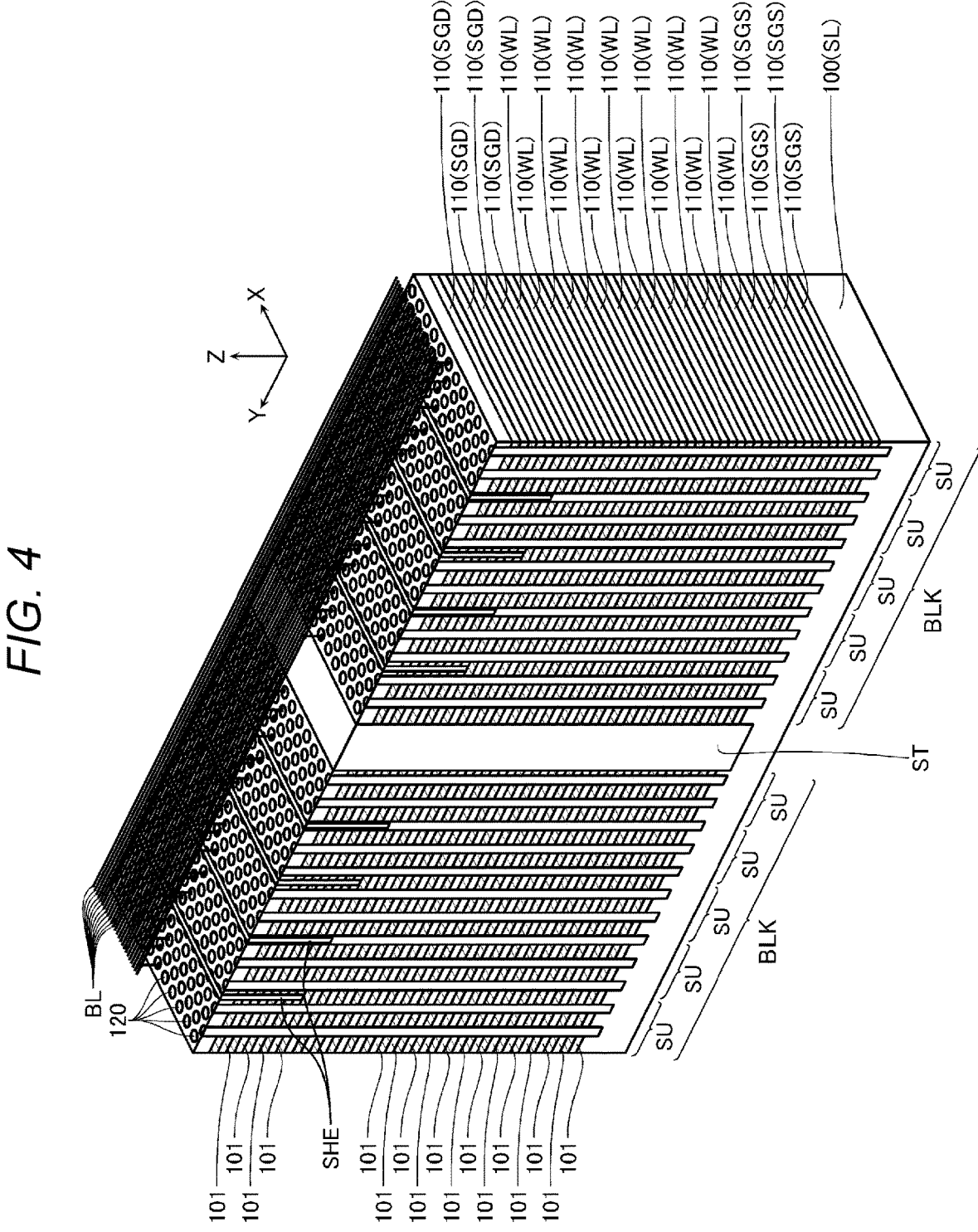
FIG. 4 is a schematic perspective view diagram showing a configuration of a part of the memory cell array MCA.
Figure 5:
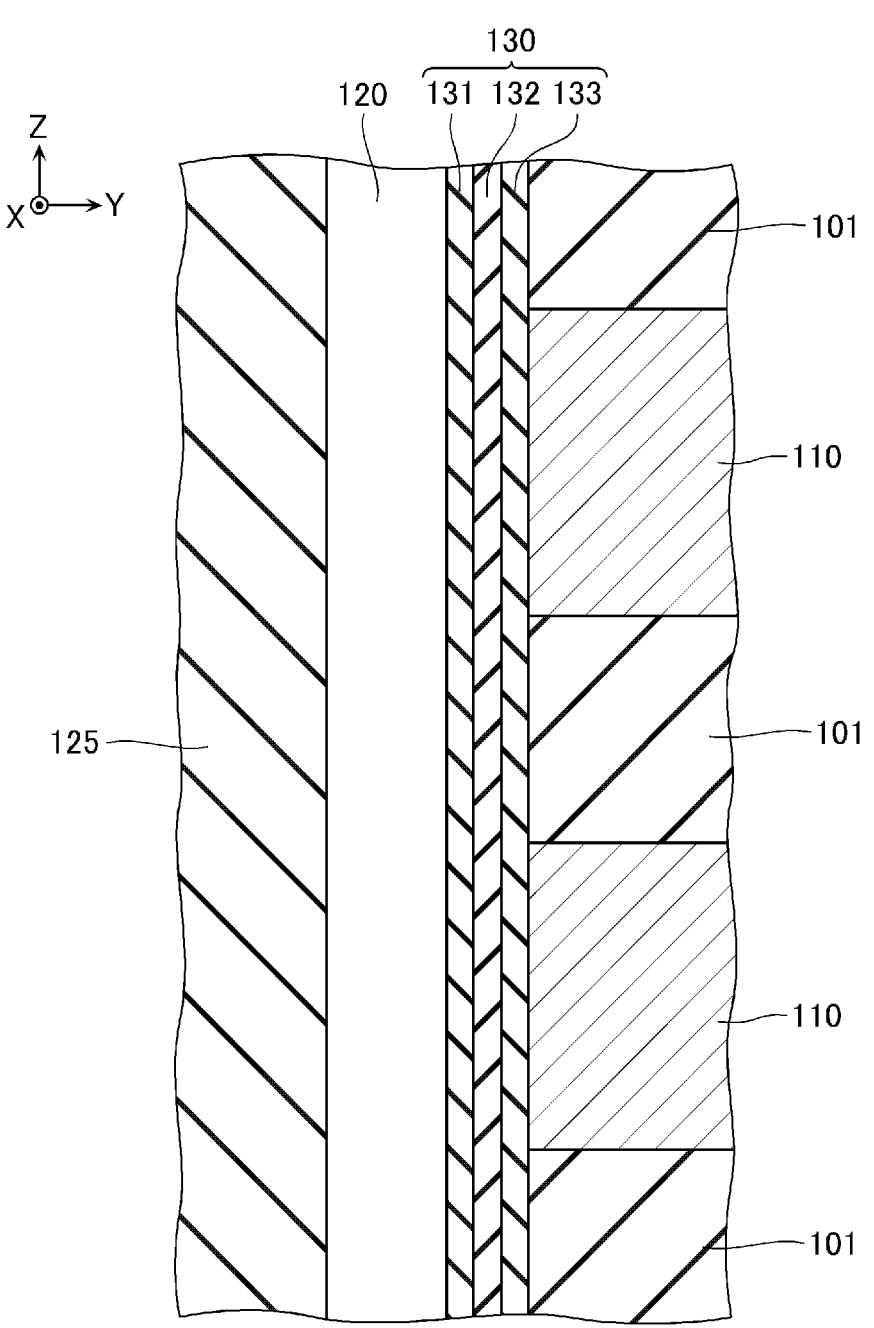
FIG. 5 is a schematic cross-sectional view diagram showing a configuration of a part of the memory cell array MCA.

FIG. 4 is a schematic perspective view diagram showing a configuration of a part of the memory cell array MCA. FIG. 5 is a schematic cross-sectional view diagram showing a configuration of a part of the memory cell array MCA.

As shown in FIG. 4, the plurality of memory blocks BLK in the memory cell array MCA are arranged in the Y-direction. The plurality of string units SU in the memory block BLK are arranged in the Y-direction. An inter-block insulating layer ST made of silicon oxide (SiO$_2$) or the like is provided between two memory blocks BLK adjacent to each other in the Y-direction. An inter-string unit insulating layer SHE made of silicon oxide (SiO$_2$) or the like is provided between two string units SU adjacent to each other in the Y-direction.

The memory block BLK includes a plurality of conductive layers 110 arranged in the Z-direction and a plurality of semiconductor pillars 120 extending in the Z-direction. Further, as shown in FIG. 5, gate insulating films 130 are provided between the plurality of conductive layers 110 and the plurality of semiconductor pillars 120, respectively.

As shown in FIG. 4, each conductive layer 110 has a substantially plate-like shape extending in the X-direction. The conductive layer 110 may include, for example, a stacked film of a barrier conductive film made of titanium nitride (TiN) or the like and a metal film made of tungsten (W) or the like. The conductive layer 110 may include, for example, polycrystalline silicon containing impurities such as phosphorus (P) or boron (B). Insulating layers 101 made of silicon oxide (SiO$_2$) or the like are respectively provided between the plurality of conductive layers 110 arranged in the Z-direction.

A part of the plurality of conductive layers 110 functions as the word line WL (see FIG. 3) and the gate electrodes of the plurality of memory cells MC (see FIG. 3) connected thereto. In the following description, this conductive layer 110 may be referred to as a conductive layer 110 (WL). Each of a plurality of the conductive layers 110 (WL) is electrically independent for each memory block BLK.

One or the plurality of conductive layers 110 located below the plurality of conductive layers 110 (WL) function as the source-side select gate line SGS (see FIG. 3) and gate electrodes of a plurality of the source-side select transistors STS (see FIG. 3) connected thereto. In the following description, this conductive layer 110 may be referred to as a conductive layer 110 (SGS). One or a plurality of the conductive layers 110 (SGS) are electrically independent for each memory block BLK.

One or the plurality of conductive layers 110 located above the plurality of conductive layers 110 (WL) function as the drain-side select gate line SGD (see FIG. 3) and gate electrodes of a plurality of the drain-side select transistors STD (see FIG. 3) connected thereto. In the following description, this conductive layer 110 may be referred to as a conductive layer 110 (SGD). The widths of the plurality of conductive layers 110 (SGD) in the Y-direction are smaller than the widths of the conductive layers 110 (WL) in the Y-direction. The inter-string unit insulating layer SHE is provided between two conductive layers 110 (SGD) adjacent to each other in the Y-direction in one memory block BLK. Each of the plurality of conductive layers 110 (SGD) is electrically independent for each string unit SU.

A conductive layer 100 is provided below the plurality of conductive layers 110. The conductive layer 100 is connected to a lower end of the semiconductor pillar 120. The semiconductor pillar 120 may include, for example, polycrystalline silicon containing N-type impurities such as phosphorus (P), or may include, for example, a metal such as tungsten (W), a conductive layer made of tungsten silicide, or other conductive layers. Further, the insulating layer 101 made of silicon oxide (SiO$_2$) or the like is provided between the conductive layer 100 and the conductive layer 110.

The conductive layer 100 functions as the source line SL (see FIG. 3). For example, the source line SL is provided in common for all memory blocks BLK in the memory cell array MCA.

The semiconductor pillars 120 are arranged in a predetermined pattern in the X-direction and the Y-direction. The semiconductor pillars 120 function as channel regions of the plurality of memory cells MC and the select transistors STD and STS in one memory string MS (see FIG. 3). The semiconductor pillar 120 contains, for example, polycrystalline silicon (Si). The semiconductor pillar 120 has a substantially bottomed cylindrical shape, and as shown in FIG. 5, for example, an insulating layer 125 made of silicon oxide or the like is provided in the center portion thereof. Further, each of outer peripheral surfaces of the semiconductor pillars 120 is surrounded by the conductive layer 110 and faces the conductive layer 110.

In an upper end portion of the semiconductor pillar 120, an impurity region (not shown) containing N-type impurities such as phosphorus (P) is provided. This impurity region is connected to the bit line BL through a via contact electrode.

In a lower end portion of the semiconductor pillar 120, an impurity region (not shown) containing N-type impurities such as phosphorus (P) is provided. This impurity region is connected to the conductive layer 100.

The gate insulating film 130 has a substantially bottomed cylindrical shape that covers the outer peripheral surface of the semiconductor pillar 120. For example, as shown in FIG. 5, the gate insulating film 130 includes a tunnel insulating film 131, a charge storage film 132, and a block insulating film 133, which are stacked between the semiconductor pillar 120 and the conductive layer 110. The tunnel insulating film 131 and the block insulating film 133 contain, for example, silicon oxide ($SiO_2$). The charge storage film 132 includes a film made of silicon nitride (SiN) or the like capable of accumulating charges. The tunnel insulating film 131, the charge storage film 132, and the block insulating film 133 have a substantially cylindrical shape, and extend in the Z-direction along the outer peripheral surface of the semiconductor pillar 120 excluding a contact portion between the semiconductor pillar 120 and the conductive layer 110.

FIG. 5 shows an example in which the gate insulating film 130 includes the charge storage film 132 made of silicon nitride or the like. Alternatively, the gate insulating film 130 may include a floating gate made of, for example, polycrystalline silicon containing N-type or P-type impurities.

Peripheral Circuit PC

Figure 6:
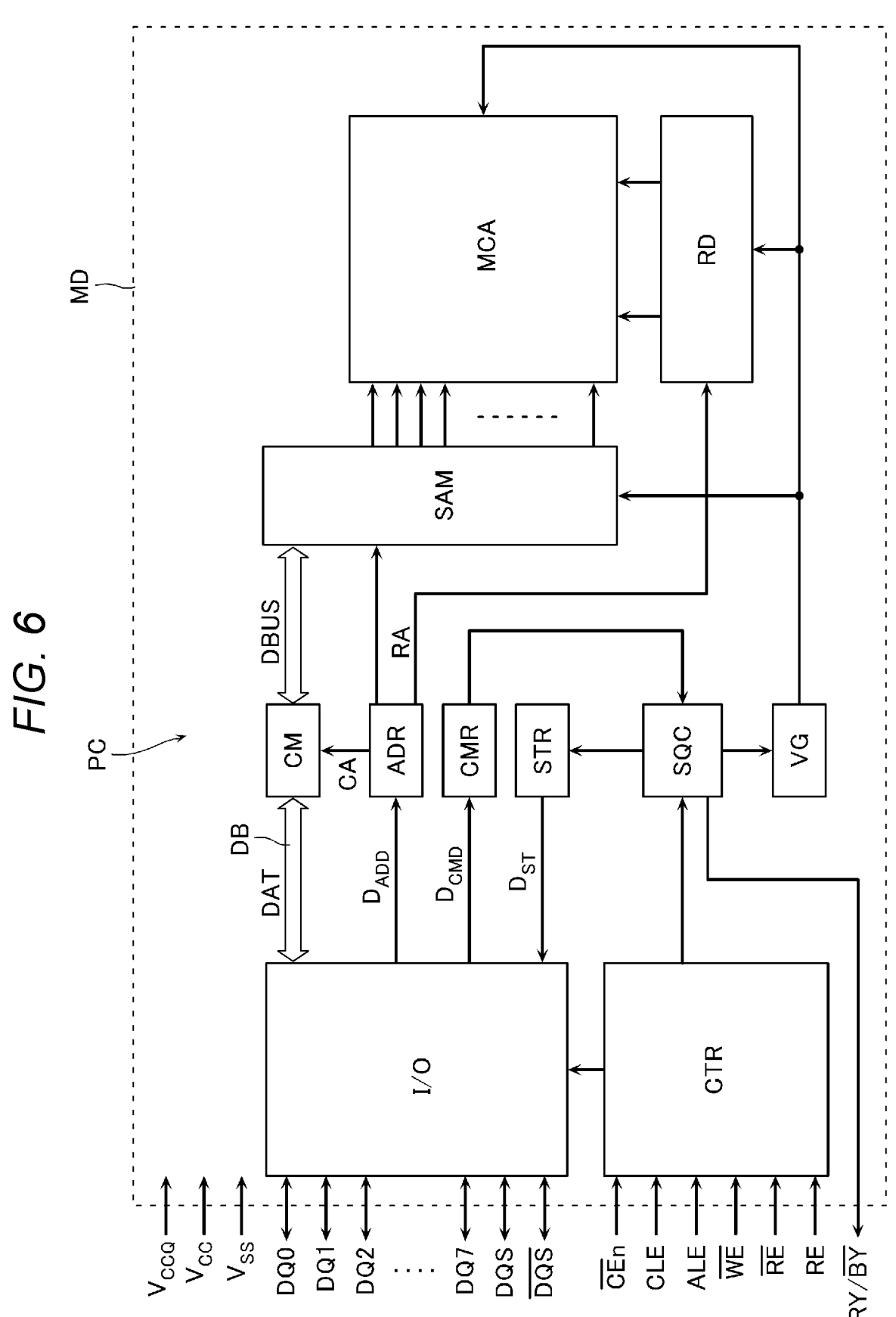
FIG. 6 is a schematic block diagram showing a configuration of a part of a peripheral circuit PC.
Figure 7:
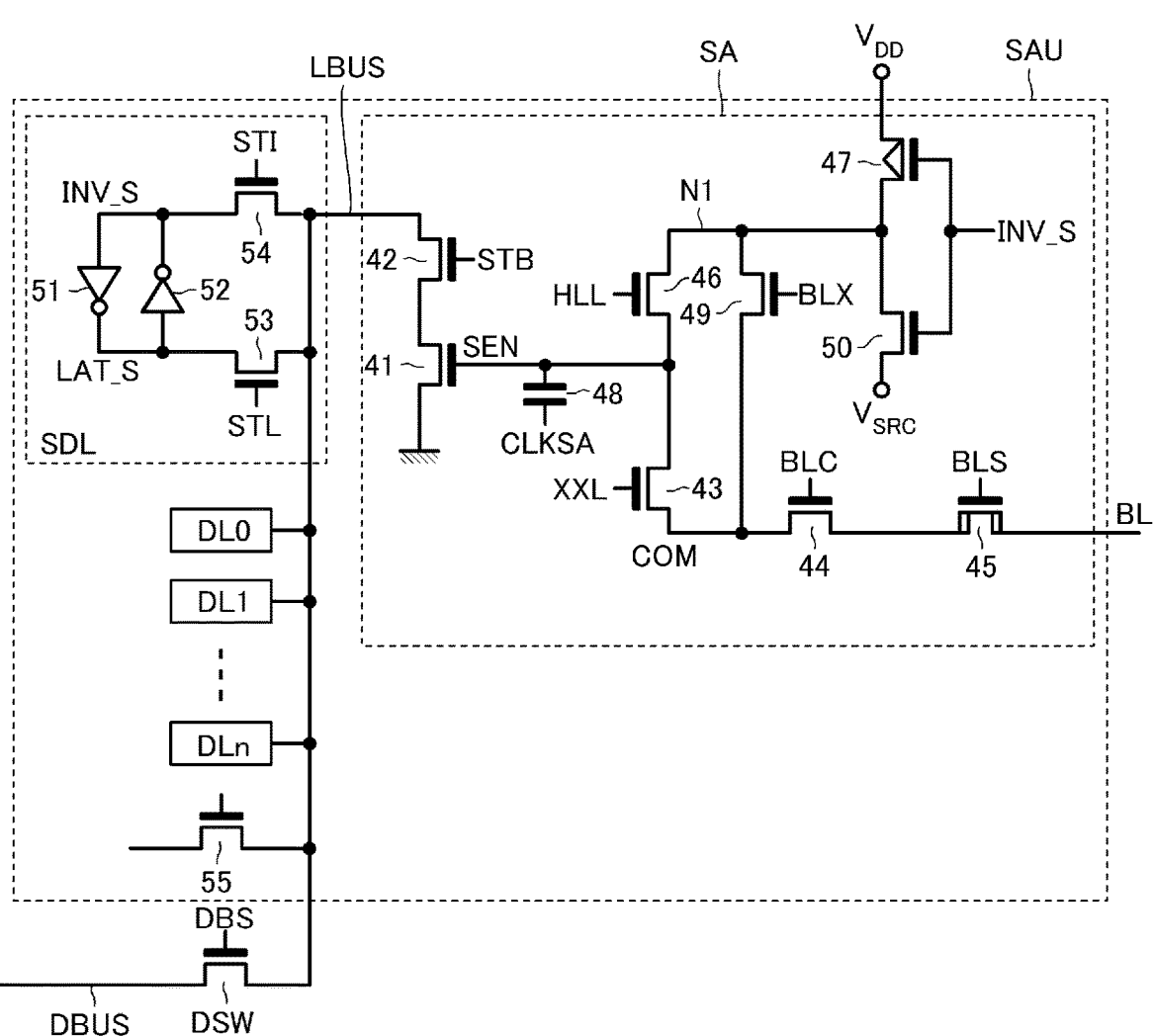
FIG. 7 is a schematic circuit diagram showing a configuration of a part of a sense amplifier module SAM.

FIG. 6 is a schematic block diagram showing a configuration of a part of the peripheral circuit PC. FIG. 7 is a schematic circuit diagram showing a configuration of a part of the sense amplifier module SAM.

FIG. 6 shows a plurality of control terminals and the like. The plurality of control terminals may be expressed as control terminals corresponding to high active signals (positive logic signals). The plurality of control terminals may be expressed as control terminals corresponding to low active signals (negative logic signals). Further, the plurality of control terminals may be expressed as control terminals corresponding to both the high active signal and the low active signal. In FIG. 6, the symbol of the control terminal corresponding to the low active signal includes an overline (upper line). In this specification, the symbol of the control terminal corresponding to the low active signal includes a slash ("/"). The description in FIG. 6 is an example, and a specific manner of implementation may be modified as appropriate. For example, some or all of the high active signals can be used as the low active signals, or some or all of the low active signals can be used as the high active signals.

The peripheral circuit PC includes a voltage generation circuit VG, a row decoder RD, a sense amplifier module SAM, and a sequencer SQC. The peripheral circuit PC includes a cache memory CM, an address register ADR, a command register CMR, and a status register STR. Further, the peripheral circuit PC includes an input/output control circuit I/O and a logic circuit CTR.

The voltage generation circuit VG includes, for example, a step-down circuit and a step-up circuit. The step-down circuit is, for example, a regulator. The step-up circuit is, for example, a charge pump circuit. Each of the step-down circuit and the step-up circuit is connected to a power supply voltage supply line. The voltage generation circuit VG is supplied with a power supply voltage $V_{CC}$ and a ground voltage $V_{SS}$. The voltage generation circuit VG generates a plurality of operating voltages and simultaneously outputs the operating a voltages to plurality of voltage supply lines. The plurality of operating voltages are supplied to the bit line BL, the source line SL, the word line WL, and the select gate lines SGD and SGS, for example, during a read operation, a write operation, and an erase operation for the memory cell array MCA. The operating voltage is adjusted appropriately according to a control signal from the sequencer SQC.

The row decoder RD selects the memory block BLK, the string unit SU, and the word line WL and selects one page portion PGP from the memory cell array MCA, according to an input row address RA. Further, the row decoder RD transfers a part of the operating voltages supplied from the voltage generation circuit VG to the word line WL and the select gate lines SGD and SGS corresponding to the selected page portion PGP. The row decoder RD transfers another part of the operating voltages supplied from the voltage generation circuit VG to the other word lines WL and select gate lines SGD and SGS.

The sense amplifier module SAM includes, for example, a plurality of sense amplifier units SAU (see FIG. 7) provided corresponding to a plurality of the bit lines BL. As shown in FIG. 7, the sense amplifier unit SAU includes a sense amplifier SA, a wiring LBUS, and latch circuits SDL, DL0 to DLn (n is a natural number). A charge transistor 55 (see FIG. 7) for precharging is connected to the wiring LBUS. The wiring LBUS is connected to a wiring DBUS via a switch transistor DSW.

The sense amplifier SA includes a sense transistor 41. The sense transistor 41 discharges the charges of the wiring LBUS according to the current flowing through the bit line BL. A source electrode of the sense transistor 41 is connected to the voltage supply line to which the ground voltage $V_{SS}$ is supplied. A drain electrode thereof is connected to the wiring LBUS via a switch transistor 42. A gate electrode thereof is electrically connected to the bit line BL via a sense node SEN, a discharge transistor 43, a node COM, a clamp transistor 44, and a breakdown voltage transistor 45. The sense node SEN is connected to an internal control signal line CLKSA via a capacitor 48.

Further, the sense amplifier SA includes a voltage transfer circuit. The voltage transfer circuit selectively makes the node COM and the sense node SEN into conductive with the voltage supply line to which the voltage $V_{DD}$ is supplied or the voltage supply line to which a voltage $V_{SRC}$ is supplied, depending on data stored in the latch circuit SDL. The voltage transfer circuit includes a node N1, a charge transistor 46, a charge transistor 49, a charge transistor 47, and a discharge transistor 50. The charge transistor 46 is connected between the node N1 and the sense node SEN. The charge transistor 49 is connected between the node N1 and the node COM. The charge transistor 47 is connected between the node N1 and the voltage supply line to which the voltage $V_{DD}$ is supplied. The discharge transistor 50 is connected between the node N1 and the voltage supply line to which the voltage $V_{SRC}$ is supplied. Gate electrodes of the charge transistor 47 and the discharge transistor 50 are commonly connected to a node INV_S of the latch circuit SDL.

The sense transistor 41, the switch transistor 42, the discharge transistor 43, the clamp transistor 44, the charge transistor 46, the charge transistor 49, and the discharge transistor 50 are, for example, enhancement-type NMOS transistors. The breakdown voltage transistor 45 is, for example, a depression-type NMOS transistor. The charge transistor 47 is, for example, a PMOS transistor.

A gate electrode of the switch transistor 42 is connected to a signal line STB. A gate electrode of the discharge transistor 43 is connected to a signal line XXL. A gate electrode of the clamp transistor 44 is connected to a signal line BLC. A gate electrode of the breakdown voltage transistor 45 is connected to a signal line BLS. A gate electrode of the charge transistor 46 is connected to signal line HLL. A gate electrode of the charge transistor 49 is connected to a signal line BLX. The signal lines STB, XXL, BLC, BLS, HLL, and BLX are connected to the sequencer SQC (see FIG. 6).

The latch circuit SDL includes nodes LAT_S and INV_S, an inverter 51, an inverter 52, a switch transistor 53, and a switch transistor 54. The inverter 51 includes an output terminal connected to the node LAT_S and an input terminal connected to the node INV_S. The inverter 52 includes an input terminal connected to the node LAT_S and an output terminal connected to the node INV_S. The switch transistor 53 is provided in a current path between the node LAT_S and the wiring LBUS. The switch transistor 54 is provided in a current path between the node INV_S and the wiring LBUS. The switch transistors 53 and 54 are, for example, NMOS transistors. A gate electrode of the switch transistor 53 is connected to the sequencer SQC via a signal line STL. A gate electrode of the switch transistor 54 is connected to the sequencer SQC via a signal line STI.

A plurality of the latch circuits SDL corresponding to the plurality of bit lines BL configure the latch portion SDLP described with reference to FIG. 2. One latch circuit SDL stores one bit of the data stored in the latch portion SDLP.

The latch circuits DL0 to DLn are configured almost similarly to the latch circuit SDL. However, as described above, the node INV_S of the latch circuit SDL is conductive with the gate electrodes of the charge transistor 47 and the discharge transistor 50 in the sense amplifier SA. In this point, the latch circuits DL0 to DLn differ from the latch circuit SDL.

A plurality of the latch circuits DL0 corresponding to the plurality of bit lines BL configure the latch portion DL0P described with reference to FIG. 2. Similarly, a plurality of the latch circuits DLI to DLn corresponding to the plurality of bit lines BL configure the latch portions DL1P to DLnP, respectively, described with reference to FIG. 2. Each of the latch circuits DL0 to DLn stores one bit of the data stored in the corresponding latch portions DL0P to DLnP.

The switch transistor DSW is, for example, an NMOS transistor. The switch transistor DSW is connected between the wiring LBUS and the wiring DBUS. A gate electrode of the switch transistor DSW is connected to the sequencer SQC via a signal line DBS.

Each of the signal lines STB, HLL, XXL, BLX, BLC, and BLS described above is commonly connected to all sense amplifier units SAU in the sense amplifier module SAM. The voltage supply line to which the voltage $V_{DD}$ is supplied and the voltage supply line to which the voltage $V_{SRC}$ is supplied are commonly connected to all sense amplifier units SAU in the sense amplifier module SAM, respectively.

Further, the signal line STI and the signal line STL of the latch circuit SDL are commonly connected to all sense amplifier units SAU in the sense amplifier module SAM, respectively.

The cache memory CM (see FIG. 6) includes a plurality of latch circuits. The plurality of latch circuits in the cache memory CM are connected to the latch circuits DL0 to DLn in the sense amplifier module SAM via the wiring DBUS. Data DAT (data input from the controller CD, data read from the memory cell array MCA, and the like) in the plurality of latch circuits in the cache memory CM is sequentially transferred to the sense amplifier module SAM or the input/output control circuit I/O.

Further, a decode circuit and a switch circuit (not shown) are connected to the cache memory CM. The decode circuit decodes a column address CA stored in the address register ADR. The switch circuit makes the latch circuit corresponding to the column address CA into conductive with a bus DB in accordance with the output signal of the decode circuit.

The sequencer SQC outputs an internal control signal to the row decoder RD, the sense amplifier module SAM, and the voltage generation circuit VG according to command data $D_{CMD}$ stored in the command register CMR. The sequencer SQC appropriately outputs status data DST indicating the state of the sequencer SQC to the status register STR.

Further, the sequencer SQC generates a ready/busy signal and outputs the ready/busy signal to a terminal RY//BY. During a period when the terminal RY//BY is in an "L" state (busy period), access to the memory die MD is basically prohibited. During a period when the terminal RY//BY is in an "H" state (ready period), access to the memory die MD is permitted.

The input/output control circuit I/O includes data input/output terminals DQ0 to DQ7, toggle signal input/output terminals DOS and/DQS, a plurality of input circuits, a plurality of output circuits, a shift register, and a buffer circuit. Each of the plurality of input circuits, the plurality of output circuits, the shift register, and the buffer circuit is connected to a terminal to which a power supply voltage $V_{CCQ}$ and the ground voltage $V_{SS}$ are supplied.

Data input via the data input/output terminals DQ0 to DQ7 is output from the buffer circuit to the cache memory CM, the address register ADR, or the command register CMR in accordance with an internal control signal from the logic circuit CTR. Further, data output via the data input/output terminals DQ0 to DQ7 is input from the cache memory CM or the status register STR to the buffer circuit in accordance with the internal control signal from the logic circuit CTR.

The plurality of input circuits include, for example, a comparator connected to any one of the data input/output terminals DQ0 to DQ7 or both the toggle signal input/output terminals DQS and/DQS. The plurality of output circuits include, for example, an off chip driver (OCD) circuit connected to any one of the data input/output terminals DQ0 to DQ7 or any one of the toggle signal input/output terminals DQS and/DQS.

The logic circuit CTR receives an external control signal from the controller CD via external control terminals/CEn, CLE, ALE, /WE, /RE, and RE, and outputs an internal control signal to the input/output control circuit I/O in accordance with the external control signal.

The external control terminal/CEn is used when selecting the memory die MD. The input/output control circuit I/O of the memory die MD in which "L" is input to the external control terminal/CEn inputs and outputs data via the data input/output terminals DQ0 to DQ7. The input/output con-
trol circuit I/O of the memory die MD in which "H" is input
to the external control terminal/CEn does not input and
output data via the data input/output terminals DQ0 to DQ7.

The external control terminal CLE is used when using the
command register CMR. When "H" is input to the external
control terminal CLE, data input via the data input/output
terminals DQ0 to DQ7 is stored as command data $D_{CMD}$ in
the buffer memory in the input/output control circuit I/O and
transferred to the command register CMR.

The external control terminal ALE is used when using the
address register ADR. When "H" is input to the external
control terminal ALE, data input via the data input/output
terminals DQ0 to DQ7 is stored as address data $D_{ADD}$ in the
buffer memory in the input/output control circuit I/O and
transferred to the address register ADR.

When "L" is input to both the external control terminals
CLE and ALE, data input via the data input/output terminals
DQ0 to DQ7 is stored as the data DAT in the buffer memory
in the input/output control circuit I/O. The data DAT is
transferred to the cache memory CM via the bus DB. The
external control terminal/WE is used when inputting data via
the data input/output terminals DQ0 to DQ7. Data input via
the data input/output terminals DQ0 to DQ7 is fetched into
the shift register in the input/output control circuit I/O at the
timing of the rise of the voltage of the external control
terminal/WE.

The toggle signal input/output terminals DQS and/DQS
are used when inputting data via the data input/output
terminals DQ0 to DQ7. Data input via the data input/output
terminals DQ0 to DQ7 is fetched into the shift register in the
input/output control circuit I/O at the timing of the rise of the
voltage of the toggle signal input/output terminal DOS and
the fall of the voltage of the toggle signal input/output
terminal/DQS. Data input via the data input/output terminals
DQ0 to DQ7 is fetched into the shift register in the input/
output control circuit I/O at the timing of the fall of the
voltage of the toggle signal input/output terminal DQS
(switching of the input signal) and the rise of the voltage of
the toggle signal input/output terminal/DQS.

When inputting data, the external control terminal/WE
may be used or the toggle signal input/output terminals DQS
and/DQS may be used.

The external control terminals/RE and RE are used when
outputting data via the data input/output terminals DQ0 to
DQ7. Data output from the data input/output terminals DQ0
to DQ7 may be switched at the timing of the rise of the
voltage of the external control terminal/RE. Data output
from the data input/output terminals DQ0 to DQ7 may be
switched at the timing of the fall of the voltage of the
external control terminal/RE and the rise of the voltage of
the external control terminal RE. Data output from the data
input/output terminals DQ0 to DQ7 may be switched at the
timing of the rise of the voltage of the external control
terminal/RE and the fall of the voltage of the external control
terminal RE.

Controller CD

Figure 8:
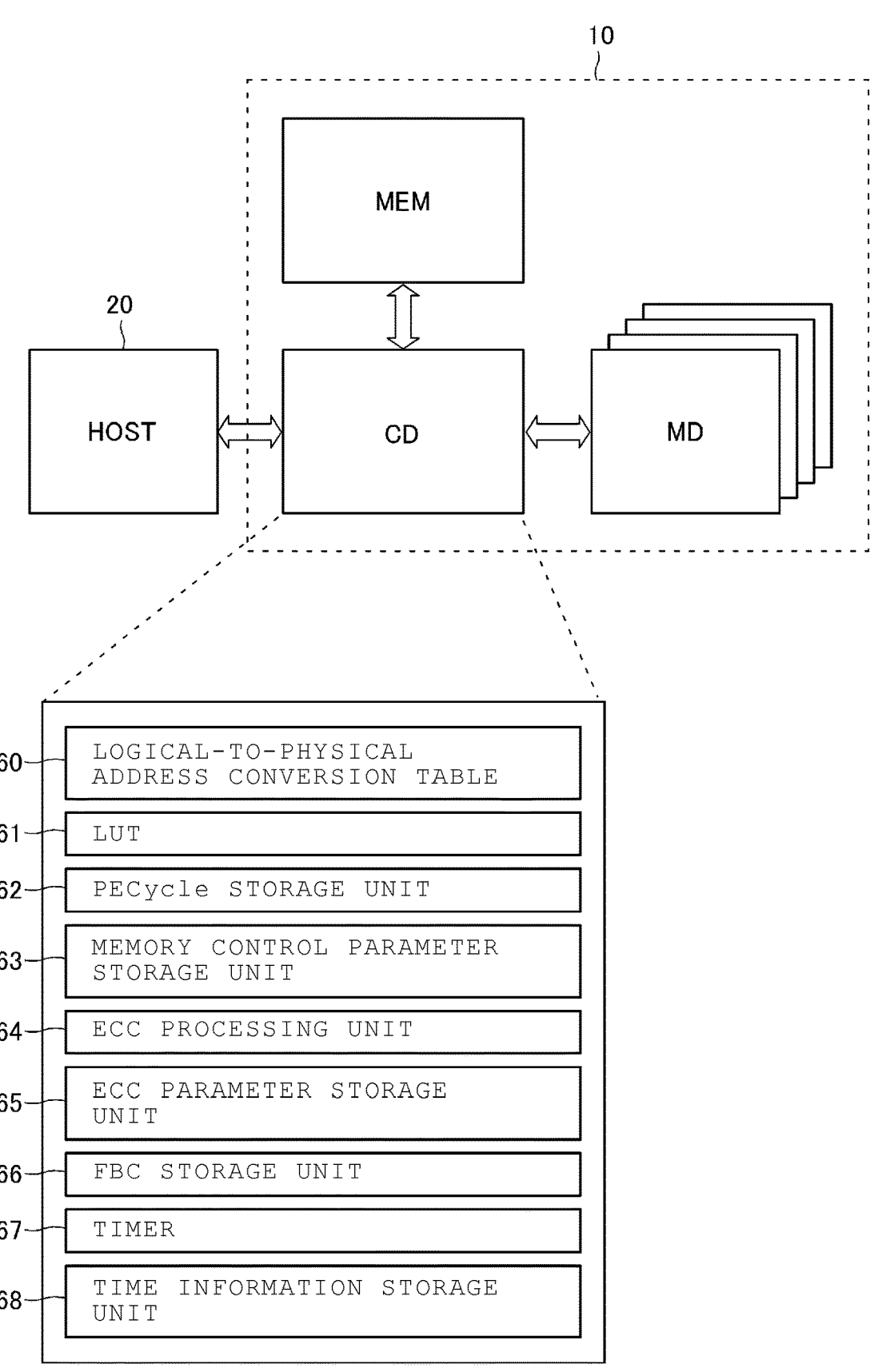
FIG. 8 is a schematic block diagram showing a configuration of a part of a controller CD.

FIG. 8 is a schematic block diagram showing a configu-
ration of a part of the controller CD.

The controller CD, together with the storage device MEM
and the like, implements various functions illustrated below.

In order to increase the speed, the read operation and the
write operation are performed in parallel on the plurality of
memory dies MD in the memory system 10. A set of the
plurality of memory blocks BLK selected from the plurality
of memory dies MD on which operations can be performed
in parallel is referred to as a logical block.

A logical-to-physical address conversion table 60 stores a
logical address representing an identification number of the
logical block and a position in the logical block, and a
physical address assigned to each page PG of the memory
die MD (see FIG. 2) in correlation with each other. During
the read operation, the physical address corresponding to the
logical address is acquired by referring to an LUT 61, which
will be described below, and the logical-to-physical address
conversion table 60. During the write operation, the physical
address of an "erased" page PG (see FIG. 2) is acquired and
stored in the logical-to-physical address conversion table 60
in correlation with the logical address.

The look up table (LUT) 61 is a table that indicates in
which logical address the data, which is stored with an
address designated by the host computer 20 using a logical
block address (LBA) or the like, is stored. When the stored
data is valid, the LUT 61 stores the LBA and the logical
address in correlation with each other. When the stored data
is invalid, the LUT 61 stores information indicating that the
correlation between the LBA and the logical address regard-
ing the data is invalid. In the following description, among
the logical blocks, a logical block of which corresponding
pages PG are all "invalid" may be referred to as a free block.

A PECycle storage unit 62 stores each logical block and
the number of times of erase operations executed on each
logical block in correlation with each other. In the following
description, the number of times of erase operations
executed on each logical block may be referred to as a
program erase cycle (PECycle). During the erase operation,
the PECycle corresponding to the logical block on which the
erase operation is executed is updated by referring to the
PECycle storage unit 62. During the write operation, when
selecting the logical block to which data is to be newly
written, the free block having the smallest number of
PECycles is selected by referring to the PECycle storage
unit 62. After the erase operation is executed on this free
block, the write operation is executed on the page PG in the
memory block BLK that configures this logical block.

A memory control parameter storage unit 63 stores con-
trol parameters for the memory die MD. Such control
parameters include various parameters. For example, during
the read operation, the write operation, and the erase opera-
tion, the operating voltages supplied to the bit line BL, the
source line SL, the word line WL, and the select gate lines
SGD and SGS may be adjusted as appropriate. The memory
control parameter storage unit 63 may store, for example,
these operating voltages and the like.

During the read operation, an ECC processing unit 64
detects errors in data read from the memory die MD, and
outputs the number of error bits FBC (failure bit count). The
ECC processing unit 64 corrects the data when possible,
during the read operation. Further, the ECC processing unit
64 encodes data input from the host computer 20 during the
write operation. The ECC processing unit 64 may be imple-
mented as a dedicated circuit, not by the controller CD and
the storage device MEM.

An ECC parameter storage unit 65 stores control param-
eters regarding the ECC processing unit 64. For example,
ECC calculation methods include a method using a BCH
code, a method using an LDPC code, and the like. The ECC
parameter storage unit 65 stores, for example, a value
indicating which calculation method the ECC processing
unit 64 uses to execute ECC processing and encoding
processing. An FBC storage unit 66 stores the number of
error bits FBC output from the ECC processing unit 64.

A timer 67 stores information indicating the current time
(hereinafter referred to as time information"). The timer 67 receives a clock signal from a crystal oscillator (not shown) and updates the current time information as appropriate. Further, the timer 67 receives current time information from the host computer 20 and modifies the current time information in the timer 67 as appropriate.

A time information storage unit 68 stores time information indicating the time. The time information stored in the time information storage unit 68 will be described below.
Threshold voltage of memory cell MC As described with reference to FIG. 3, the memory cell MC stores data as the magnitude of the threshold voltage. This point will be described below.
Example where Memory Cell MC Stores 1 Bit of Data First, with reference to FIG. 9, an example in which the memory cell MC stores 1 bit of data will be described. FIG. 9 is a schematic histogram illustrating the threshold voltage of the memory cell MC in which 1 bit of data is stored. The horizontal axis represents the voltage of the word line WL, and the vertical axis represents the number of memory cells MC.

In the example of FIG. 9, the threshold voltage of the memory cell MC is set to one of two states. For example, the threshold voltage of the memory cell MC set to a lower state is lower than an erase verification voltage $V_{VFYEr}$. The threshold voltage of the memory cell MC set to an upper state is higher than a verification voltage $V_{VFYS}$ and lower than a read pass voltage $V_{READ}$.

In the example of FIG. 9, a read voltage $V_{CGR}$ is set between threshold voltage distribution corresponding to the lower state and threshold voltage distribution corresponding to the upper state.

For example, the lower state corresponds to a lower threshold voltage. The memory cell MC in the lower state is, for example, the memory cell MC in an erased state. For example, data "1" is assigned to the memory cell MC in the lower state.

The upper state corresponds to a high threshold voltage. The memory cell MC in the upper state is, for example, the memory cell MC in a written state. For example, data "0" is assigned to the memory cell MC in the upper state.
Example where Memory Cell MC Stores 2 Bits of Data Next, with reference to FIGS. 10A and 10B, an example in which the memory cell MC stores 2 bits of data will be described. FIG. 10A is a schematic histogram illustrating the threshold voltage of the memory cell MC in which 2 bits of data is stored. The horizontal axis represents the voltage of the word line WL, and the vertical axis represents the number of memory cells MC. FIG. 10B is a table showing an example of a relationship between the threshold voltage of the memory cell MC in which 2 bits of data is stored and the stored data.

In the example of FIG. 10A, the threshold voltage of the memory cell MC is set to one of four states. The threshold voltage of the memory cell MC set to an Er state is lower than the erase verification voltage $V_{VEYEr}$. The threshold voltage of the memory cell MC set to an A state is higher than a verification voltage $V_{VEYA}$ and lower than a verification voltage $V_{VFYB}$. The threshold voltage of the memory cell MC set to a B state is higher than the verification voltage $V_{VFYB}$ and lower than a verification voltage $V_{VFYC}$. Similarly, the threshold voltage of the memory cell MC set to a C state is higher than the verification voltage $V_{VFYC}$ and lower than the read pass voltage $V_{READ}$.

In the example of FIG. 10A, a read voltage $V_{CGAR}$ is set between threshold voltage distribution corresponding to the Er state and threshold voltage distribution corresponding to the A state. A read voltage $V_{CGBR}$ is set between the threshold voltage distribution corresponding to the A state and threshold voltage distribution corresponding to the B state. A read voltage $V_{CGCR}$ is set between the threshold voltage distribution corresponding to the B state and threshold voltage distribution corresponding to the C state.

For example, the Er state corresponds to a lowest threshold voltage. The memory cell MC in the Er state is the memory cell MC in the erased state. For example, data "11" is assigned to the memory cell MC in the Er state.

The A state corresponds to a threshold voltage higher than the threshold voltage corresponding to the Er state. For example, data "10" is assigned to the memory cell MC in the A state.

The B state corresponds to a threshold voltage higher than the threshold voltage corresponding to the A state. For example, data "00" is assigned to the memory cell MC in the B state.

The C state corresponds to a threshold voltage higher than the threshold voltage corresponding to the B state. For example, data "01" is assigned to the memory cell MC in the C state.

Figures 11A, 11B:
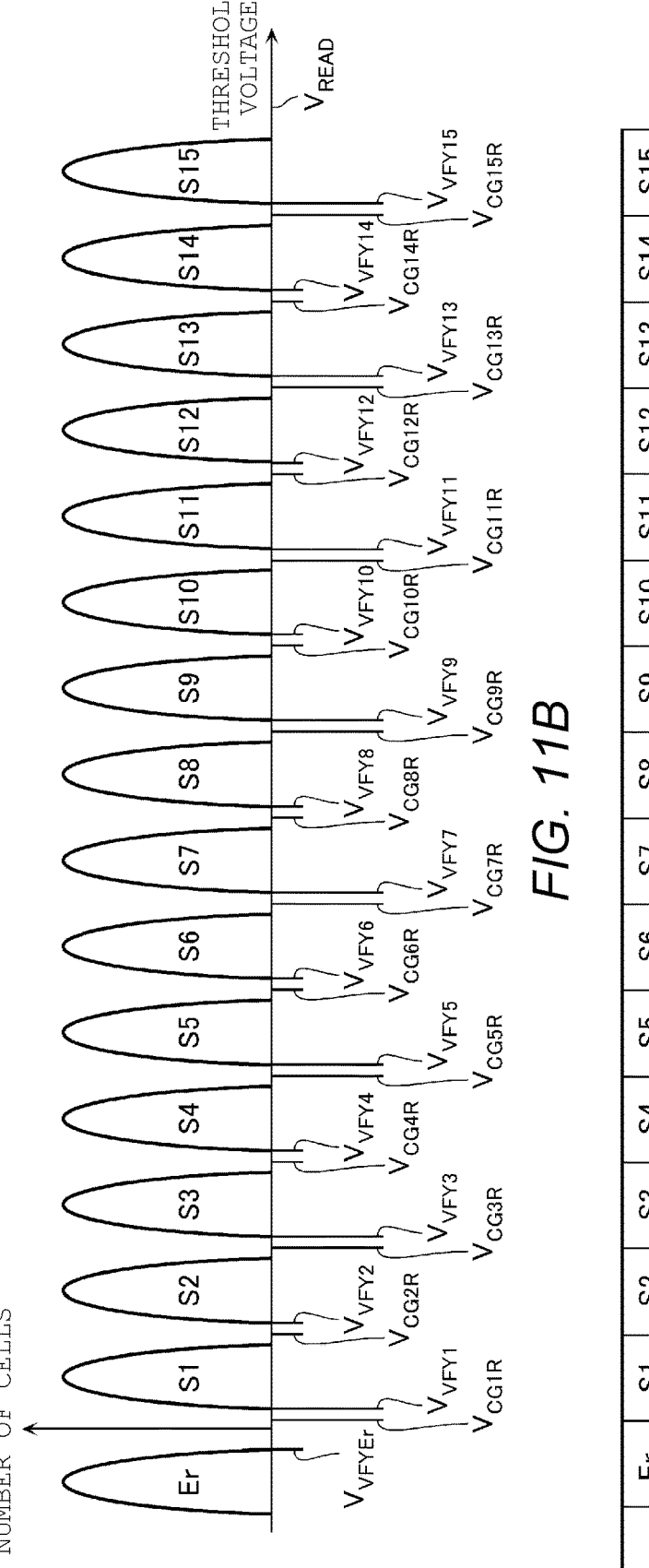
FIGS. 11A and 11B are schematic diagrams illustrating a threshold voltage of a memory cell MC in which 4 bits of data is stored.

In the case of the assignment illustrated in FIG. 10B, lower bits of data can be determined by one read voltage $V_{CGBR}$, and middle bits of data can be determined by two read voltages $V_{CGAR}$ and $V_{CGCR}$.
Example where Memory Cell MC Stores 4 Bits of Data Next, with reference to FIGS. 11A and 11B, an example in which the memory cell MC stores 4 bits of data will be described. FIG. 11A is a schematic histogram illustrating the threshold voltage of the memory cell MC in which 4 bits of data is stored. The horizontal axis represents the voltage of the word line WL, and the vertical axis represents the number of memory cells MC. FIG. 11B is a table showing an example of a relationship between the threshold voltage of the memory cell MC in which 4 bits of data is stored and the stored data.

In the example of FIG. 11A, the threshold voltage of the memory cell MC is controlled into 16 states. The threshold voltage of the memory cell MC set to the Er state (S0 state) is lower than the erase verification voltage $V_{VFYEr}$. For example, the threshold voltage of the memory cell MC set to an S1 state is higher than a verification voltage $V_{VFY1}$ and lower than a verification voltage $V_{VEY2}$. For example, the threshold voltage of the memory cell MC set to an S2 state is higher than the verification voltage $V_{VEY2}$ and lower than a verification voltage $V_{VFY3}$. Similarly, the threshold voltages of the memory cells MC set to an S3 state to an S14 state are respectively higher than the verification voltage $V_{VFY3}$ to a verification voltage $V_{VFY14}$ and lower than a verification voltage $V_{VFY4}$ to a verification voltage $V_{VFY15}$. For example, the threshold voltage of the memory cell MC set to an S15 state is higher than the verification voltage $V_{VFY15}$ and lower than the read pass voltage $V_{READ}$.

In the example of FIG. 11A, a read voltage $V_{CG1R}$ is set between the threshold voltage distribution corresponding to the Er state and threshold voltage distribution corresponding to the S1 state. A read voltage $V_{CG2R}$ is set between the threshold voltage distribution corresponding to the S1 state and threshold voltage distribution corresponding to the S2 state. Similarly, a read voltage $V_{CG3R}$ to a read voltage $V_{CG15R}$ are respectively set from between the threshold voltage distribution corresponding to the S2 state and threshold voltage distribution corresponding to the S3 state to between threshold voltage distribution corresponding to the S14 state and threshold voltage distribution corresponding to the S15 state.

For example, the Er state corresponds to the lowest threshold voltage. The memory cell MC in the Er state is, for example, the memory cell MC in the erased state. For example, data "1111" is assigned to the memory cell MC in the Er state.

The S1 state corresponds to a threshold voltage higher than the threshold voltage corresponding to the Er state. For example, data "1110" may be assigned to the memory cell MC in the S1 state.

The S2 state corresponds to a threshold voltage higher than the threshold voltage corresponding to the S1 state. For example, data "1100" may be assigned to the memory cell MC in the S2 state.

Similarly, the S3 state to the S15 state in the drawing correspond to threshold voltages higher than those corresponding to the S2 state to the S14 state, respectively. For example, data "1101", data "1001", data "1011", data "0011", data "0010", data "1010", data "1000", data "0000", data "0001", data "0101", data "0111", data "0110", and data "0100" may be respectively assigned to the memory cells MC in these states.

In the case of the assignment illustrated in FIG. 11B, the lower bits of data can be determined by three read voltages $V_{CGGR}$, $V_{CGBR}$, and $V_{CG10R}$. The middle bits of data can be determined by two read voltages $V_{CGAR}$ and $V_{CG12R}$. Upper bits of data can be determined by five read voltages $V_{CG2R}$, $V_{CG5R}$, $V_{CG9R}$, $V_{CG13R}$, and $V_{CG15R}$. Further, top bits of data can be determined by five read voltages $V_{CG1R}$, $V_{CG3R}$, $V_{CG7R}$, $V_{CG11R}$, and $V_{CG14R}$.

Read Operation

Figure 12:
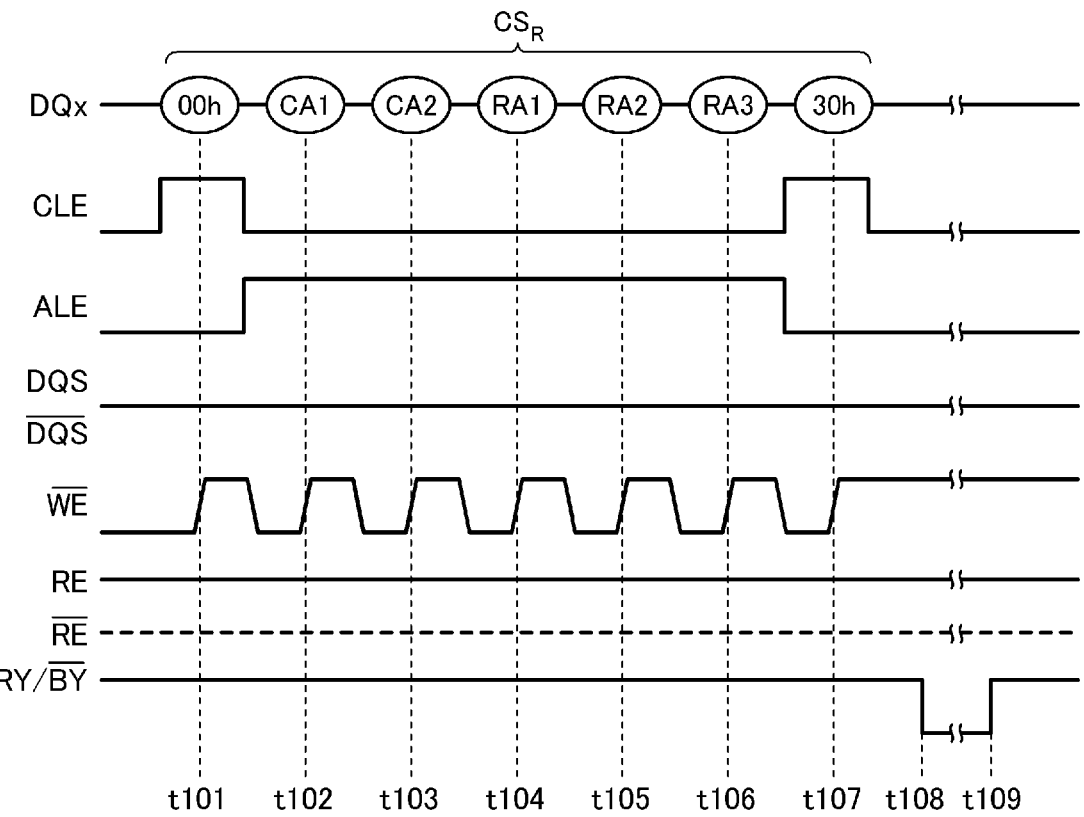
FIG. 12 is a timing chart illustrating a read operation.

Next, the read operation will be described. FIG. 12 is a timing chart illustrating the read operation.

As described with reference to FIG. 6, the memory die MD includes eight data input/output terminals DQ0 to DQ7. In the following description, 8 bits of data input to these eight data input/output terminals DQ0 to DQ7 may be represented using two-digit hexadecimal numbers. For example, when "0, 0, 0, 0, 0, 0, 0, and 0" is input to the eight data input/output terminals DQ0 to DQ7, this data may be represented as data 00h or the like. Further, when "1, 1, 1, 1, 1, 1, 1, and 1" is input, this data may be represented as data FFh or the like.

FIG. 12 illustrates a command set $CS_R$ that is input to the memory die MD during the read operation. This command set $CS_R$ includes data 00h, CA1, CA2, RA1, RA2, RA3, and data 30h.

At timing t101, the controller CD inputs data 00h to the memory die MD as command data $D_{CMD}$. That is, in a state where the voltages of the data input/output terminals DQ0 to DQ7 are set to "H" or "L" according to each bit of data 00h, "H" is input to the external control terminal CLE, and "L" is input to the external control terminal ALE, the external control terminal/WE is raised from "L" to "H". Data 00h is a command input at the start of the read operation.

At timing t102, the controller CD inputs data CA1 to the memory die MD as address data $D_{ADD}$. That is, in a state where the voltages of the data input/output terminals DQ0 to DQ7 are set to "H" or "L" according to each bit of data CA1, "L" is input to the external control terminal CLE, and "H" is input to the external control terminal ALE, the external control terminal/WE is raised from "L" to "H". Data CA1 is a part of the column address CA (see FIG. 6).

At timing t103, the controller CD inputs data CA2 to the memory die MD as address data $D_{ADD}$. Data CA2 is a part of the column address CA (see FIG. 6).

At timing t104, the controller CD inputs data RA1 to the memory die MD as address data $D_{ADD}$. Data RA1 is a part of the row address RA (see FIG. 6). Data RA1 includes, for example, a block address and a page address. The block address is data that specifies the memory block BLK (see FIG. 2). The page address is data that specifies the page portion PGP (see FIG. 2).

At timing t105, the controller CD inputs data RA2 to the memory die MD as address data $D_{ADD}$. Data RA2 is a part of the row address RA (see FIG. 6). Data RA2 includes, for example, the block address and the page address.

At timing t106, the controller CD inputs data RA3 to the memory die MD as address data $D_{ADD}$. Data RA3 is a part of the row address RA (see FIG. 6). Data RA3 includes a chip address. The chip address is data that specifies one memory die MD from the plurality of memory dies MD controlled by the controller CD.

At timing t107, the controller CD inputs data 30h to the memory die MD as command data $D_{CMD}$. Data 30h is a command indicating that the input of the command set related to the read operation is completed.

At timing t108, the terminal RY//BY changes from the "H" state to the "L" state, and access to the memory die MD is prohibited. The read operation is executed in the memory die MD.

At timing t109, the read operation with respect to the memory die MD ends. The terminal RY//BY changes from the "L" state to the "H" state, and access to the memory die MD is permitted.

The command set $CS_R$ illustrated in FIG. 12 is merely an example, and a specific mode may be adjusted as appropriate. For example, the command set $CS_R$ may include data input before data 00h. In the example of FIG. 12, the row address RA (see FIG. 6) in the command set $CS_R$ includes three pieces of data RA1 to RA3. Alternatively, the row address RA in the command set $CS_R$ may include four or more pieces of data. The same applies to the command sets illustrated in the subsequent description.

Figure 13:
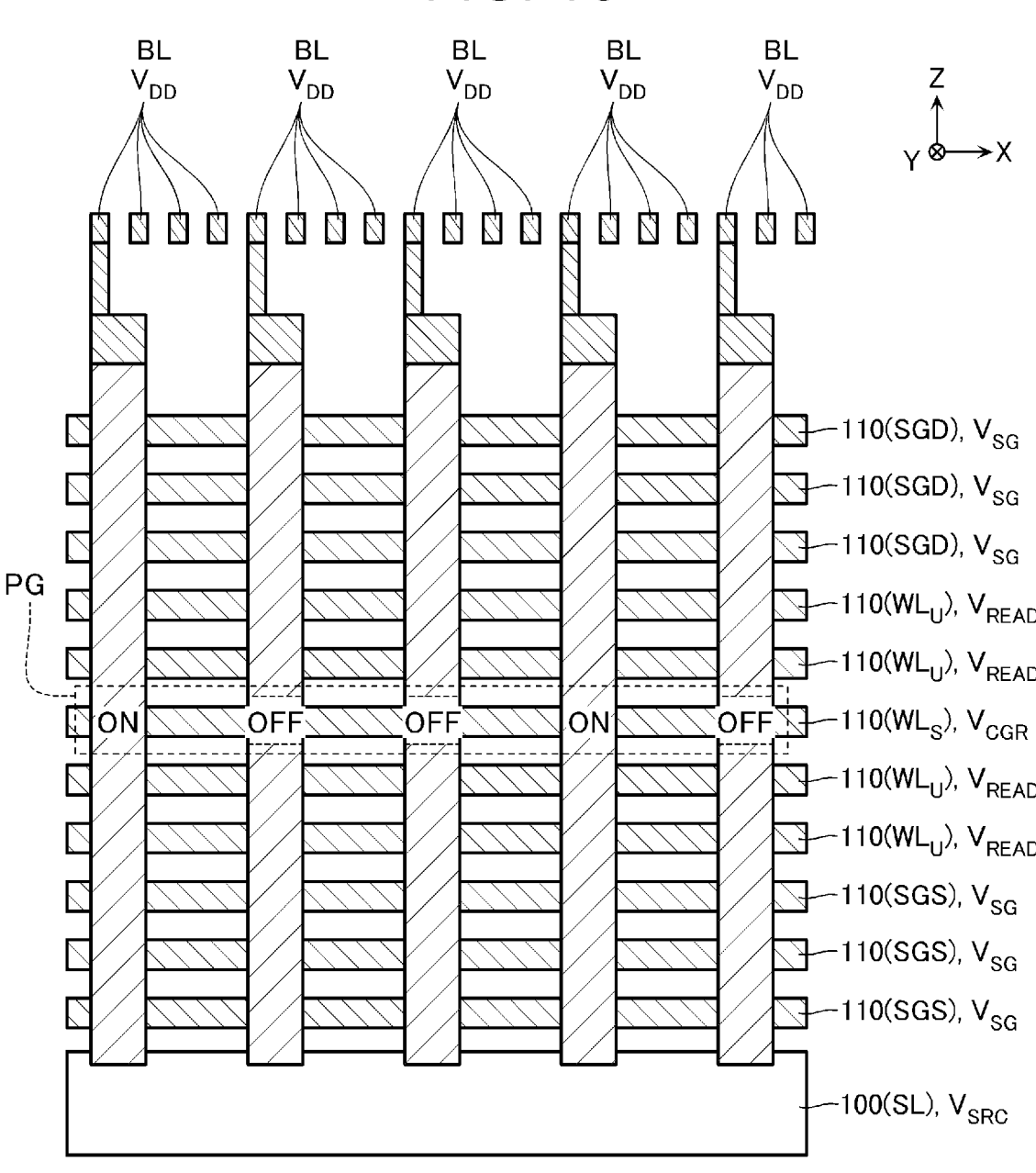
FIG. 13 is a schematic cross-sectional view diagram illustrating the read operation.

FIG. 13 is a schematic cross-sectional view diagram illustrating the read operation. In the following description, the word line WL that is a target of the operation may be referred to as a selected word line $WL_S$, and the other word lines WL may be referred to as unselected word lines $WL_U$.

In the read operation, for example, the voltage $V_{DD}$ is supplied to the bit line BL. For example, the latch circuit SDL in FIG. 7 is caused to store "H", and the states of signal lines STB, XXL, BLC, BLS, HLL, and BLX are set to "L, L, H, H, H, and H". With this, the voltage $V_{DD}$ is supplied to the bit line BL and the sense node SEN. Further, the voltage $V_{SRC}$ is supplied to the source line SL. The voltage $V_{SRC}$ may be larger than the ground voltage $V_{SS}$ or may be equal to the ground voltage $V_{SS}$. The voltage $V_{DD}$ is larger than the voltage $V_{SRC}$.

Further, in the read operation, the voltage $V_{SG}$ is supplied to the drain-side select gate line SGD. The voltage $V_{SG}$ is larger than the voltage $V_{DD}$. A voltage difference between the voltage $V_{SG}$ and the voltage $V_{DD}$ is larger than the threshold voltage when the drain-side select transistor STD functions as an NMOS transistor. Therefore, an electron channel is formed in the channel region of the drain-side select transistor STD, and the voltage $V_{DD}$ is transferred.

In the read operation, the voltage $V_{SG}$ is supplied to the source-side select gate line SGS. The voltage $V_{SG}$ is larger than the voltage $V_{SRC}$. A voltage difference between the voltage $V_{SG}$ and the voltage $V_{SRC}$ is larger than the threshold voltage when the source-side select transistor STS functions as an NMOS transistor. Therefore, an electron channel is formed in the channel region of the source-side select transistor STS, and the voltage $V_{SRC}$ is transferred.

In the read operation, the read pass voltage $V_{READ}$ is supplied to the unselected word line $WL_U$. The read pass voltage $V_{READ}$ is larger than the voltages $V_{DD}$ and $V_{SRC}$. Further, a voltage difference between the read pass voltage $V_{READ}$ and the voltages $V_{DD}$ and $V_{SRC}$ is larger than the threshold voltage when the memory cell MC functions as an NMOS transistor, regardless of the data stored in the memory cell MC. Therefore, an electron channel is formed in the channel region of the unselected memory cell MC, and the voltages $V_{DD}$ and $V_{SRC}$ are transferred to the selected memory cell MC.

Further, in the read operation, the read voltage $V_{CGR}$ is supplied to the selected word line $WL_S$. Although FIG. 9 shows an example in which the memory cell MC stores 1 bit of data, a read voltage supplied to the selected word line $WL_S$ may be the read voltages $V_{CGAR}$ to $V_{CGCR}$ described with reference to FIG. 10A, or may be the read voltages $V_{CG1R}$ to $V_{CG15R}$ described with reference to FIG. 11A. For example, as described with reference to FIG. 10, when the memory cell MC stores 2 bits of data and the read operation of the middle page of this memory cell MC is executed, the read voltages $V_{CGAR}$ and $V_{CGCR}$ are sequentially supplied to the selected word line $WL_S$. More specifically, the read voltage $V_{CGAR}$ is supplied to the selected word line $WL_S$ to execute a sensing operation to be described below, and then the read voltage $V_{CGCR}$ is supplied to the selected word line $WL_S$ to further execute the sensing operation.

A voltage difference between the read voltage $V_{CGR}$ or the like and $V_{SRC}$ is larger than the threshold voltage of the memory cell MC in which a part of data is stored. Therefore, the memory cell MC in which a part of data is stored is turned ON. Therefore, a current flows through the bit line BL connected to this memory cell MC. On the other hand, the voltage difference between the read voltage $V_{CGR}$ or the like and $V_{SRC}$ is smaller than the threshold voltage of the memory cell MC in which a part of data is stored. Therefore, the memory cell MC in which a part of data is stored is turned OFF. Therefore, no current flows through the bit line BL connected to this memory cell MC.

Further, in the read operation, the sense amplifier module SAM (see FIG. 6) detects the current that flows through the bit line BL, thereby detecting the ON state/OFF state of the memory cell MC. Hereinafter, such an operation will be referred to as the "sensing operation". In the sensing operation, for example, the states of the signal lines STB, XXL, BLC, BLS, HLL, and BLX described with reference to FIG. 7 are set to "L, H, H, H, L, and L". As a result, the bit line BL and the sense node SEN are conductive with each other, the charges of the sense node SEN are discharged or maintained, and the sense transistor 41 is turned OFF or ON. Next, for example, the states of the signal lines STB, XXL, BLC, BLS, HLL, and BLX are set to "H, L, H, H, L, and L". As a result, the charges of the wiring LBUS are maintained or discharged. Furthermore, any one of the latch circuits in the sense amplifier unit SAU is conductive with the wiring LBUS, and the data of the wiring LBUS is stored by this latch circuit.

Figure 14:
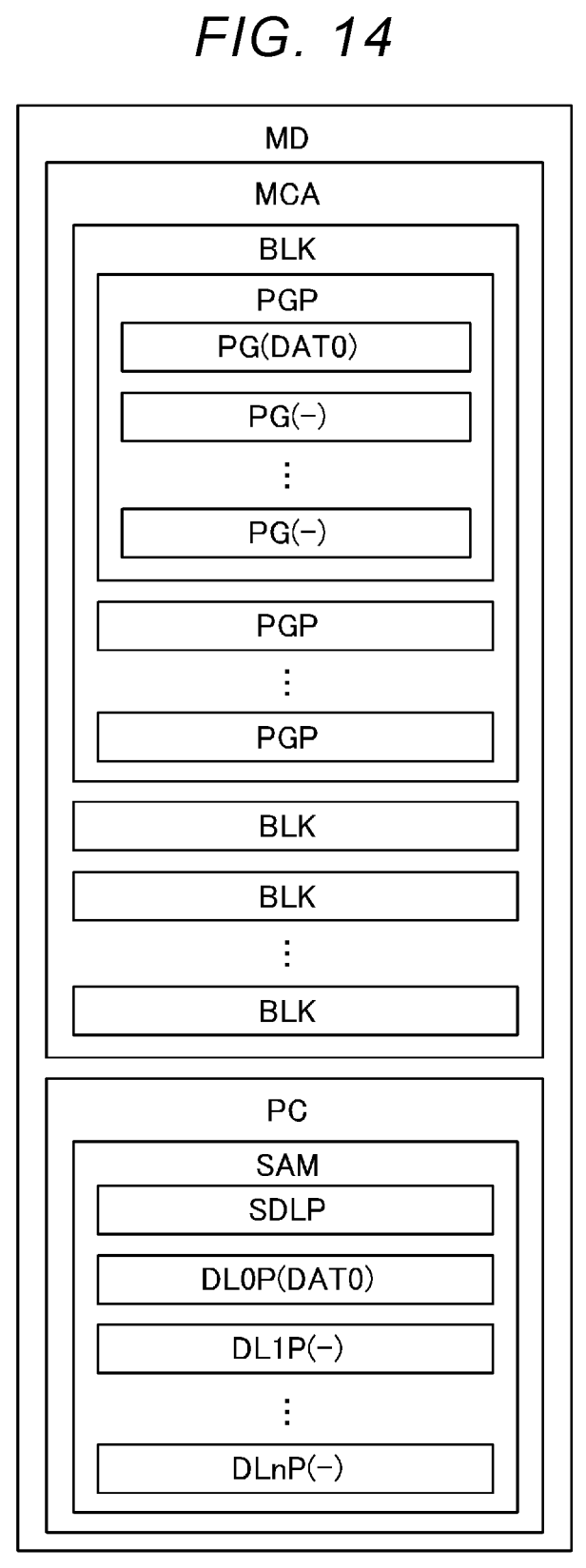
Figure 15:
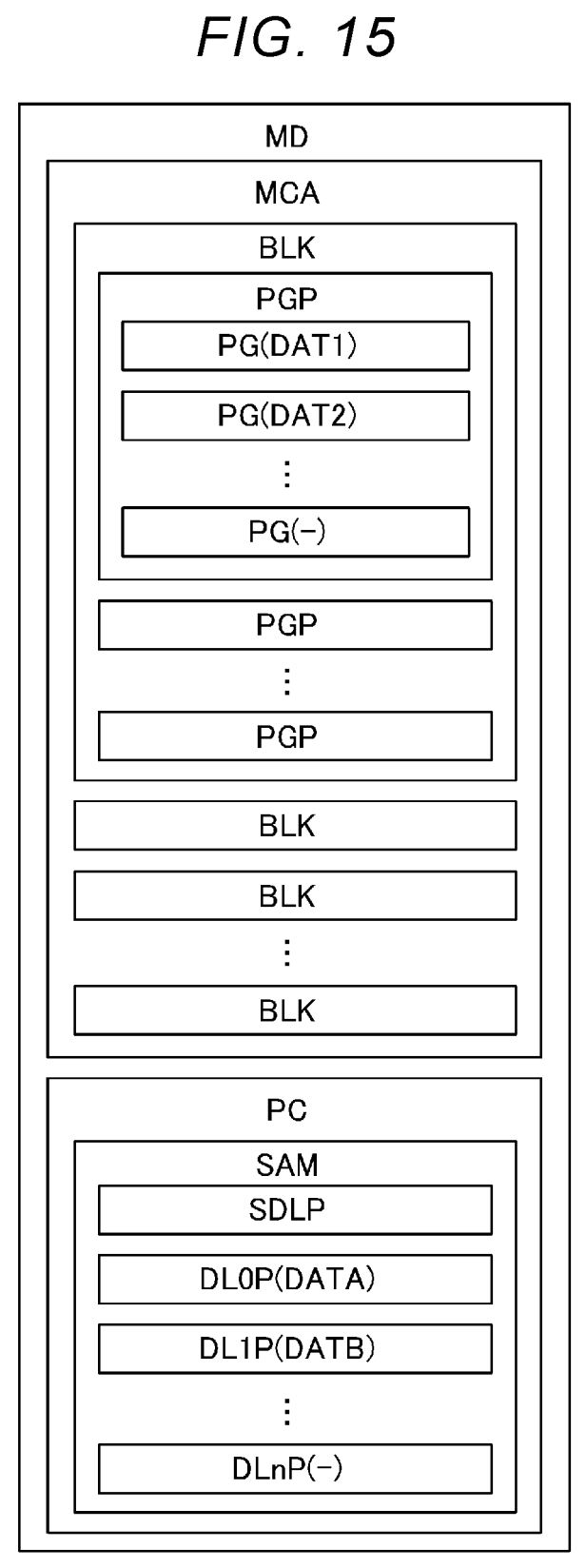

FIGS. 14 and 15 are schematic block diagrams illustrating data processing executed during the read operation.

When the memory cell MC stores 1 bit of data, for example, as shown in FIG. 14, the page portion PGP stores data DAT0 corresponding to one page PG. After the read operation is executed, this data DAT0 is stored in any latch portion (in the illustrated example, the latch portion DL0P) in the sense amplifier module SAM. In this case, data DAT0 is transferred to the cache memory CM (see FIG. 6).

When the memory cell MC stores multiple bits of data, for example, as shown in FIG. 15, a plurality of pieces of data DAT1 and DAT2 corresponding to the plurality of pages PG are stored in the page portion PGP. Further, after the read operation is executed, one or a plurality of pieces of data (in the illustrated example, DATA and DATB) is stored in any latch portion (in the illustrated example, the latch portions DL0P and DL1P) in the sense amplifier module SAM. For example, as described with reference to FIG. 10, when the memory cell MC stores 2 bits of data and the read operation of the middle page of this memory cell MC is executed, data DATA corresponds to data acquired by the sensing operation corresponding to the read voltage VEGAR. Data DATB corresponds to data acquired by the sensing operation corresponding to the read voltage $V_{CGCR}$. In this case, the sense amplifier module SAM can acquire data DAT2 corresponding to the middle page by, for example, performing AND operation of inverted data of data DATA and data DATB, and acquiring inverted data of the result of the AND operation. In this manner, the sense amplifier module SAM executes computation processing such as AND operation and OR operation, and calculates data (for example, data DAT2) corresponding to one page PG. This data is also transferred to the cache memory CM (see FIG. 6).

Data Output Operation

The data transferred to the cache memory CM (see FIG. 6) by the read operation is transferred to the controller CD by a data output operation. The data output operation will be described below.

Figure 16:
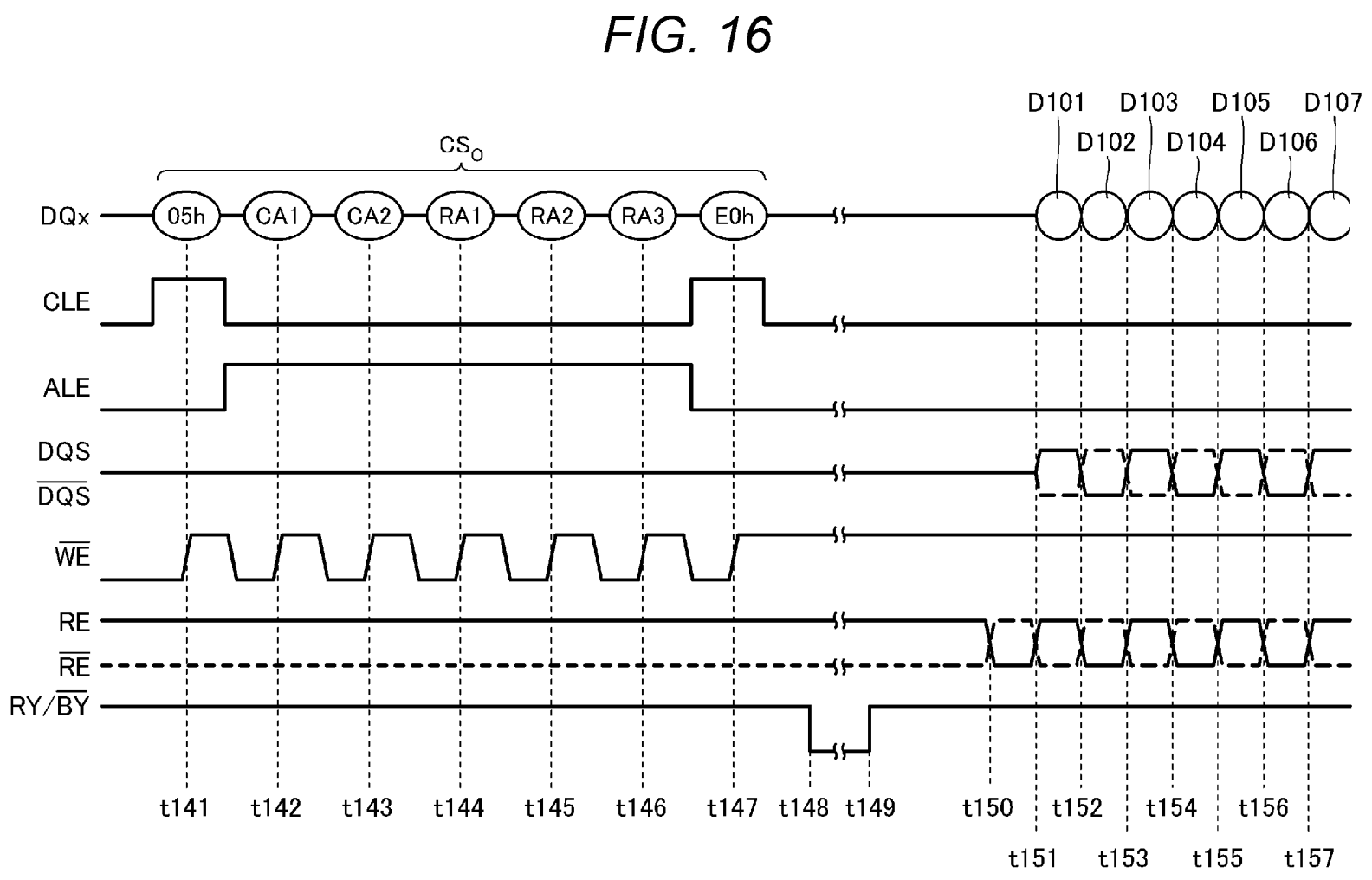

FIG. 16 is a timing chart illustrating the data output operation.

FIG. 16 illustrates a command set $CS_O$ that is input to the memory die MD during the data output operation. This command set $CS_O$ includes data 05h, CA1, CA2, RA1, RA2, RA3 and data E0h.

At timing t141, the controller CD inputs data 05h to the memory die MD as command data $D_{CMD}$. Data 05h is a command input at the start of the data output operation. At timing t142, the controller CD inputs data CA1 to the memory die MD as address data $D_{ADD}$.

At timing t143, the controller CD inputs data CA2 to the memory die MD as address data $D_{ADD}$.

At timing t144, the controller CD inputs data RA1 to the memory die MD as address data $D_{ADD}$.

At timing t145, the controller CD inputs data RA2 to the memory die MD as address data $D_{ADD}$.

At timing t146, the controller CD inputs data RA3 to the memory die MD as address data $D_{ADD}$.

At timing t147, the controller CD inputs data E0h to the memory die MD as command data $D_{CMD}$. Data E0h is a command indicating that the input of a command set related to the data output operation is completed.

At timing t148, the terminal RY//BY changes from the "H" state to the "L" state, and access to the memory die MD is prohibited. Further, the data output operation is executed in the memory die MD.

At timing t149, the data output operation with respect to the memory die MD ends. The terminal RY//BY changes from the "L" state to the "H" state, and access to the memory die MD is permitted.

At timing t151, the controller CD causes data D101 to be output from the memory die MD. That is, in a state where "L" is input to the external control terminal CLE and "L" is input to the external control terminal ALE, the signals between the external control terminals/RE and RE are switched. Accordingly, the voltages of the data input/output terminals DQ0 to DQ7 are set to "H" or "L" according to each bit of data D101. The controller CD acquires this 8 bits of data D101. Data D101 is 8 bits of data among data DAT read from the memory cell MC by the read operation.

At timing t152, the controller CD causes data D102 to be output from the memory die MD. Data D102 is 8 bits of data among DAT read from the memory cell MC by the read operation. Similarly, the controller CD causes data DAT to be output by 8 bits from the memory die MD.

The controller CD can perform bit error detection/correction or the like on the data output from the memory die MD. The controller CD can transfer data which is subjected to the bit error detection/correction or the like to the host computer 20 (see FIG. 1).

Write Operation

Next, the write operation will be described.

Figure 17:
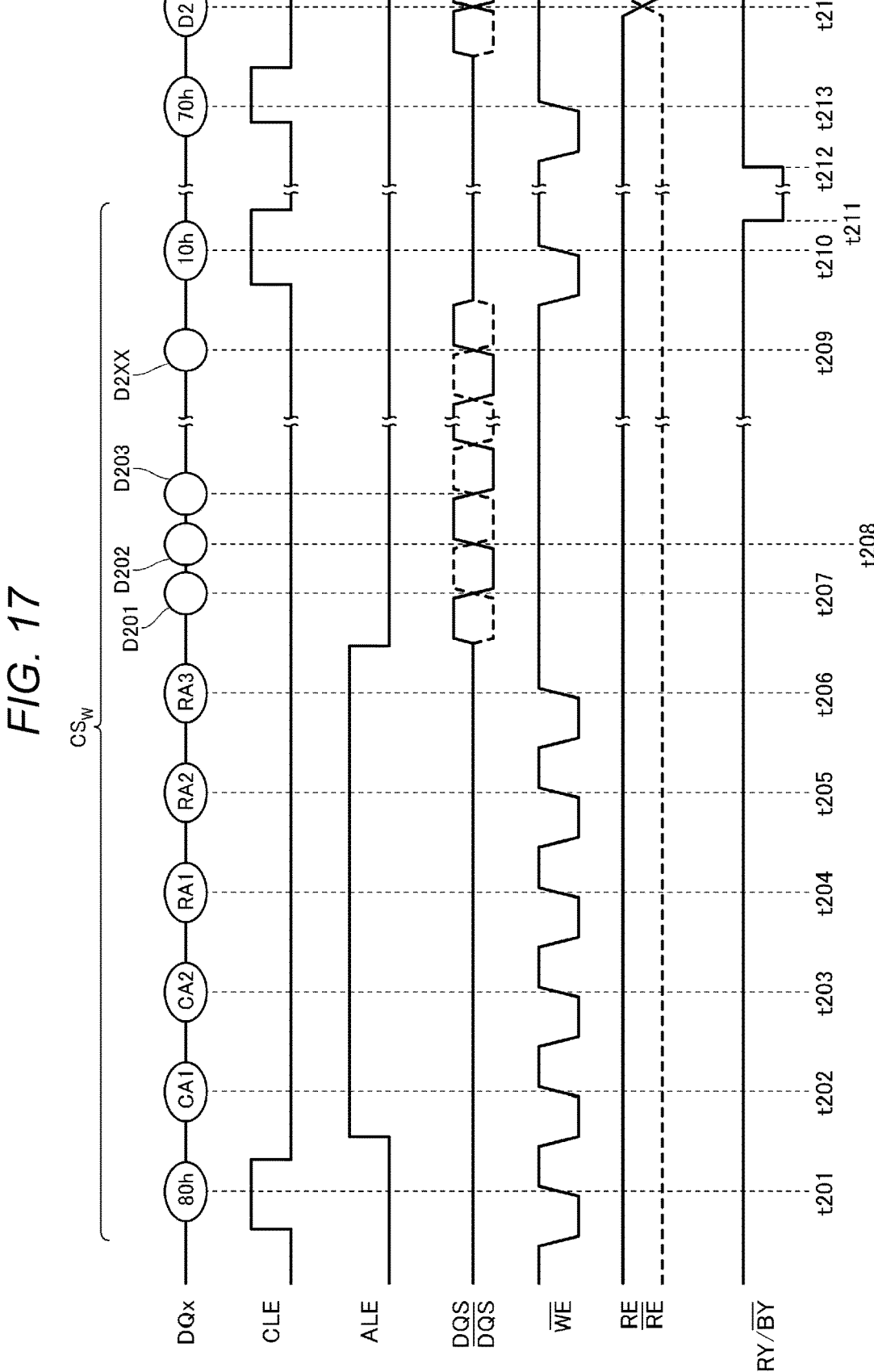
FIG. 17 is a timing chart illustrating a write operation.

FIG. 17 is a timing chart illustrating the write operation.

FIG. 17 illustrates a command set $CS_W$ that is input to the memory die MD during the write operation. This command set $CS_W$ includes data 80h, CA1, CA2, RA1, RA2, RA3, D201, D202 to D2XX, and data 10h.

At timing t201, the controller CD inputs data 80h to the memory die MD as command data $D_{CMD}$. Data 80h is a command input at the start of the write operation.

At timing t202, the controller CD inputs data CA1 to the memory die MD as address data $D_{ADD}$.

At timing t203, the controller CD inputs data CA2 to the memory die MD as address data $D_{ADD}$.

At timing t204, the controller CD inputs data RA1 to the memory die MD as address data $D_{ADD}$.

At timing t205, the controller CD inputs data RA2 to the memory die MD as address data $D_{ADD}$.

At timing t206, the controller CD inputs data RA3 to the memory die MD as address data $D_{ADD}$.

At timing t207, the controller CD inputs data D201 to the memory die MD as data DAT. That is, in a state where the voltages of the data input/output terminals DQ0 to DQ7 are set to "H" or "L" according to each bit of data D201, "L" is input to the external control terminal CLE, and "L" is input to the external control terminal ALE, the input signals between the toggle signal input/output terminals DQS and/ DQS are switched (toggled). Data D201 is 8 bits of data among DAT written to the memory cell MC by the write operation.

At timing t208, the controller CD inputs data D202 to the memory die MD as data DAT. Data D202 is 8 bits of data among DAT written to the memory cell MC by the write operation. Similarly, the controller CD inputs data by 8 bits to the memory die MD as DAT.

At timing t209, the controller CD inputs data D2XX to the memory die MD as data DAT. Data D2XX is 8 bits of data among data DAT written to the memory cell MC by the write operation.

At timing t210, the controller CD inputs data 10h to the memory die MD as command data $D_{CMD}$. Data 10h is a command indicating that the input of a command set related to the write operation is completed.

At timing t211, the terminal RY//BY changes from the "H" state to the "L" state, and access to the memory die MD is prohibited. The write operation is executed in the memory die MD.

At timing t212, the write operation with respect to the memory die MD ends. Further, the terminal RY//BY changes from the "L" state to the "H" state, and access to the memory die MD is permitted.

At timing t213, the controller CD inputs data 70h to the memory die MD, for example, as command data $D_{CMD}$.

Data 70h is a command requesting output of status data $D_{ST}$ stored in the status register STR (see FIG. 6).

At timing t214, the controller CD causes, for example, data D211 to be output from the memory die MD. Data D211 is status data $D_{ST}$ (see FIG. 6).

Figure 18:
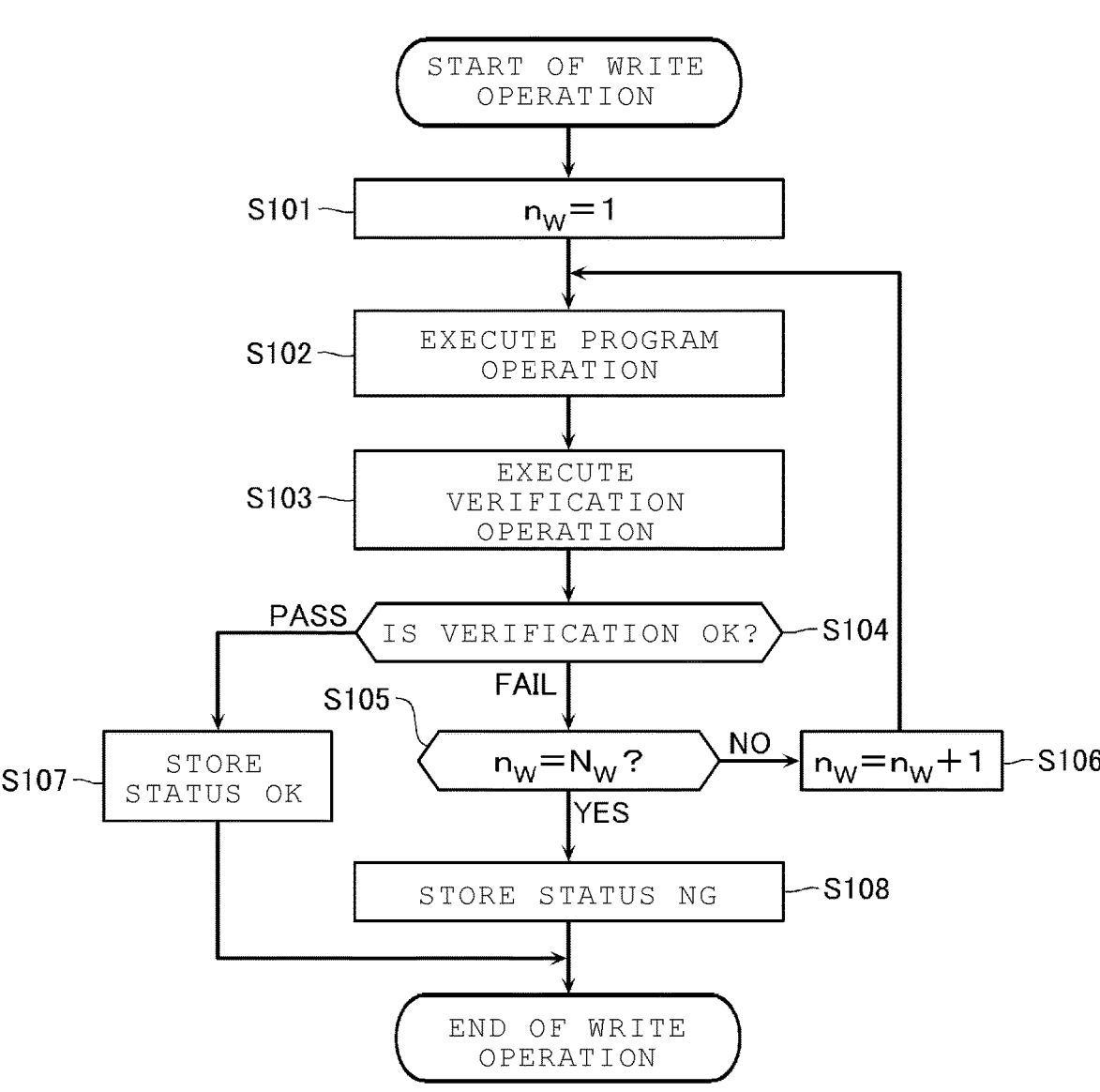
FIG. 18 is a schematic flowchart illustrating the write operation.

FIG. 18 is a schematic flowchart illustrating the write operation.

In step S101, the number of times of loops $n_W$ is set to 1. The number of times of loops $n_W$ is a variable indicating the number of times of write loops. For example, data DAT written to the memory cell MC is stored in the latch circuits DL0 to DLn of the sense amplifier unit SAU (see FIG. 7).

In step S102, a program operation is executed. The program operation is an operation in which a program voltage is supplied to the selected word line $WL_S$ to increase the threshold voltage of the memory cell MC.

In step S103, a verification operation is performed. The verification operation is an operation for supplying a verification voltage to the selected word line $WL_S$, detecting the ON state/OFF state of the memory cell MC, and determining whether the threshold voltage of the memory cell MC reaches a target value.

In step S104, the result of the verification operation is determined. For example, when the number of memory cells MC of which threshold voltages do not reach the target value is greater than or equal to a certain number by referring to a counter circuit (not shown), it is determined that the verification is FAIL, and the process proceeds to step S105. Meanwhile, when the number of memory cells MC of which threshold voltages do not reach the target value is less than a certain number, it is determined that the verification is PASS, and the process proceeds to step S107.

In step S105, it is determined whether the number of times of loops $n_W$ reaches a predetermined number $N_W$. When the number of times of loops $n_W$ does not reach the predetermined number $N_W$, the process proceeds to step S106. When the number of loops times of $n_W$ reaches the predetermined number $N_W$, the process proceeds to step S108.

In step S106, 1 is added to the number of times of loops $n_W$, and the process proceeds to step S102. In step S106, for example, a predetermined voltage AV is added to a program voltage VPGM. Therefore, the program voltage VPGM increases as the number of times of loops $n_W$ increases.

In step S107, status data $D_{ST}$ indicating that the write operation ends normally is stored in the status register STR (see FIG. 6), and the write operation ends. Status data $D_{ST}$ is output to the controller CD (see FIG. 1) by a status read operation.

In step S108, status data $D_{ST}$ indicating that the write operation does not end normally is stored in the status register STR (see FIG. 6), and the write operation ends.

Figure 19:
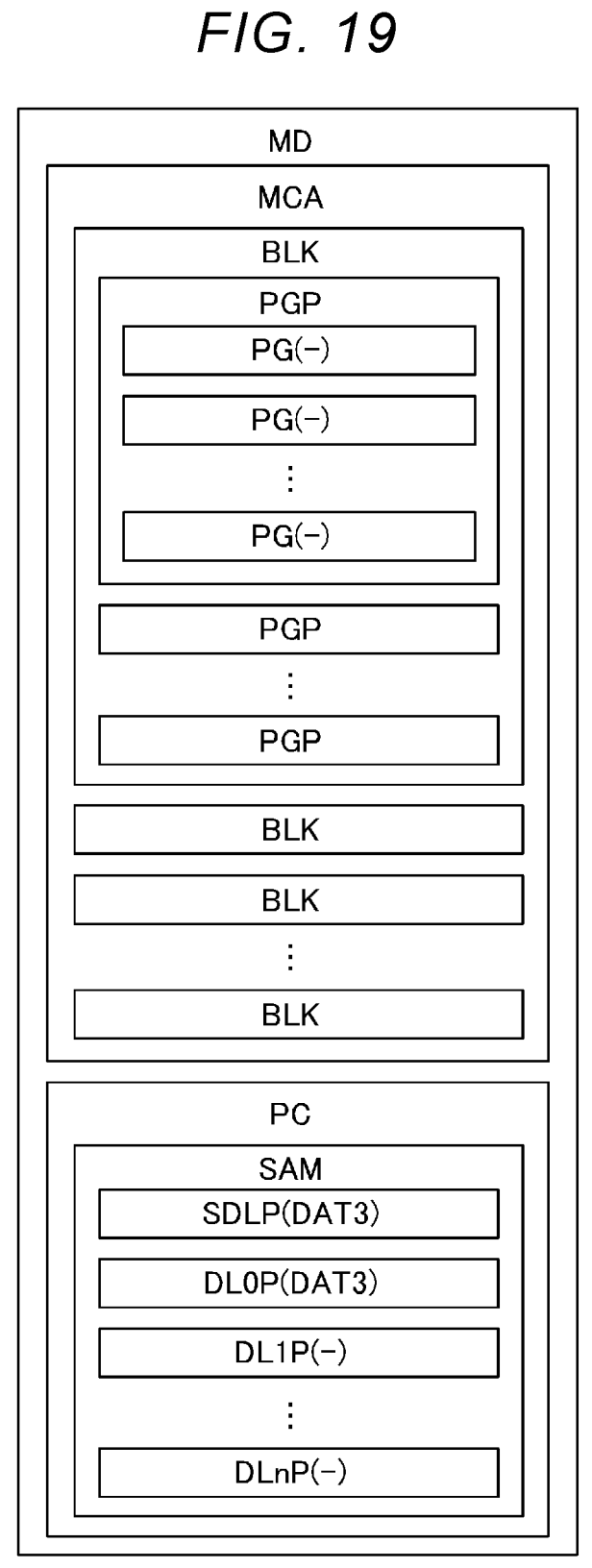

FIGS. 19 and 20 are schematic block diagrams illustrating data processing executed during the program operation.

When storing 1 bit of data in the memory cell MC, for example, as shown in FIG. 19, the latch portion SDLP in the sense amplifier module SAM is caused to store data DAT3 to be written by the write operation.

When the memory cell MC stores multiple bits of data, for example, as shown in FIG. 20, a plurality of pieces of data DAT4 and DAT5 corresponding to the plurality of pages PG to be written by the write operation are stored in any latch portion (in the illustrated example, the latch portions DL0P and DL1P) in the sense amplifier module SAM. In the sense amplifier module SAM, computation processing such as AND operation and OR operation is executed on these data DAT4 and DAT5, and data DAT6 indicating the memory cell MC of which threshold voltage is increased and the memory cell MC of which threshold voltage is not increased is calculated. This data DAT6 is stored in the latch portion SDLP in the sense amplifier module SAM.

Figure 21:
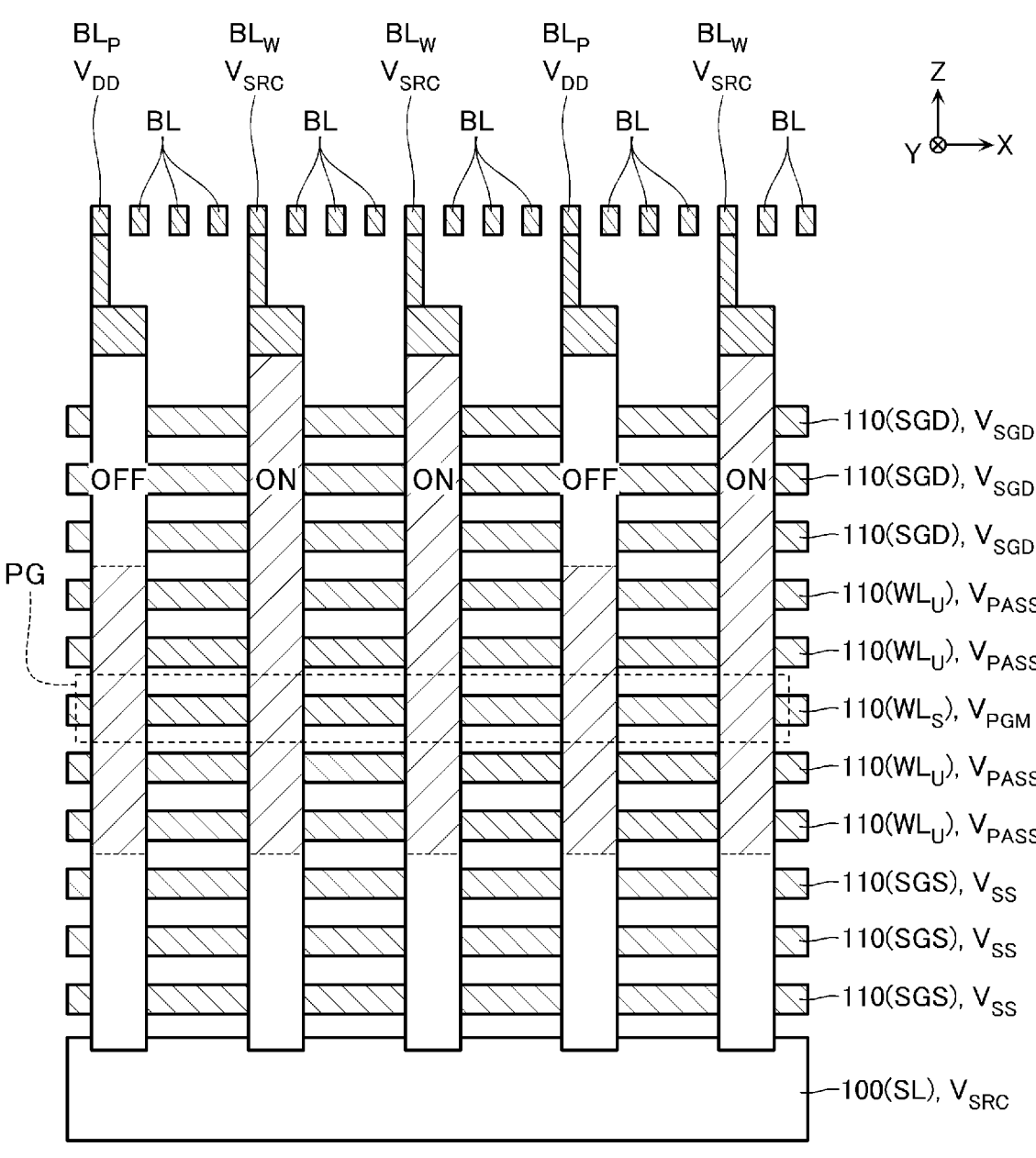
FIG. 21 is a schematic cross-sectional view diagram illustrating the program operation.

FIG. 21 is a schematic cross-sectional view diagram illustrating the program operation.

In the program operation, for example, the voltage $V_{SRC}$ is supplied to a bit line $BL_W$ connected to the memory cell MC of which threshold voltage is adjusted among the plurality of selected memory cells MC. The voltage $V_{DD}$ is supplied to a bit line $BL_P$ connected to the memory cell MC of which threshold voltage is not adjusted among the plurality of selected memory cells MC. For example, as described with reference to FIGS. 19 and 20, data to be written by the write operation is stored in the latch portion SDLP in the sense amplifier module SAM. In this state, when the states of the signal lines STB, XXL, BLC, BLS, HLL, and BLX described with reference to FIG. 7 are set to "L, L, H, H, L, and H", the voltage $V_{SRC}$ is supplied to the bit line $BL_W$, and the voltage $V_{DD}$ is supplied to bit line $BL_P$. Hereinafter, among the plurality of selected memory cells MC, the memory cells MC of which threshold voltage is adjusted may be referred to as a "write memory cell MC", and the memory cells MC of which threshold voltage is not adjusted may be referred to as a "inhibited memory cell MC".

In the program operation, the voltage $V_{SGD}$ is supplied to the drain-side select gate line SGD.

The voltage $V_{SGD}$ is larger than the voltage $V_{SRC}$. A voltage difference between the voltage $V_{SGD}$ and the voltage $V_{SRC}$ is larger than the threshold voltage when the drain-side select transistor STD functions as an NMOS transistor. Therefore, an electron channel is formed in the channel region of the drain-side select transistor STD connected to the bit line $BL_W$, and the voltage $V_{SRC}$ is transferred.

On the other hand, a voltage difference between the voltage $V_{SGD}$ and the voltage $V_{DD}$ is smaller than the threshold voltage when the drain-side select transistor STD functions as an NMOS transistor. Therefore, the drain-side select transistor STD connected to the bit line $BL_P$ is turned OFF.

In the program operation, the voltage $V_{SRC}$ is supplied to the source line SL and the ground voltage $V_{SS}$ is supplied to the source-side select gate line SGS. With this, the source-side select transistor STS is turned OFF.

In the program operation, a write pass voltage $V_{PASS}$ is supplied to the unselected word line $WL_U$. The write pass voltage $V_{PASS}$ is larger than the read pass voltage $V_{READ}$. A voltage difference between the write pass voltage $V_{PASS}$ and the voltage $V_{SRC}$ is larger than the threshold voltage when the memory cell MC functions as an NMOS transistor, regardless of the data stored in the memory cell MC. Therefore, an electron channel is formed in the channel region of the unselected memory cell MC, and the voltage $V_{SRC}$ is transferred to the write memory cell MC.

In the program operation, the program voltage VPGM is supplied to the selected word line $WL_S$. The program voltage VPGM is larger than the write pass voltage $V_{PASS}$.

Here, the voltage $V_{SRC}$ is supplied to the channel of the semiconductor pillar 120 connected to the bit line $BL_W$. A relatively large electric field is generated between this semiconductor pillar 120 and the selected word line $WL_S$. As a result, electrons in the channel of the semiconductor pillar 120 tunnel into the charge storage film 132 (see FIG. 5) via the tunnel insulating film 131 (see FIG. 5). With this, the threshold voltage of the write memory cell MC increases.

On the other hand, the channel of the semiconductor pillar 120 connected to the bit line $BL_P$ is in an electrically floating state, and a potential of this channel rises to about the write pass voltage $V_{PASS}$ due to capacitive coupling with the unselected word line $WL_U$. Only an electric field smaller than the electric field described above is generated between this semiconductor pillar 120 and the selected word line $WL_S$. Therefore, electrons in the channel of the semiconductor pillar 120 do not tunnel into the charge storage film 132 (see FIG. 5). Therefore, the threshold voltage of the inhibited memory cell MC does not increase.

Figure 22:
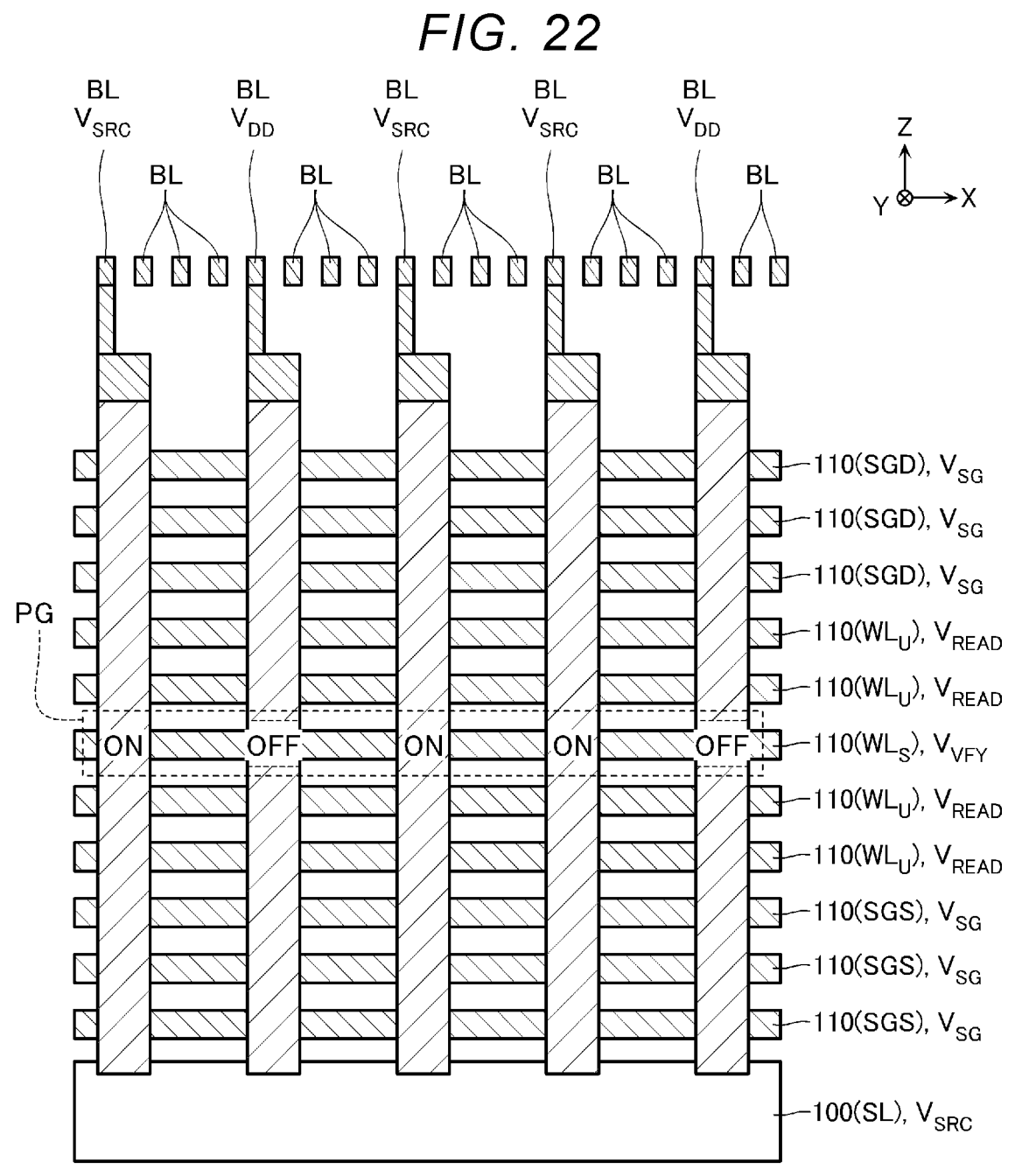

FIG. 22 is a schematic cross-sectional view diagram illustrating the verification operation.

The verification operation is basically executed in the same manner as the read operation.

However, in the verification operation, the selected word line $WL_S$ is supplied with a verification voltage VVFY instead of the read voltage $V_{CGR}$. FIG. 9 shows the example in which the memory cell MC stores 1 bit of data. The verification voltage supplied to the selected word line $WL_S$ may be the verification voltages $V_{VFYA}$ to $V_{VFYC}$ described with reference to FIG. 10A, or the verification voltages $V_{VFY1}$ to $V_{VFY15}$ described with reference to FIG. 11A. For example, as described with reference to FIGS. 10A and 10B, when storing 2 bits of data in the memory cell MC, the verification voltages $V_{VFYA}$ to $V_{VFYC}$ are appropriately supplied to the selected word line $WL_S$.

In the read operation, for example, the voltage $V_{DD}$ is supplied to all bit lines BL corresponding to the page PG. On the other hand, in the verification operation, for example, the voltage $V_{DD}$ may be supplied to the bit line BL connected to the memory cell MC corresponding to a specific state and the voltage $V_{SRC}$ may be supplied to the other bit lines BL, based on the data in the latch circuits DL0 to DLnL.

Execution Order of Write Operations

Figure 23:
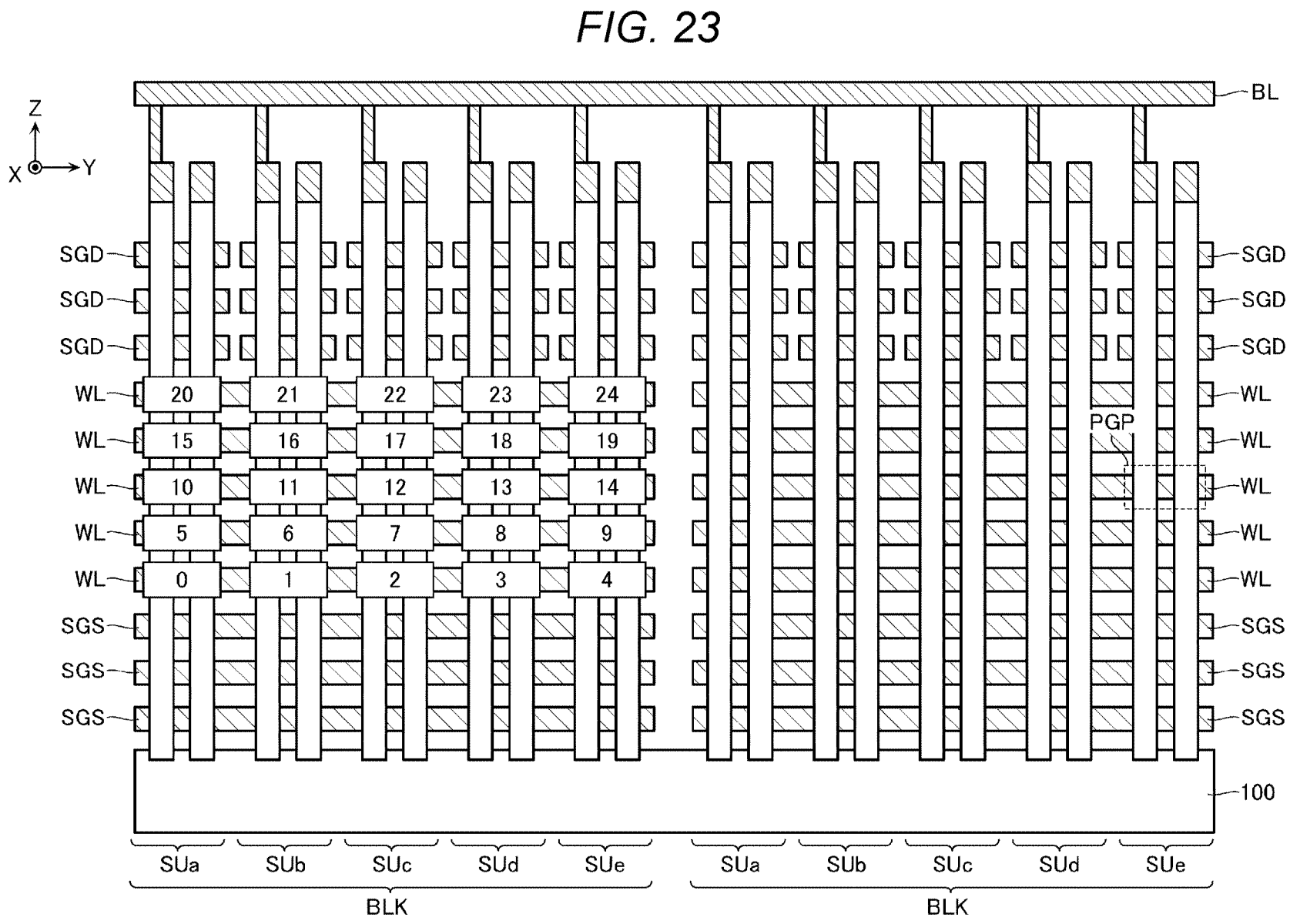
Figure 24:
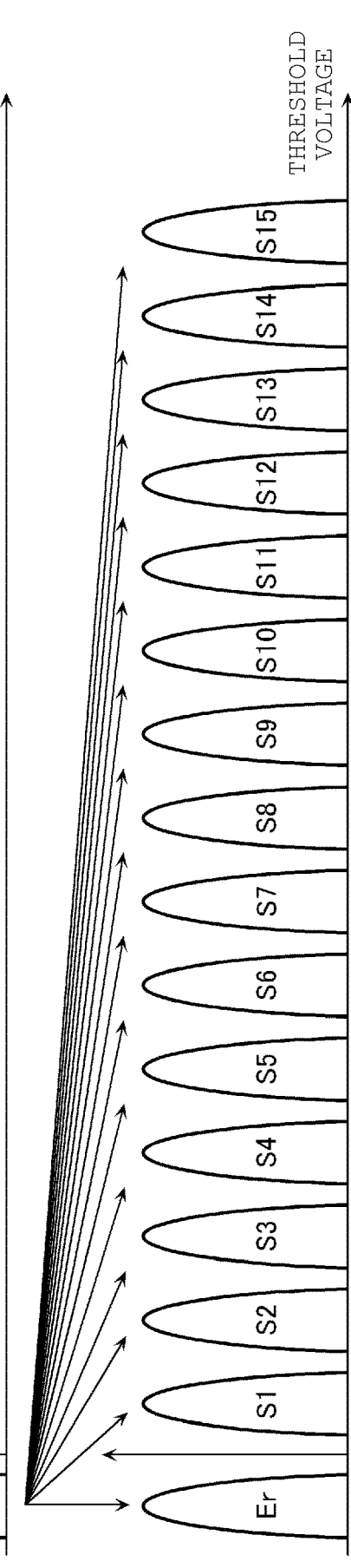
FIG. 24 is a schematic histogram illustrating the execution order of the write operations.

Next, an execution order of the write operations will be described. FIG. 23 is a schematic cross-sectional view diagram illustrating the execution order of the write operations. FIG. 24 is a schematic histogram illustrating the execution order of the write operations. The horizontal axis represents the voltage of the word line WL, and the vertical axis represents the number of memory cells MC.

FIG. 23 illustrates two memory blocks BLK. In the example of FIG. 23, the memory block BLK includes five word lines WL and five string units SUa to SUe. Therefore, in the example of FIG. 23, the memory block BLK includes 25 page portions PGP. For example, as shown in FIG. 11, when the memory cell MC stores 4 bits of data, the memory block BLK stores data corresponding to 100 pages PG.

Furthermore, FIG. 23 illustrates the execution order of the write operations. In the example of FIG. 23, first, the write operations are sequentially executed on five page portions PGP corresponding to the first word line WL counting from the bottom. In each write operation, as shown in FIG. 24, data corresponding to four pages PG is collectively stored in the page portion PGP which is in the erased state. That is, the memory cell MC corresponding to the lower state (Er state and S0 state) is controlled into 16 states by one write operation. Next, the write operations are sequentially executed on the five page portions PGP corresponding to the second word line WL counting from the bottom. Similarly, the write operations are sequentially executed on 15 page portions PGP corresponding to the third to fifth word lines WL counting from the bottom.

Here, the larger the number of pieces of data stored in the memory cell MC, the smaller a voltage margin between the states. For example, as shown in FIG. 9, when the memory cell MC stores 1 bit of data, a voltage margin between the threshold voltage distribution corresponding to the lower state and the threshold voltage distribution corresponding to the upper state is relatively large. On the other hand, as shown in FIG. 11, when the memory cell MC stores 4 bits of data, a voltage margin between the threshold voltage distribution corresponding to the S1 state and the threshold voltage distribution corresponding to the S2 state is relatively small. If the voltage margin is small, for example, when the threshold voltage of the memory cell MC fluctuates, there is a risk that a rate of erroneous reading may increase.

Here, when the write operations are executed in the order described with reference to FIG. 23, for example, during the fifth to ninth write operations (write operation to the five page portions PGP corresponding to the second word line WL counting from the bottom), the threshold voltage of the memory cells MC corresponding to the zeroth to fourth write operations (write operation to five page portions PGP corresponding to the first word line WL counting from the bottom) may increase. This is thought to be caused by, for example, the accumulation of electrons in the charge storage film 132 even in the vicinity of the conductive layer 110 provided in the lower part due to the supply of the program voltage VPGM to the conductive layer 110 provided in the upper part when assuming two conductive layers 110 (word line WL) arranged in the Z-direction as shown in FIG. 5.

Such an increase in the threshold voltage can be significantly prevented by, for example, executing the write operation of data corresponding to the lower page and the middle page (hereinafter referred to as an "MLC write operation") and the write operation of data corresponding to the upper page and the top page (hereinafter referred to as a "Fine write operation") separately. Such a method will be described below.

Figure 25:
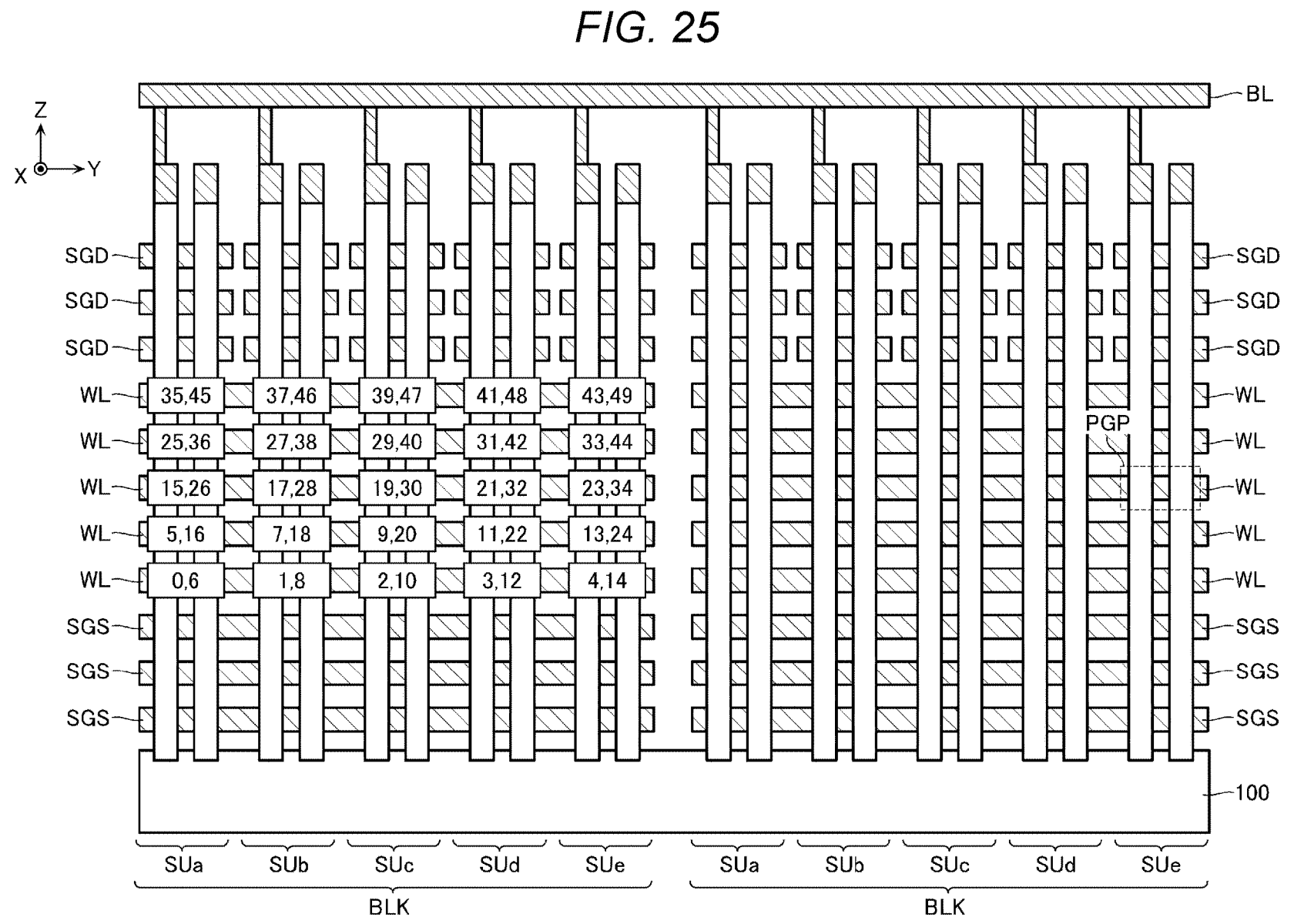
Figure 26:
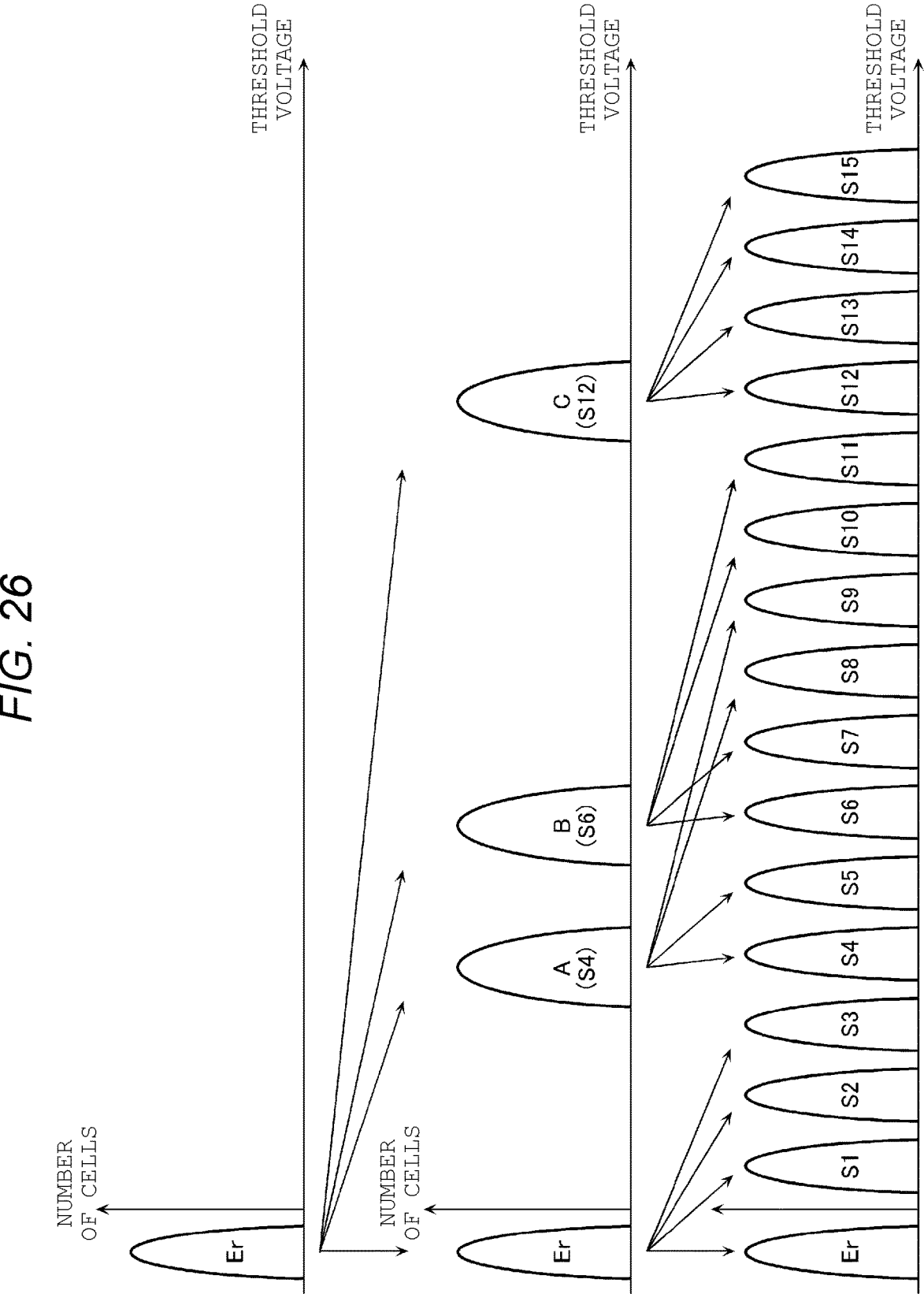
FIG. 26 is a schematic histogram illustrating the other execution order of the write operations.

FIG. 25 is a schematic cross-sectional view diagram illustrating another execution order of the write operations. FIG. 26 is a schematic histogram illustrating the other execution order of the write operations. The horizontal axis represents the voltage of the word line WL, and the vertical axis represents the number of memory cells MC.

FIG. 25 illustrates the other execution order of the write operations.

In the example of FIG. 25, first, the MLC write operation is sequentially executed on five page portions PGP corresponding to the first word line WL counting from the bottom. In the MLC write operation, as shown in FIG. 26, data corresponding to two pages PG is stored in the page portion PGP which is in the erased state. That is, the memory cell MC corresponding to the lower state (Er state and S0 state) is controlled into four states.

Next, the MLC write operation is executed on the page portion PGP corresponding to the second word line WL counting from the bottom and the string unit SUa. Next, the Fine write operation is executed on the page portion PGP corresponding to the first word line WL counting from the bottom and the string unit SUa. Next, the MLC write operation is executed on the page portion PGP corresponding to the second word line WL counting from the bottom and the string unit SUb. Next, the Fine write operation is executed on the page portion PGP corresponding to the first word line WL counting from the bottom and the string unit SUb. Similarly, the execution of the MLC write operation on the page portion PGP corresponding to the second word line WL counting from the bottom and the execution of the Fine write operation on the page portion PGP corresponding to the first word line WL counting from the bottom are performed alternately.

Similarly, the execution of the MLC write operations on the page portions PGP corresponding to the third to fifth word lines WL counting from the bottom and the execution of the Fine write operations on the page portions PGP corresponding to the second to fourth word lines WL counting from the bottom are performed alternately. Next, the Fine write operation is sequentially executed on the five page portions PGP corresponding to the fifth word line WL counting from the bottom.

Here, when the write operations are executed in the order described with reference to FIG. 25, for example, during the fifth write operation (MLC write operation to the page portion PGP corresponding to the second word line WL counting from the bottom), the threshold voltages of the memory cells MC corresponding to the zeroth write operation (MLC write operation to the page portion PGP corresponding to the first word line WL counting from the bottom) may increase. However, the final threshold voltages of these memory cells MC can be adjusted by the Fine write operation.

Further, for example, during the sixteenth write operation (Fine write operation to the page portion PGP corresponding to the second word line WL counting from the bottom), the threshold voltages of the memory cells MC corresponding to the sixth write operation (Fine write operation to the page portion PGP corresponding to the first word line WL counting from the bottom) may increase. However, compared to the write operation described with reference to FIG. 24, the Fine write operation has less influence on the unselected page portion PGP adjacent to the selected page portion PGP in the Z-direction.

To address such issues, in the memory system 10 according to the first embodiment, the write operations are executed in the order described with reference to FIGS. 25 and 26.

Data Processing Executed During the MLC Write Operation

Figure 27:
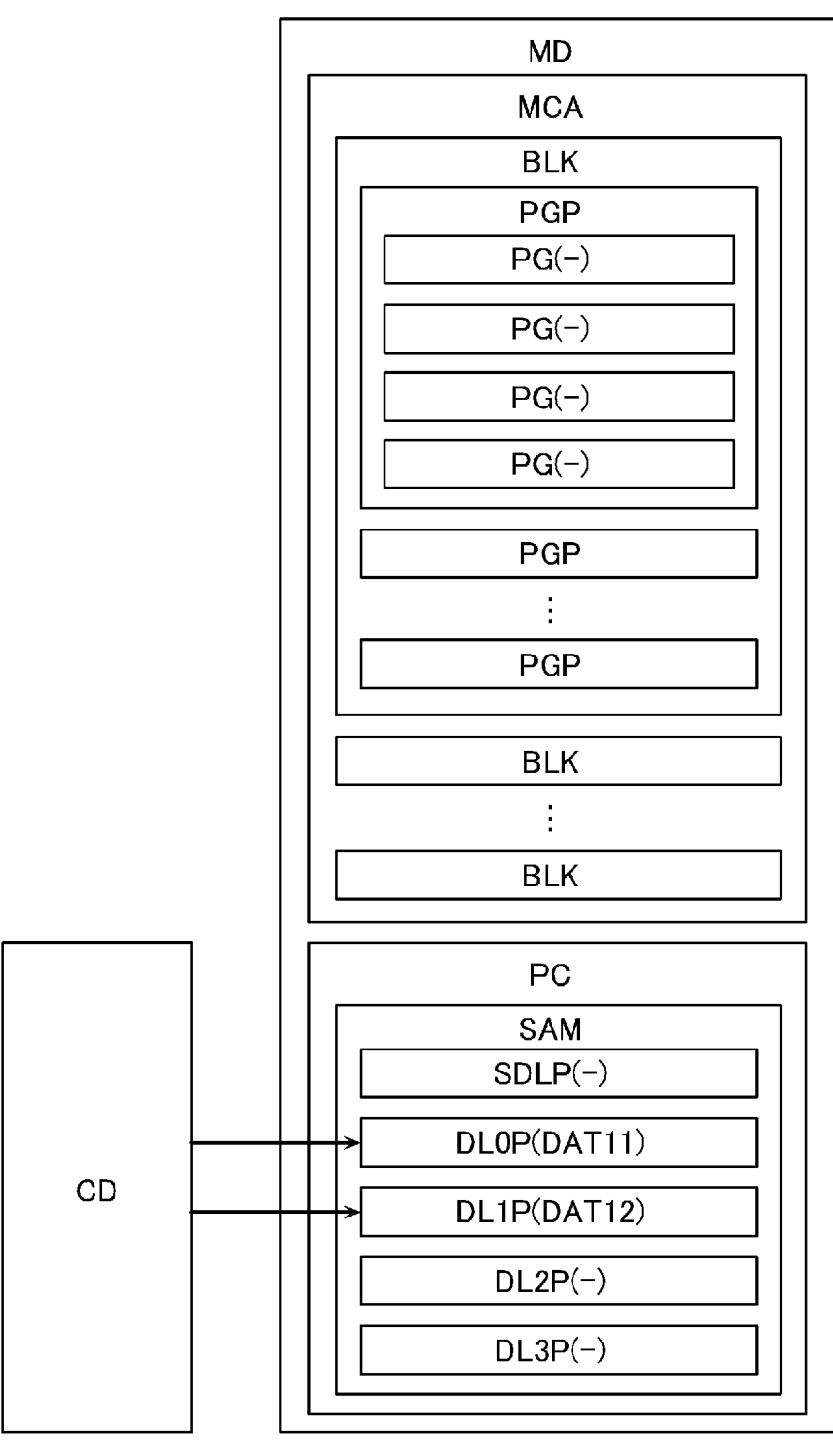
FIG. 27 is a schematic block diagram illustrating data processing executed during an MLC write operation.

FIG. 27 is a schematic block diagram illustrating data processing executed during the MLC write operation. As shown in FIG. 27, during the MLC write operation, data DAT11 corresponding to the lower page and data DAT12 corresponding to the middle page are input from the controller CD to the memory die MD. In the example of FIG. 27, these data DAT11 and DAT12 are stored in the latch portions DL0P and DL1P, respectively.

FIG. 28 is a timing chart illustrating the data processing in FIG. 27.

FIG. 28 illustrates two command sets input to the memory die MD during the data processing in FIG. 27. One of the two command sets corresponds to data DAT11 corresponding to the lower page. The other of the two command sets corresponds to data DAT12 corresponding to the middle page.

The command set corresponding to data DAT11 is basically the same as the command set CS$_W$ described with reference to FIG. 17. However, this command set includes data A1h and 01h that are input before data 80h is input. Data 1Ah is included instead of data 10h. Data A1h is a command designating the MLC write operation, or the read operation to the page portion PGP for which the MLC write operation is executed and the Fine write operation is not executed. Data 01h is a command input when designating the lower page. Data 1Ah is a command indicating that the input of a command set related to the write operation is completed and that a further command set is to be input continuously.

When the command set corresponding to data DAT11 is input, the terminal RY//BY changes from the "H" state to the "L" state, and access to the memory die MD is prohibited. Data processing regarding data DAT11 is executed over a time TBD. For example, data DAT11 is transferred to the latch portion DL0P.

The command set corresponding to data DAT12 is basically the same as the command set $CS_W$ described with reference to FIG. 17. However, this command set includes data A1*h* and 02*h* that are input before data 80*h* is input. Data 02*h* is a command input when designating the middle page.

When the command set corresponding to data DAT12 is input, the terminal RY//BY changes from the "H" state to the "L" state, and access to the memory die MD is prohibited. The MLC write operation is executed over a time tPROG.

Example of Using Internal Data During the Fine Write Operation

Figure 29:
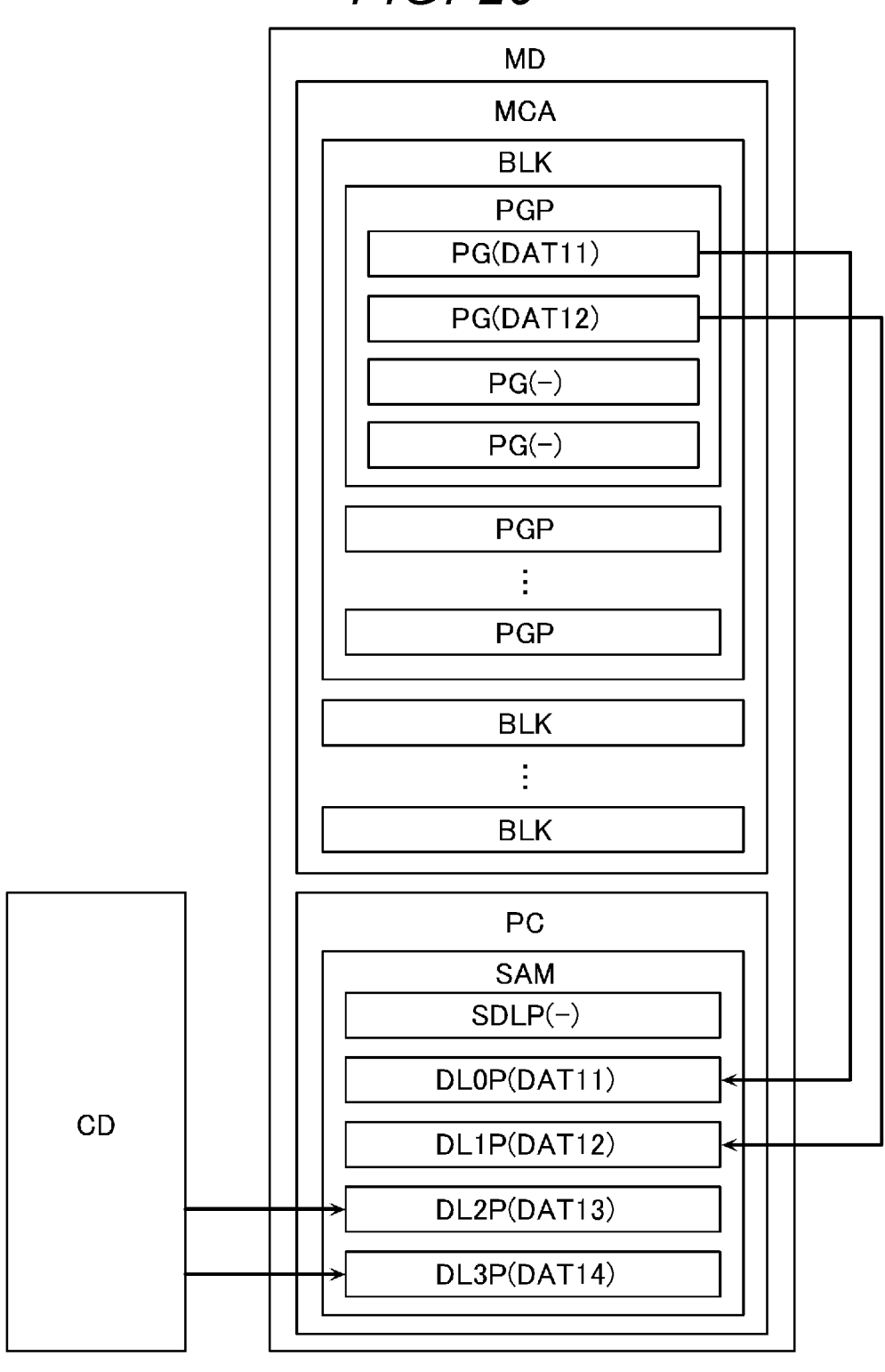
FIG. 29 is a schematic block diagram illustrating an example of data processing executed during a Fine write operation.

FIG. 29 is a schematic block diagram illustrating an example of data processing executed during the Fine write operation. During the Fine write operation, data in the memory die MD (hereinafter sometimes referred to as "internal data") may be used. For example, as shown in FIG. 29, during the Fine write operation, data DAT11 and DAT12 may be read from the lower page and the middle page of the page portion PGP that is a target of the write operation, and these data DAT11 and DAT12 may be stored in the latch portions DL0P and DL1P. Data DAT13 corresponding to the upper page and data DAT14 corresponding to the top page are input from the controller CD to the memory die MD. In the example of FIG. 29, these pieces of data DAT13 and DAT14 are stored in the latch portions DL2P and DL3P, respectively.

Figure 30:
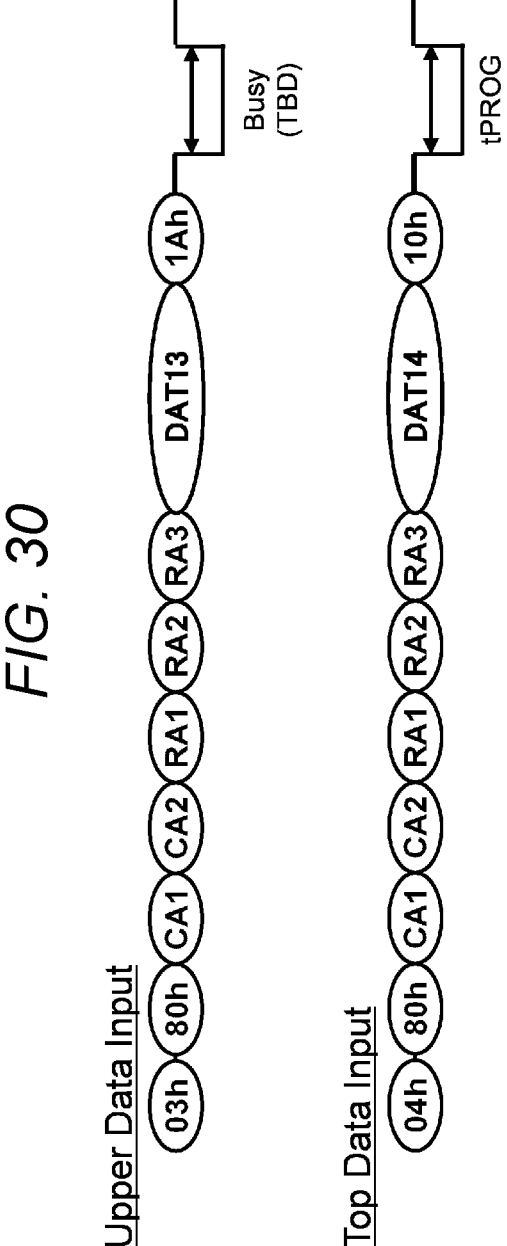
FIG. 30 is a timing chart illustrating the data processing in FIG. 29.

FIG. 30 is a timing chart illustrating the data processing in FIG. 29.

FIG. 30 illustrates two command sets input to the memory die MD during the data processing in FIG. 29. One of the two command sets corresponds to data DAT13 corresponding to the upper page. The other of the two command sets corresponds to data DAT14 corresponding to the top page.

The command set corresponding to data DAT13 is basically the same as the command set $CS_W$ described with reference to FIG. 17. However, this command set includes data 03*h* that is input before data 80*h* is input. Data 1Ah is included instead of data 10*h*. Data 03*h* is a command input when designating the upper page.

When the command set corresponding to data DAT13 is input, the terminal RY//BY changes from the "H" state to the "L" state, and access to the memory die MD is prohibited. Data processing regarding data DAT13 is executed over the time TBD. For example, data DAT13 is transferred to the latch portion DL2P.

The command set corresponding to data DAT14 is basically the same as the command set $CS_W$ described with reference to FIG. 17. However, this command set includes data 04*h* that is input before data 80*h* is input. Data 04*h* is a command input when designating the top page.

When the command set corresponding to data DAT14 is input, the terminal RY//BY changes from the "H" state to the "L" state, and access to the memory die MD is prohibited. The Fine write operation is executed over the time tPROG.

Example of Inputting External Data During the Fine Write Operation

Figure 31:
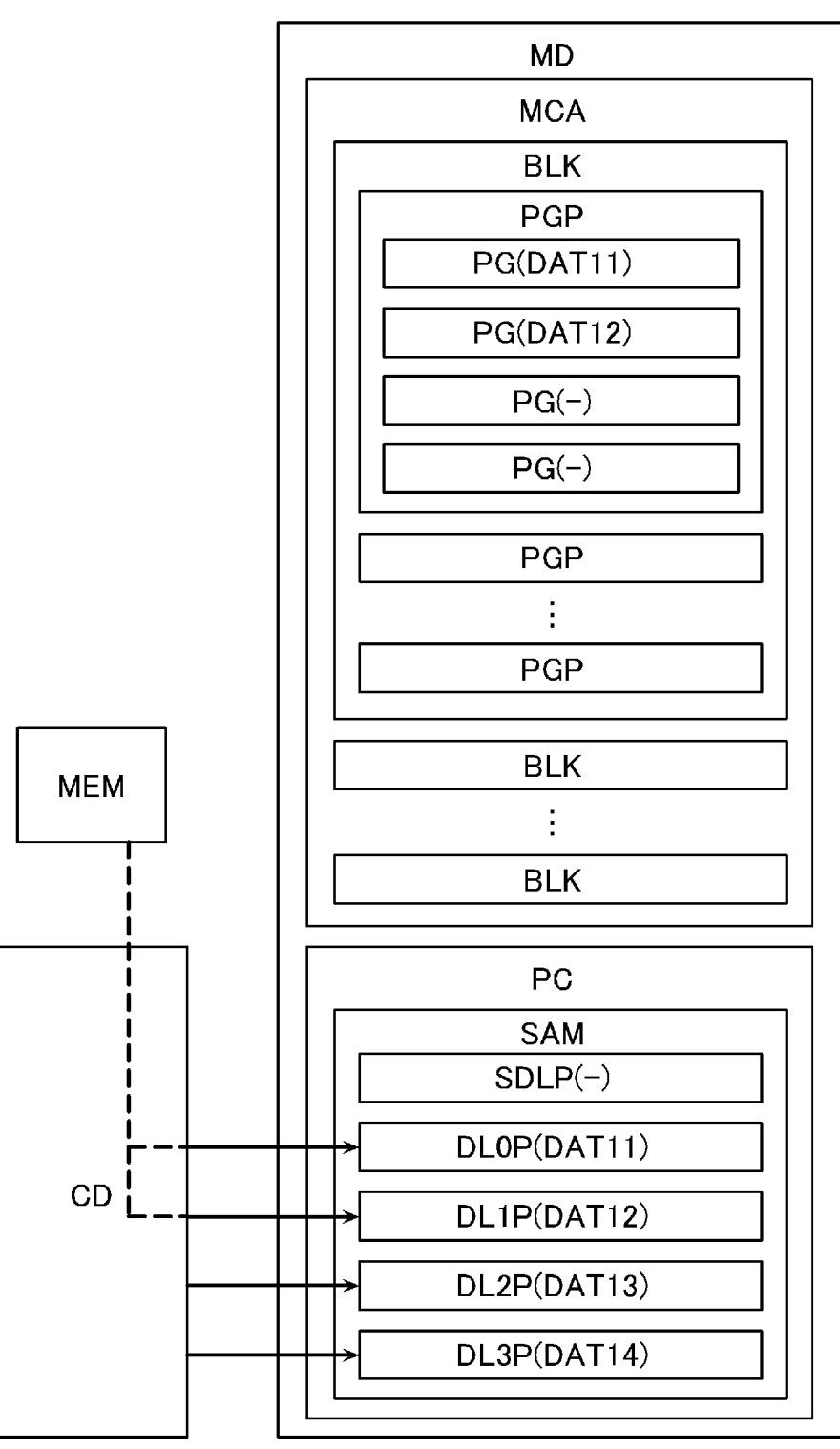
FIG. 31 is a schematic block diagram illustrating another example of the data processing executed during the Fine write operation.

FIG. 31 is a schematic block diagram illustrating another example of the data processing executed during the Fine write operation. In the following description, description of aspects similar to the example of FIG. 29 will be omitted.

During the Fine write operation, data outside the memory die MD (hereinafter sometimes referred to as "external data") may be input to the memory die MD and used. For example, as shown in FIG. 31, the controller CD may store data DAT11 and DAT12, that are written by the MLC write operation and for which the Fine write operation to the corresponding page portion PGP is not completed, in the storage device MEM. During the Fine write operation, data DAT11 and DAT12 may be read from the storage device MEM, and these data DAT11 and DAT12 may be stored in the latch portions DL0P and DL1P.

Figure 32:
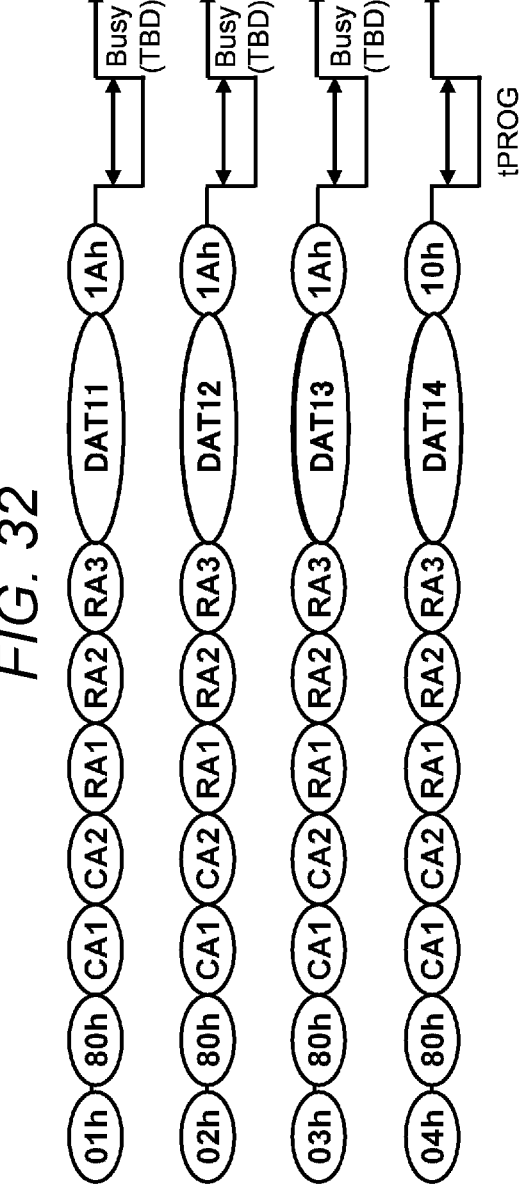
FIG. 32 is a timing chart illustrating the data processing in FIG. 31.

FIG. 32 is a timing chart illustrating the data processing in FIG. 31.

FIG. 32 illustrates four command sets input to the memory die MD during the data processing in FIG. 31. The four command sets correspond to data DAT11 to DAT14, respectively.

The command set corresponding to data DAT11 is basically the same as the first command set described with reference to FIG. 28. However, this command set does not include data A1*h*.

When the command set corresponding to data DAT11 is input, the terminal RY//BY changes from the "H" state to the "L" state, and access to the memory die MD is prohibited. Data processing regarding data DAT11 is executed over the time TBD.

The command set corresponding to data DAT12 is basically the same as the second command set described with reference to FIG. 28. However, this command set does not include data A1*h*. Data 1Ah is included instead of data 10*h*.

When the command set corresponding to data DAT12 is input, the terminal RY//BY changes from the "H" state to the "L" state, and access to the memory die MD is prohibited. Data processing regarding data DAT12 is executed over the time TBD. For example, data DAT12 is transferred to the latch portion DL1P.

The command set corresponding to data DAT13 is the same as the first command set described with reference to FIG. 30.

When the command set corresponding to data DAT13 is input, the terminal RY//BY changes from the "H" state to the "L" state, and access to the memory die MD is prohibited. Data processing regarding data DAT13 is executed over the time TBD.

The command set corresponding to data DAT14 is the same as the second command set described with reference to FIG. 30.

When the command set corresponding to data DAT14 is input, the terminal RY//BY changes from the "H" state to the "L" state, and access to the memory die MD is prohibited. The Fine write operation is executed over the time tPROG.

Another Example of Inputting External Data During the Fine Write Operation

Figure 33:
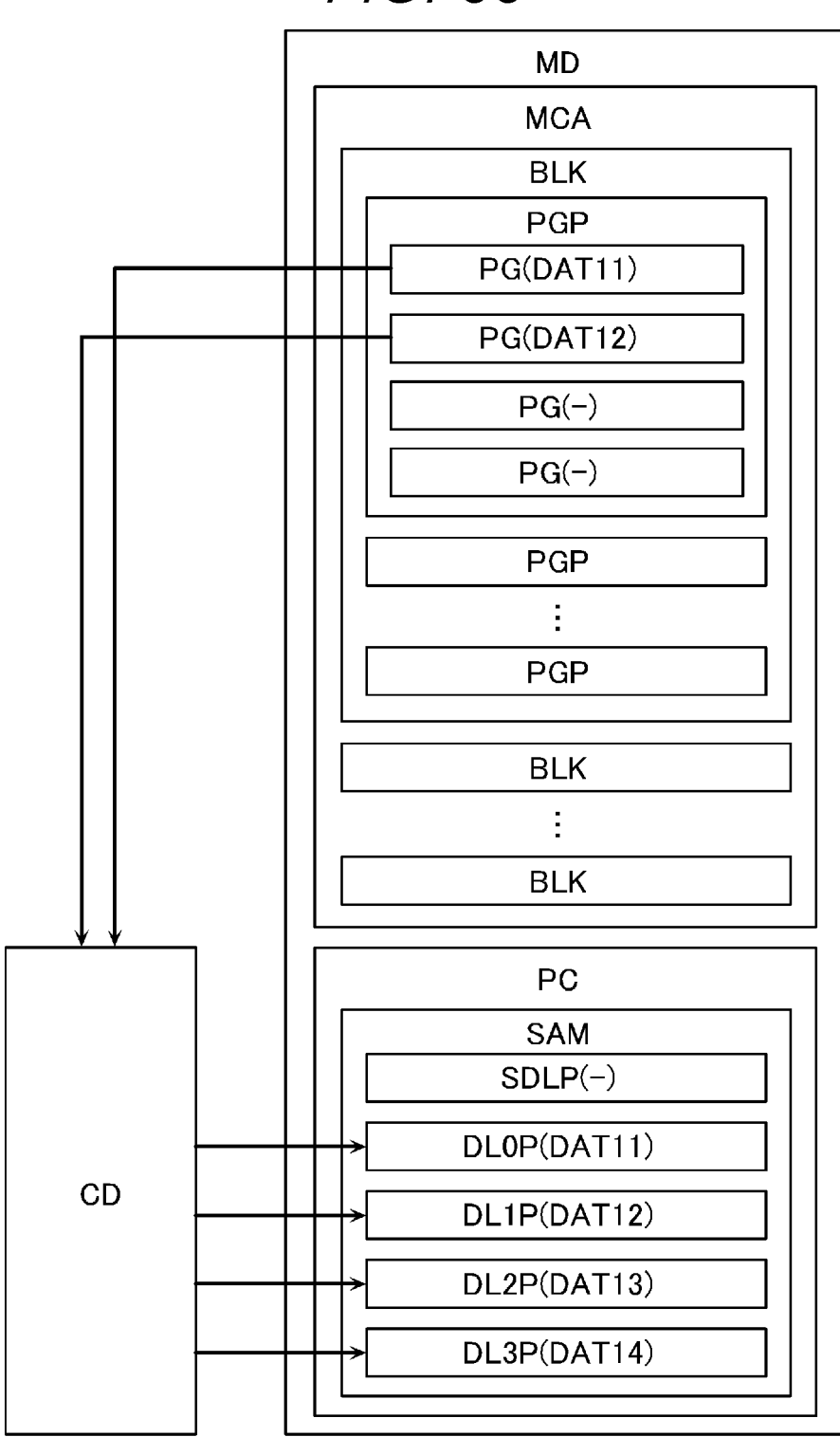
FIG. 33 is a schematic block diagram illustrating still another example of the data processing executed during the Fine write operation.

FIG. 33 is a schematic block diagram illustrating still another example of the data processing executed during the Fine write operation. In the following description, description of aspects similar to the example of FIG. 29 will be omitted.

As shown in FIG. 33, during the Fine write operation, data DAT11 and DAT12 may be read from the lower page and the middle page of the page portion PGP that is the target of the write operation, and these pieces of data DAT11 and DAT12 may be input to the controller CD. The controller CD may perform processing such as bit error detection/correction on these data DAT11 and DAT12 by the ECC processing unit 64 (see FIG. 8). Further, these pieces of data DAT11 and DAT12 may be input to the memory die MD as external data and stored in the latch portions DL0P and DL1P.

Figure 34:
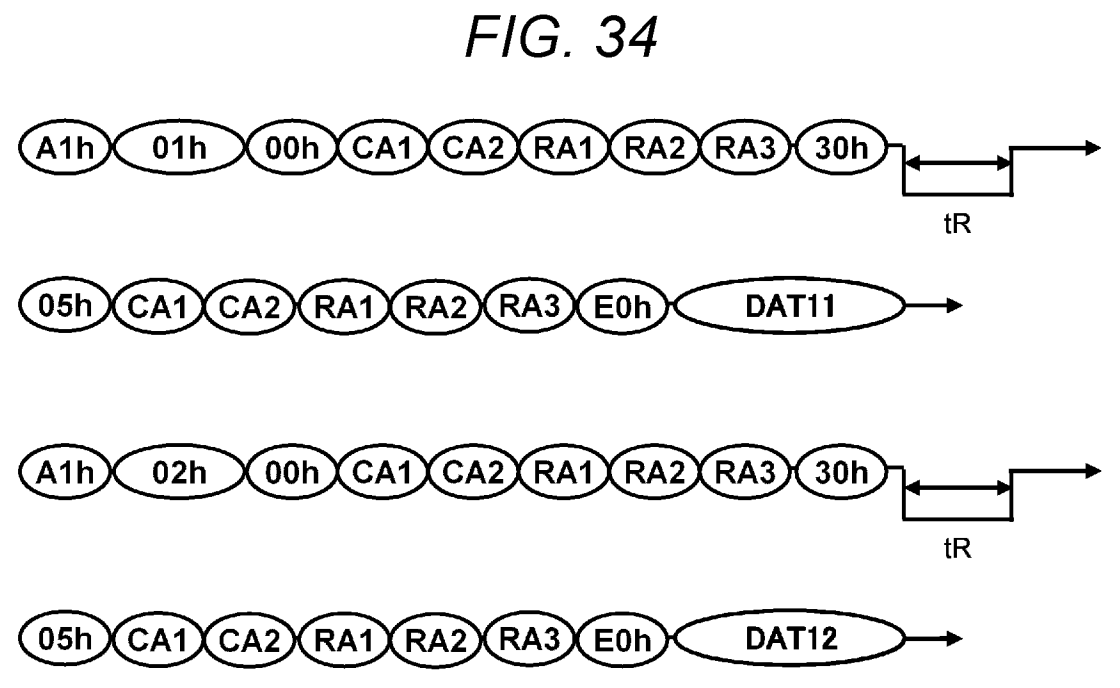

FIG. 34 is a timing chart illustrating the data processing in FIG. 33. In the data processing in FIG. 33, the processing corresponding to FIG. 34 is executed, and then the processing described with reference to FIG. 32 is executed.

FIG. 34 illustrates four command sets input to the memory die MD during the data processing in FIG. 33. The four command sets correspond to the read operation of data DAT11, the data output operation of data DAT11, the read operation of data DAT12, and the data output operation of data DAT12, respectively.

The command set corresponding to the read operation of data DAT11 is basically the same as the command set $CS_R$ described with reference to FIG. 12. However, this command set includes data A1$h$ and 01$h$ that are input before data 00$h$ is input.

When the command set corresponding to the read operation of data DAT11 is input, the terminal RY//BY changes from the "H" state to the "L" state, and access to the memory die MD is prohibited. Further, the read operation of data DAT11 is executed over a time tR.

The command set corresponding to the data output operation of data DAT11 is the same as the command set $CS_O$ described with reference to FIG. 16.

The command set corresponding to the read operation of data DAT12 is basically the same as the command set $CS_R$ described with reference to FIG. 12. However, this command set includes data A1$h$ and 02$h$ that are input before data 00$h$ is input.

When the command set corresponding to the read operation of data DAT12 is input, the terminal RY//BY changes from the "H" state to the "L" state, and access to the memory die MD s prohibited. Further, the read operation of data DAT12 is executed over the time tR.

The command set corresponding to the data output operation of data DAT12 is the same as the command set $CS_O$ described with reference to FIG. 16.

Processing Executed by the Controller CD During the Execution of the Write Operation The data processing executed during the MLC write operation is described above. As examples of the data processing executed during the Fine write operation, one example in which internal data is used (see FIGS. 29 and 30) as data DAT11 and DAT12 corresponding to the lower page and the middle page, and two examples in which external data is input to the memory die MD (see FIGS. 31 to 34) are described.

Here, in the example of using internal data, the input of data DAT11 and DAT12 is omitted. Therefore, compared to, for example, the examples of FIGS. 31 and 32, the time required to input two command sets including data DAT11 and DAT12 and the time TBD required for data processing are reduced, thereby enabling high-speed processing.

However, for example, when a predetermined period of time elapses after the execution of the MLC write operation, electrons may escape from the charge storage film 132 (see FIG. 5), the threshold voltage of the memory cell MC may decrease, and data fluctuation may occur. When the Fine write operation is executed using internal data (data DAT11 and DAT12) in such a state, there is a risk that erroneous data may be written to some memory cells MC. In this regard, in the examples described with reference to FIGS. 31 and 32, since data DAT11 and DAT12 are stored in the external storage device MEM, data fluctuation can be prevented. Further, in the example described with reference to FIGS. 33 and 34, since data can be corrected by the ECC processing unit 64 (see FIG. 8), it is possible to input the corrected data DAT11 and DAT12 to the memory die MD.

To address such issues, in the present embodiment, when executing the Fine write operation before a threshold time elapses after the MLC write operation is executed, internal data is used. Further, when executing the Fine write operation after the threshold time elapses after the MLC write operation is executed, external data is input to the memory die MD.

With this, it is possible to reduce the time required to write data while preventing deterioration in reliability.

Figure 35:
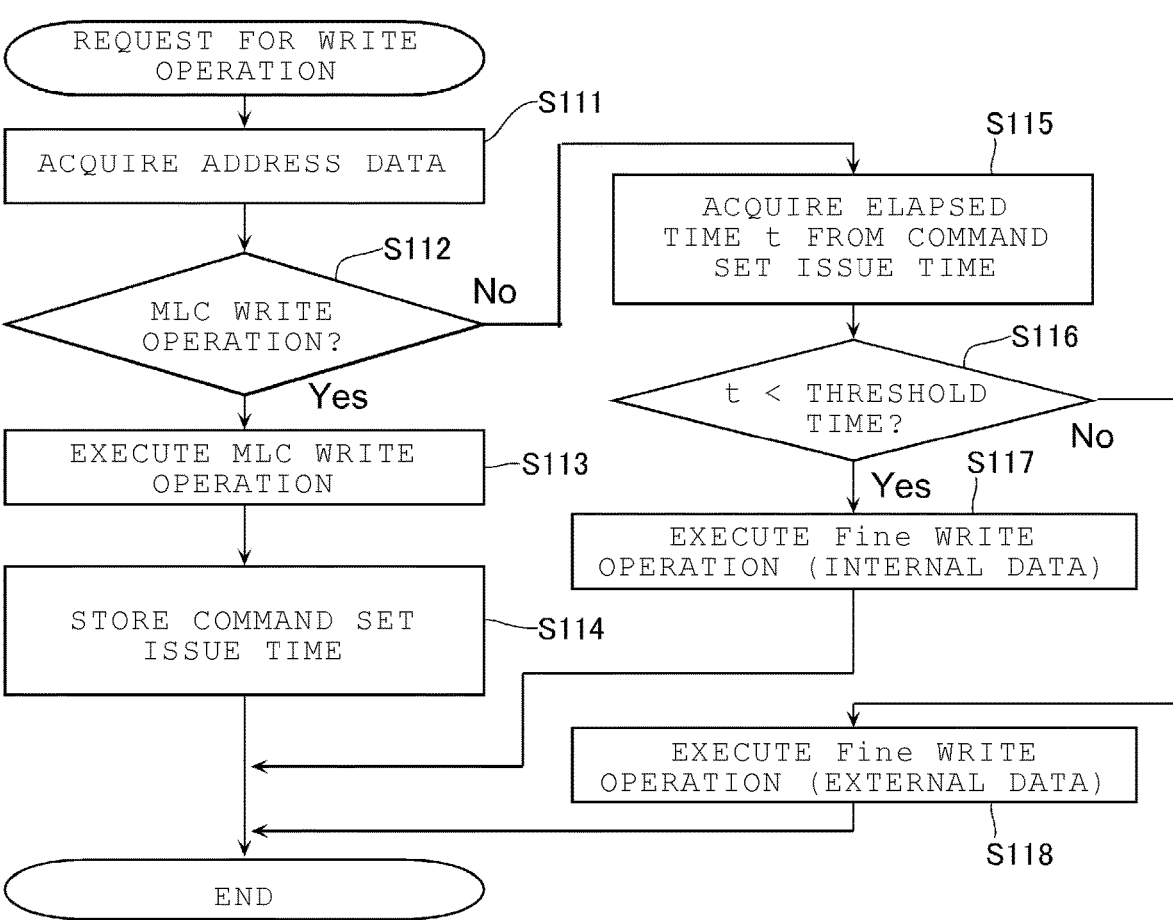
FIG. 35 is a schematic flowchart illustrating an operation of the controller CD according to the first embodiment.

Next, with reference to FIG. 35, an operation of the controller CD when executing the write operation will be described in more detail. FIG. 35 is a schematic flowchart illustrating the operation of the controller CD when executing the write operation. FIG. 35 illustrates the operation of the controller CD when a request for the write operation occurs.

In step S111, address data $D_{ADD}$ of the page portion PGP on which the write operation is to be executed is acquired. For example, when a memory block BLK on which the write operation is being executed exists in the memory cell array MCA, this memory block BLK is selected. For example, when there is no memory block BLK on which the write operation is being executed in the memory cell array MCA, the memory block BLK is selected based on the PECycle storage unit 62 (see FIG. 8) or the like. In the selected memory block BLK, the page portion PGP may be selected in the order described with reference to FIG. 25. In this step, the acquired address data $D_{ADD}$ may be stored in the logical-to-physical address conversion table 60 (see FIG. 8).

In step S112, it is determined whether the write operation to be executed is the MLC write operation. If the write operation to be executed is the MLC write operation, the process proceeds to step S113. If the write operation to be executed is not the MLC write operation, that is, if the write operation to be executed is the Fine write operation, the process proceeds to step S115.

In step S113, the two command sets described with reference to FIG. 28 are input to the memory die MD and the MLC write operation is executed.

In step S114, a time when the command set is issued (hereinafter referred to as a "command set issue time") is stored. The command set issue time may be, for example, a time immediately before issuing the two command sets described with reference to FIG. 28, or may be a time immediately after issuing the two command sets.

In step S115, an elapsed time t from the command set issue time is acquired with reference to the time stored in step S114.

In step S116, it is determined whether the elapsed time t is smaller than the threshold time. If the elapsed time t is smaller than n the threshold time, the process proceeds to step S117. If the elapsed time t is not smaller than the threshold time, the process proceeds to step S118.

In step S117, for example, as described with reference to FIGS. 29 and 30, the Fine write operation is executed using internal data.

In step S118, for example, as described with reference to FIGS. 31 to 34, external data is input to the memory die MD and the Fine write operation is executed.

Second Embodiment

As described above, in the first embodiment, depending on whether the elapsed time t from the execution time of the MLC write operation (command set issue time) is smaller than the threshold time (step S116 in FIG. 35), it is determined whether to use internal data or input external data to the memory die MD during the Fine write operation.

However, such a method is merely an example, and a specific method may be adjusted as appropriate. For example, the number of error bits FBC may be monitored for the page portion PGP on which the MLC write operation is executed and the Fine write operation is not executed. Further, depending on the number of error bits FBC, it may be determined whether to use internal data or input external data to the memory die MD during the Fine write operation.

A memory system according to a second embodiment will be described below with reference to FIGS. 36 and 37. In the following description, the same element as in the first embodiment are denoted by the same reference numerals, and the description thereof will be omitted.

The memory system according to the second embodiment is basically configured similarly to the memory system according to the first embodiment. However, in the second embodiment, instead of the operation described with reference to FIG. 35, an operation described with reference to FIGS. 36 and 37 is executed.

FIG. 36 is a schematic flowchart illustrating the operation of the controller CD when executing patrol read. The patrol read is background processing that is executed at regular intervals when there is no instruction from the host computer 20 (see FIG. 1).

In step S201, read operations of the lower page and the middle page are executed on the page portion PGP on which the MLC write operation is executed and the Fine write operation is not executed. Further, error detection is executed by the ECC processing unit 64 (see FIG. 8), and the number of error bits FBC is calculated.

In step S202, it is determined whether the number of error bits FBC is greater than a threshold value. If the number of error bits FBC is greater than the threshold value, the process proceeds to step S203. If the number of error bits FBC is not greater than the threshold value, the patrol read ends.

In step S203, the page portion PGP on which the read operation is executed in step S201 is marked as a page portion of which reliability deteriorates (hereinafter referred to as a "page portion with deteriorated reliability").

Next, with reference to FIG. 37, the operation of the controller CD when executing the write operation will be described. FIG. 37 is a schematic flowchart illustrating the operation of the controller CD when executing the write operation. FIG. 37 illustrates an example of the operation of the controller CD when a request for the write operation occurs.

Figure 37:
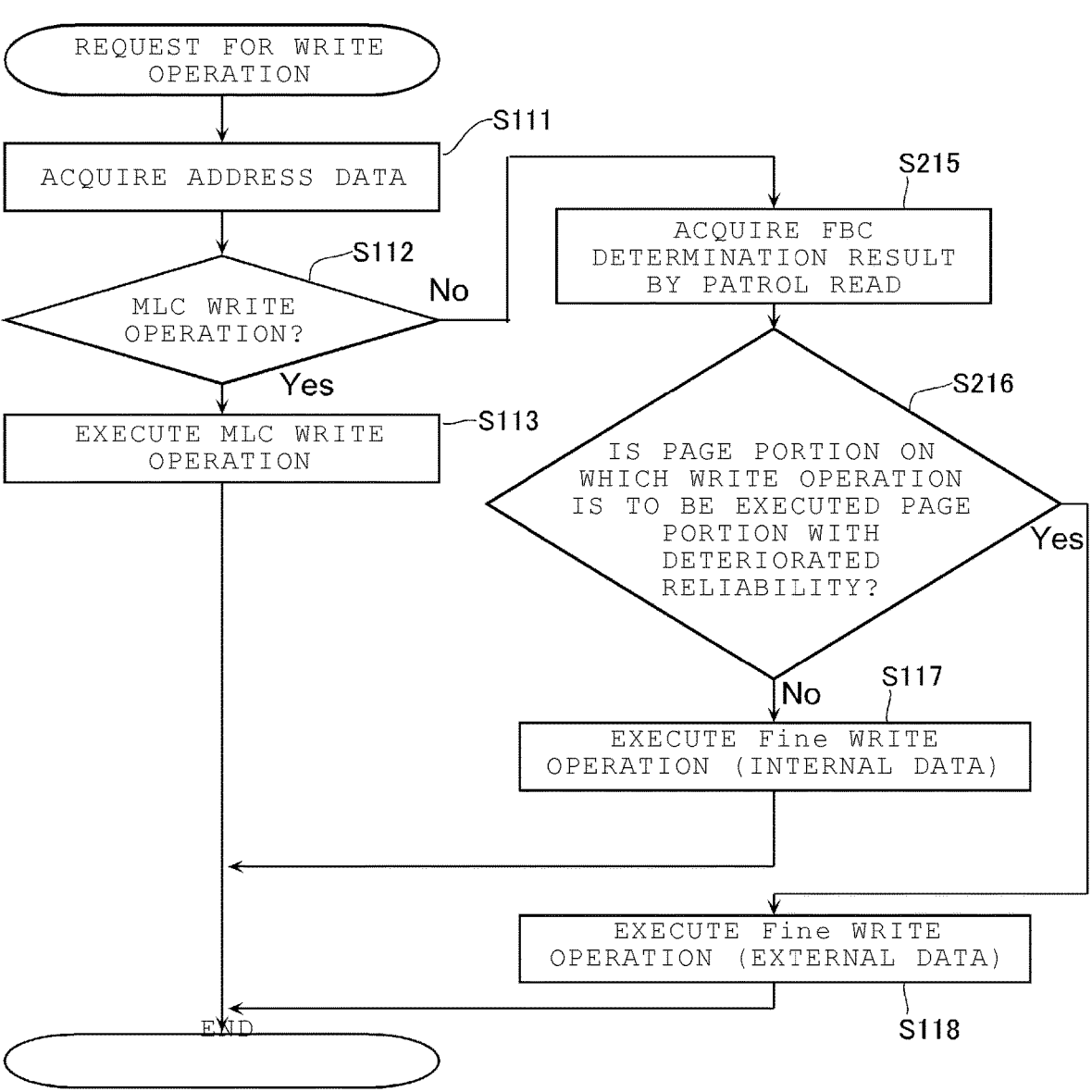
FIG. 37 is another schematic flowchart illustrating the operation of the controller CD according to the second embodiment.

The operation shown in FIG. 37 is basically executed in the same manner as the operation described with reference to FIG. 35. However, in the operation shown in FIG. 37, step S114 in FIG. 35 is not executed. Further, in the operation shown in FIG. 37, steps S215 and S216 are executed instead of steps S115 and S116 in FIG. 35.

In step S215, the result of the determination in step S202 of the patrol read (see FIG. 36), that is, the determination result of whether the page portion PGP on which the write operation is to be executed is the page portion with deteriorated reliability is acquired.

In step S216, it is determined whether the page portion PGP on which the write operation is to be executed is the page portion with deteriorated reliability. If the page portion PGP on which the write operation is to be executed is not the page portion with deteriorated reliability, the process proceeds to step S117. If the page portion PGP on which the write operation is the page portion with deteriorated reliability, the process proceeds to step S118.

Background processing other than the patrol read includes garbage collection (compaction), refresh, and wear-leveling.

The garbage collection is also referred to as compaction. Since the memory die MD has different erase units of data and read/write units of data, when the rewrite of the memory cells MC of the memory die MD progresses, the memory block BLK is fragmented due to invalid data. When the number of such fragmented memory blocks BLK increases, the number of available memory blocks BLK decreases. The garbage collection is a process for increasing the number of available memory blocks BLK, and means, for example, a process of collecting valid data from a plurality of active blocks including valid data and invalid data and rewriting the valid data to another memory block BLK to secure a free block.

The active block indicates a memory block BLK in which valid data is stored. The free block indicates a memory block BLK in which no valid data is stored. After being erased, the free block can be reused as an erased memory block BLK. In the present embodiment, the free block includes both the memory block BLK before erasure in which no valid data is stored and the erased memory block BLK. Valid data is data that is correlated with a logical address, and invalid data is data that is not correlated with the logical address. The erased memory block BLK becomes an active block when data is written thereto.

The refresh is a process in which, for example, when deterioration of data in a certain memory block BLK is detected, such as an increase in the number of corrected bits in error correction processing in the ECC processing unit 64, the data in the memory block BLK is rewritten to another memory block BLK.

The wear-leveling is a process of leveling the number of times of rewrite of the memory block BLK of the memory die MD by, for example, replacing data stored in the memory block BLK having a large number of times of rewrite and number of times of erase of data with data stored in the memory block BLK having a small number of times of rewrite and number of times of erase of data.

Third Embodiment

Next, a memory system according to a third embodiment will be described with reference to FIGS. 38 to 41. In the following description, the same elements as in the first embodiment are denoted by the same reference numerals, and the description thereof will be omitted.

The memory system according to the third embodiment is basically configured similarly to the memory system according to the first embodiment. However, H in the third embodiment, instead of the operation described with reference to FIG. 35, an operation described with reference to FIGS. 38 to 41 is executed.

Figure 38:
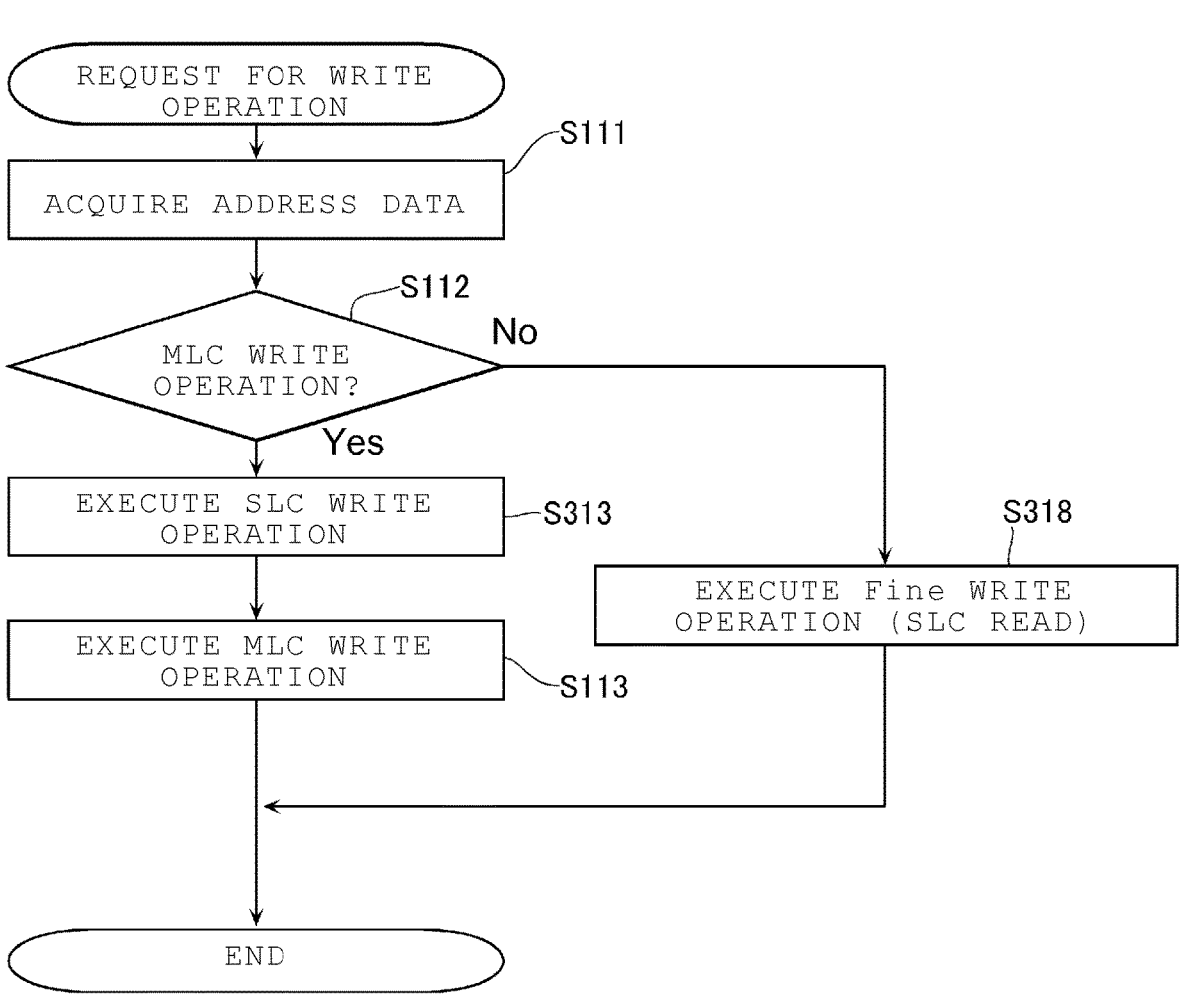
FIG. 38 is a schematic flowchart illustrating an operation of a controller CD according to a third embodiment.

FIG. 38 is a schematic flowchart illustrating the operation of the controller CD when executing the write operation. FIG. 38 illustrates the operation of the controller CD when a request for the write operation occurs.

The operation shown in FIG. 38 is basically executed in the same manner as the operation described with reference to FIG. 35. However, in the operation shown in FIG. 38, steps S114 to S118 in FIG. 35 are not executed. In the operation shown in FIG. 38, step S313 is executed after executing step S112 and before executing step S113. Further, in the operation shown in FIG. 38, step S318 is executed instead of steps S115 to S118 in FIG. 35.

Figure 39:
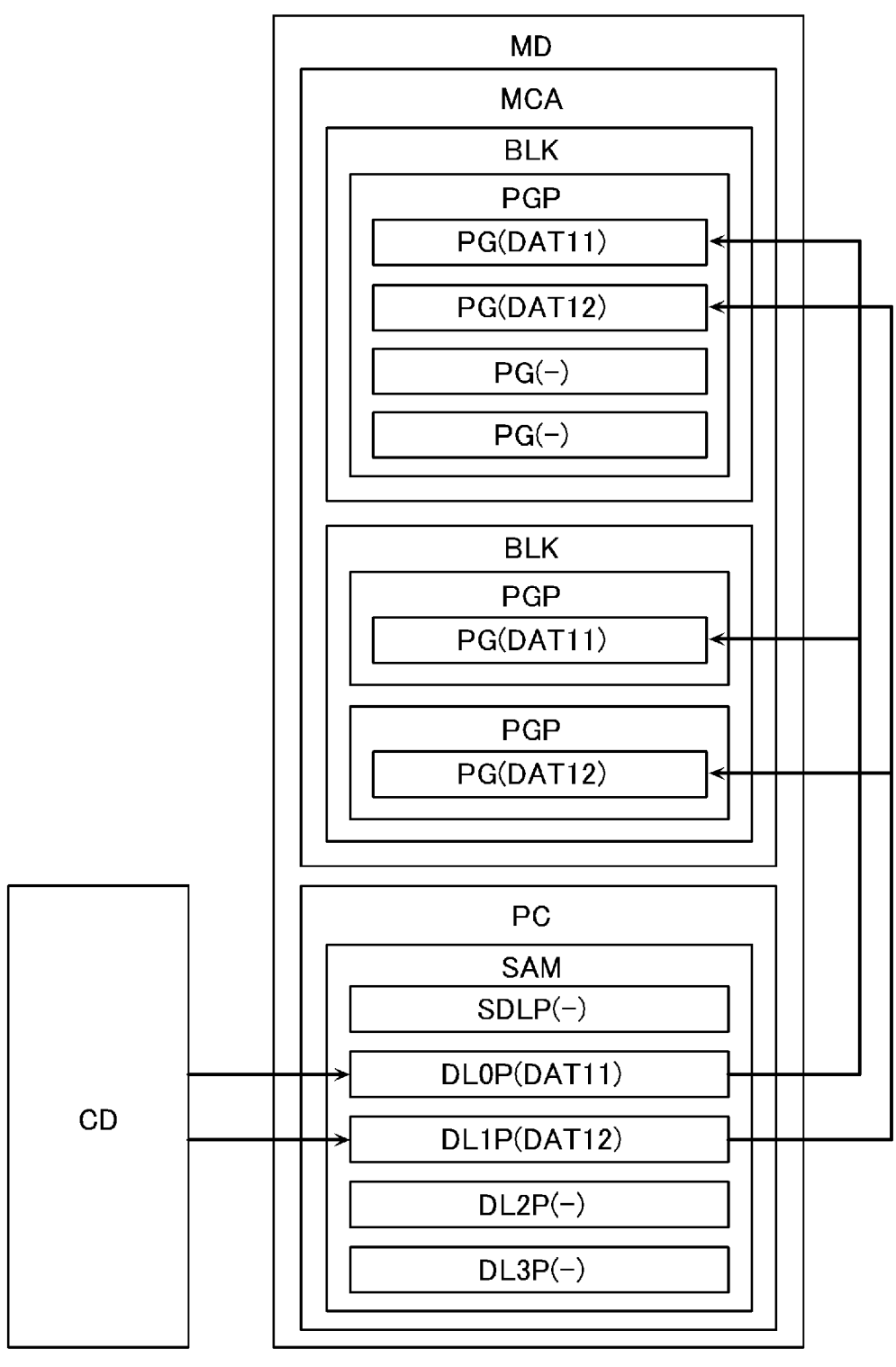
FIG. 39 is a schematic block diagram illustrating data processing executed during an MLC write operation according to the third embodiment.

Next, steps S113 and S313 in FIG. 38 will be described with reference to FIG. 39. FIG. 39 is a schematic block diagram illustrating data processing executed during the MLC write operation.

In step S113 in FIG. 38, as shown in FIG. 39, the MLC write operation is executed on the page portion PGP of the selected memory block BLK, and data DAT11 corresponding to the lower page and data DAT12 corresponding to the middle page are written to the page portion PGP.

In step S313 in FIG. 38, as shown in FIG. 39, data DAT11 corresponding to the lower page is written to the page portion PGP of the memory block BLK different from the selected memory block BLK (memory block BLK including the page portion PGP on which the MLC write operation is executed). Data DAT12 corresponding to the middle page is written to another page portion PGP of this memory block BLK. Each of the plurality of memory cells MC in these two page portions PGP stores 1 bit of data, as described with reference to FIG. 9, for example. Hereinafter, the write operation for storing data by 1 bit in the memory cells MC in the page portion PGP is referred to as an "SLC write operation".

Figure 40:
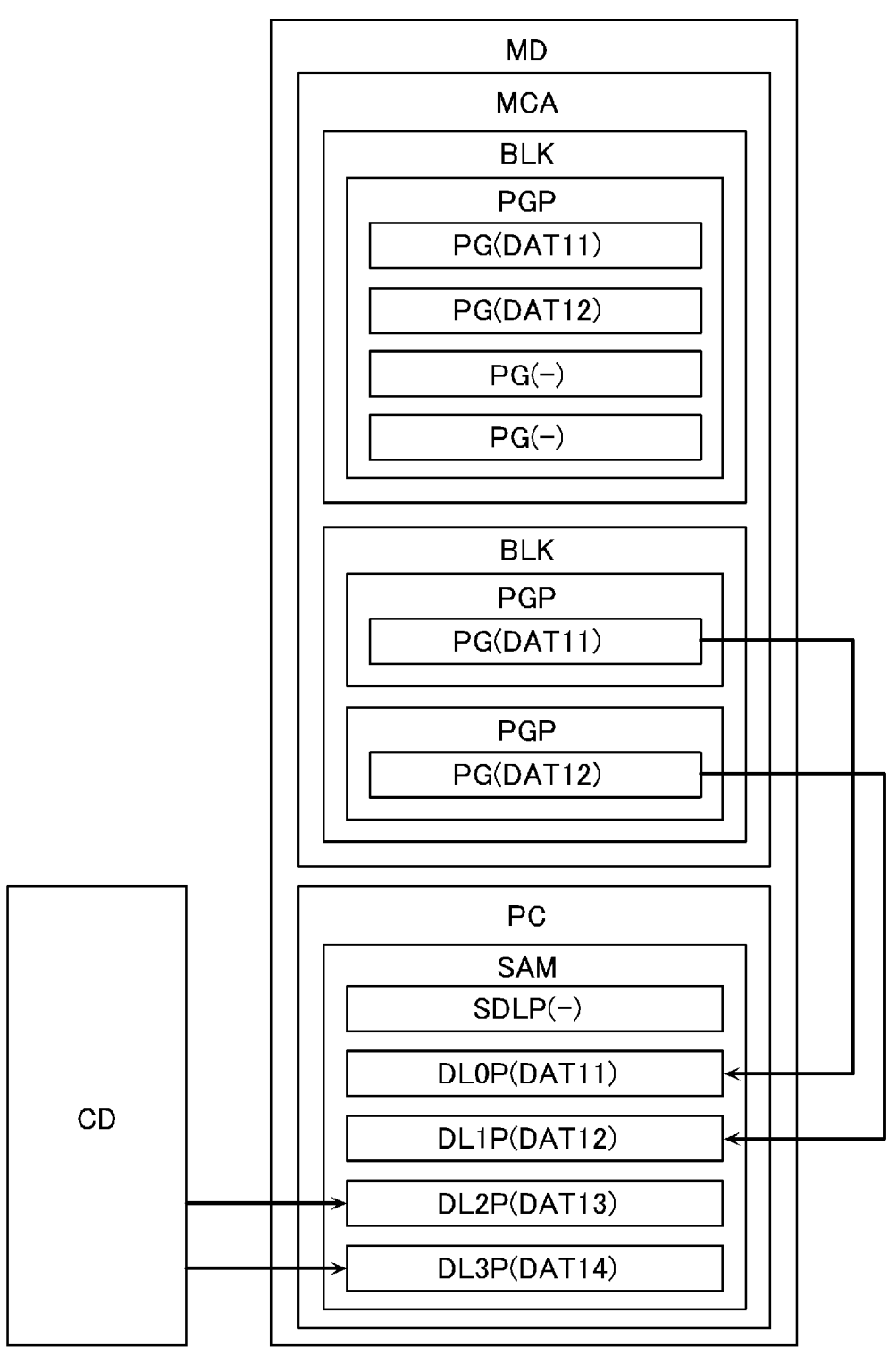
FIG. 40 is a schematic block diagram illustrating data processing executed during a Fine write operation according to the third embodiment.

Next, step S318 in FIG. 38 will be described with reference to FIG. 40. FIG. 40 is a schematic block diagram illustrating data processing executed during the Fine write operation according to the third embodiment.

In step S318 in FIG. 38, for example, as shown in FIG. 40, data DAT11 corresponding to the lower page and data DAT12 corresponding to the middle page are acquired from the two page portions PGP on which the SLC write operation is executed. Hereinafter, the read operation to the page portion PGP on which the SLC write operation is executed is referred to as an "SLC read operation". Further, data DAT13 corresponding to the upper page and data DAT14 corresponding to the top page are input from outside the memory die MD.

In step S318 in FIG. 38, the two command sets described with reference to FIG. 30 are input and the Fine write operation is executed.

Figure 41:
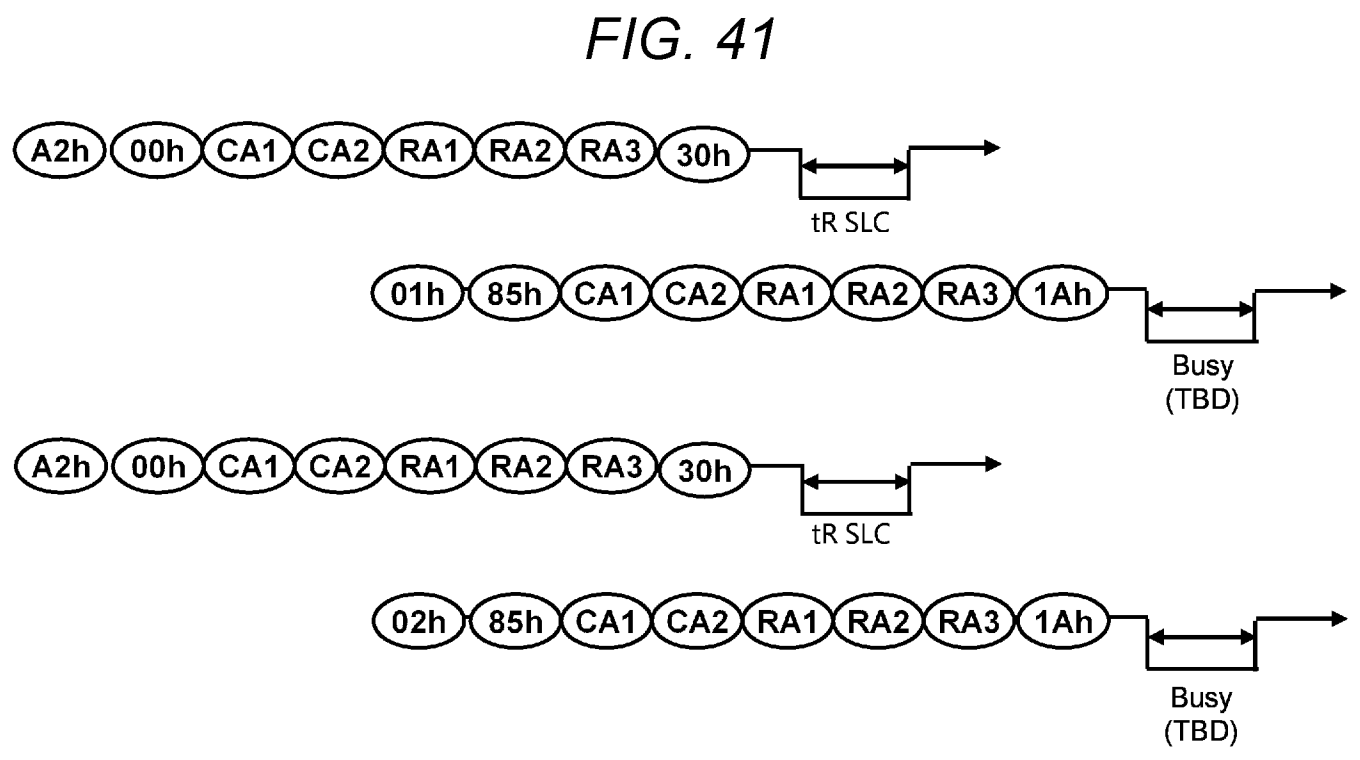

FIG. 41 is a timing chart illustrating the data processing in FIG. 40. In the data processing in FIG. 40, the processing corresponding to FIG. 41 is executed, and then the processing described with reference to FIG. 30 is executed.

FIG. 41 illustrates the four command sets input to the memory die MD during the data processing in FIG. 39. The four command sets correspond to the read operation of data DAT11, a transfer of data DAT11 to the latch portion DL0P, the read operation of data DAT12, and a transfer of data DAT12 to the latch portion DL1P, respectively.

The command set corresponding to the read operation of data DAT11 is basically the same as the command set CS$_R$ described with reference to FIG. 12. However, this command set includes data A2$h$ that is input before data 00$h$ is input. Data A2$h$ is a command designating the SLC write operation or the SLC read operation.

When the command set corresponding to the read operation of data DAT11 is input, the terminal RY//BY changes from the "H" state to the "L" state, and access to the memory die MD is prohibited. The read operation of data DAT11 is executed over a time tRSLC. The time tRSLC is shorter than the time tR described with reference to FIG. 34.

The command set corresponding to the transfer of data DAT11 to the latch portion DL0P includes data 01$h$, 85$h$, CA1, CA2, RA1, RA2, RA3, and data 1A$h$. Data 01$h$ is a command designating the latch portion DL0P. Data 85$h$ is a command input when the transfer of data in the cache memory CM to the latch portion starts. Data 1Ah is a command indicating that the input of the command set related to this data transfer is completed.

When the command set corresponding to the transfer of data DAT11 to the latch portion DL0P is input, the terminal RY//BY changes from the "H" state to the "L" state, and access to the memory die MD is prohibited. The transfer of data DAT11 is executed over the time TBD.

The command set corresponding to the read operation of data DAT12 is basically the same as the command set CS$_R$ described with reference to FIG. 12. However, this command set includes data A2$h$ that is input before data 00$h$ is input.

When the command set corresponding to the read operation of data DAT12 is input, the terminal RY//BY changes from the "H" state to the "L" state, and access to the memory die MD is prohibited. The read operation of data DAT12 is executed over the time tRSLC.

The command set corresponding to the transfer of data DAT12 to the latch portion DL1P is basically the same as the command set corresponding to the transfer of data DAT11 to the latch portion DL0P. However, the command set corresponding to the transfer of data DAT12 to the latch portion DL1P includes data 02$h$ instead of data 01$h$. Data 02$h$ is a command designating the latch portion DL1P.

When the command set corresponding to the transfer of data DAT12 to the latch portion DL1P is input, the terminal RY//BY changes from the "H" state to the "L" state, and access to the memory die MD is prohibited. The transfer of data DAT12 is executed over the time TBD.

As described above, during the MLC write operation according to the third embodiment, data DAT11 corresponding to the lower page and data DAT12 corresponding to the middle page are written to two page portions PGP by the SLC write operation.

Here, the smaller the number of pieces of data stored in the memory cell MC, the larger a voltage margin between the states. For example, as shown in FIG. 9, when the memory cell MC stores 1 bit of data, a voltage margin between the threshold voltage distribution corresponding to the lower state and the threshold voltage distribution corresponding to the upper state is relatively large. In this memory cell MC, even if electrons escape from the charge storage film 132 (see FIG. 5) and the threshold voltage of the memory cell MC decreases, data fluctuation is unlikely to occur.

Since there is a low possibility that data fluctuation occurs in data DAT11 and DAT12 read from the two page portions PGP in step S318 in FIG. 38, bit error detection/correction for the data DAT11 and DAT12 may be omitted in the third embodiment. Further, the data output operation and the input of data DAT11 and DAT12 to the memory die MD, which are necessary for the bit error detection/correction, may be omitted. With this, it is possible to reduce the time required to write data while preventing deterioration in reliability.

FIG. 38 shows an example in which the SLC write operation is executed in step S313, and then the MLC write operation is executed in step S113. However, such a method is merely an example, and step S313 may be executed after executing step S113.

Fourth Embodiment

In the third embodiment, the MLC write operation and the SLC write operation are successively executed. However, for example, when the elapsed time from the execution time of the MLC write operation to the execution time of the Fine write operation is sufficiently short, it can be considered to omit the execution of the SLC write operation. With this, it is possible to reduce the execution time of the SLC write operation that occurs during the execution of the MLC write operation. Further, the number of page portions PGP for executing the SLC write operation can be reduced.

A memory system according to a fourth embodiment will be described below with reference to FIGS. 42 and 43. In the following description, the same elements as in the third embodiment are denoted by the same reference numerals, and the description thereof will be omitted.

The memory system according to the fourth embodiment is basically configured similarly to the memory system according to the third embodiment. However, in the fourth embodiment, instead of the operation described with reference to FIG. 38, the operation described with reference to FIGS. 42 and 43 is executed.

FIG. 42 is a schematic flowchart illustrating the operation of the controller CD when executing the write operation. FIG. 42 illustrates the operation of the controller CD when a request for the write operation occurs.

The operation shown in FIG. 42 is basically executed in the same manner as the operation described with reference to FIG. 35. However, in the operation shown in FIG. 42, step S416 is executed instead of steps S115 and S116 in FIG. 35. Further, in the operation shown in FIG. 42, step S318 described with reference to FIG. 38 is executed instead of step S118 in FIG. 35.

In step S416, it is determined whether the SLC write operation is executed on data corresponding to the lower page and the middle page stored in the page portion PGP on which the Fine write operation is to be executed. If the SLC write operation is not executed, the process proceeds to step S117. If the SLC write operation is executed, the process proceeds to step S318.

Figure 43:
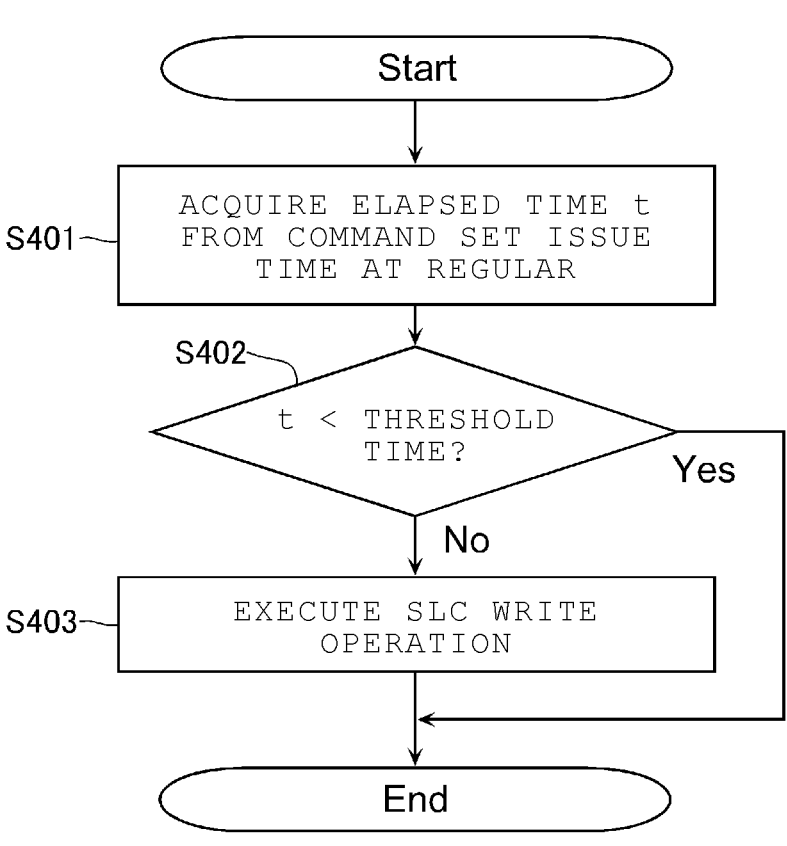
FIG. 43 is a schematic flowchart illustrating the operation of the controller CD according to the fourth embodiment.

FIG. 43 is a schematic flowchart illustrating the operation of the controller CD when executing background processing that is executed at regular intervals when there is no instruction from the host computer 20 (see FIG. 1). In step S401, the elapsed time t from the command set issue time is acquired.

In step S402, it is determined whether the elapsed time t is smaller than the threshold time. If the elapsed time t is smaller than the threshold time, the process ends. If the elapsed time t is not smaller than the threshold time, the process proceeds to step S403.

In step S403, the SLC write operation is executed. Step S403 is executed in the same manner as step S313 in FIG. 38.

Fifth Embodiment

As described above, in the fourth embodiment, it is determined whether to execute the SLC write operation depending on whether the elapsed time t from the execution time of the MLC write operation (command set issue time) is smaller than the threshold time (step S402 in FIG. 43).

However, such a method is merely an example, and a specific method may be adjusted as appropriate. For example, the number of error bits FBC may be monitored for the page portion PGP for which the MLC write operation is executed and the Fine write operation is not executed. Further, it may be determined whether to execute the SLC write operation depending on the number of error bits FBC.

A memory system according to a fifth embodiment will be described below with reference to FIGS. 44 and 45. In the following description, the same elements as in the fourth embodiment are denoted by the same reference numerals, and the description thereof will be omitted.

The memory system according to the fifth embodiment is basically configured similarly to the memory system according to the fourth embodiment. However, in the fifth embodiment, an operation described with reference to FIGS. 44 and 45 is executed instead of the operation described with reference to FIGS. 42 and 43.

FIG. 44 is a schematic flowchart illustrating the operation of the controller CD when executing patrol read.

The operation shown in FIG. 44 is basically executed in the same manner as the operation described with reference to FIG. 36. However, in the operation shown in FIG. 44, after step S203 is executed, step S403 described with reference to FIG. 43 is executed.

Next, with reference to FIG. 45, the operation of the controller CD when executing the write operation will be described. FIG. 45 is a schematic flowchart illustrating the operation of the controller CD when executing the write operation. FIG. 45 illustrates the operation of the controller CD when a request for the write operation occurs.

The operation shown in FIG. 45 is basically executed in the same manner as the operation described with reference to FIG. 37. However, in the operation shown in FIG. 45, step S318 described with reference to FIG. 38 is executed instead of step S118 in FIG. 37.

Sixth Embodiment

Next, a memory system according to a sixth embodiment will be described with reference to FIG. 46. In the following description, the same elements as in the third embodiment are denoted by the same reference numerals, and the description thereof will be omitted.

The memory system according to the sixth embodiment is basically configured similarly to the memory system according to the first embodiment. However, in the sixth embodiment, instead of the operation described with reference to FIG. 35, an operation described with reference to FIG. 46 is executed.

Figure 46:
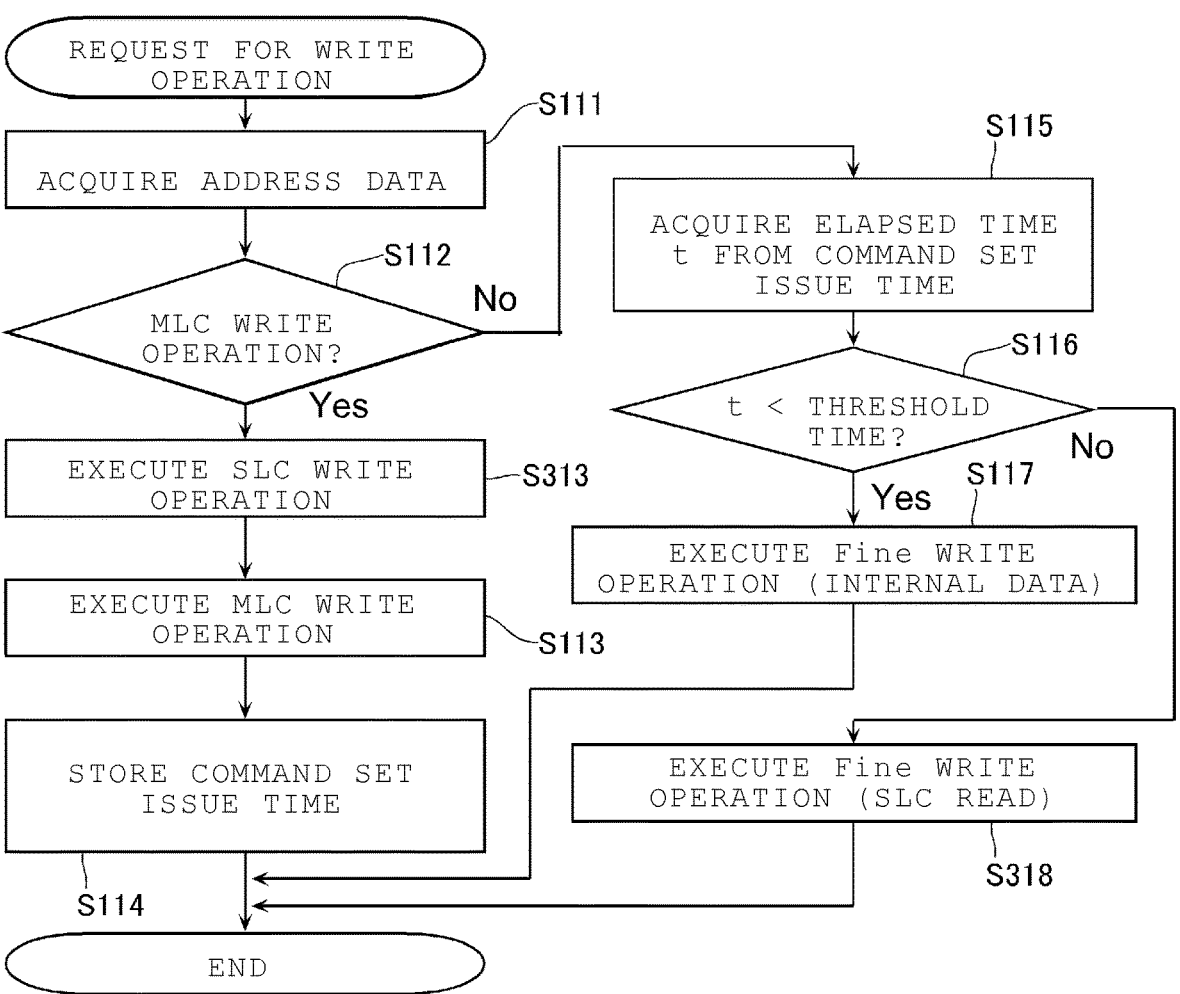
FIG. 46 is a schematic flowchart illustrating an operation of a controller CD according to a sixth embodiment.

FIG. 46 is a schematic flowchart illustrating the operation of the controller CD when executing the write operation. FIG. 46 illustrates the operation of the controller CD when a request for the write operation occurs.

The operation shown in FIG. 46 is basically executed in the same manner as the operation described with reference to FIG. 35. However, in the operation shown in FIG. 46, after step S112 is executed and before step S113 is executed, step S313 described with reference to FIG. 38 is executed. Further, in the operation shown in FIG. 46, step S318 described with reference to FIG. 38 is executed instead of step S118 in FIG. 35.

In the sixth embodiment, step S313 may be executed after executing step S113.

Seventh Embodiment

Next, a memory system according to a seventh embodiment will be described with reference to FIG. 47. In the following description, the same elements as in the second embodiment are denoted by the same reference numerals, and the description thereof will be omitted.

The memory system according to the seventh embodiment is basically configured similarly to the memory system according to the second embodiment. However, in the seventh embodiment, instead of the operation described with reference to FIG. 37, an operation described with reference to FIG. 47 is executed.

Figure 47:
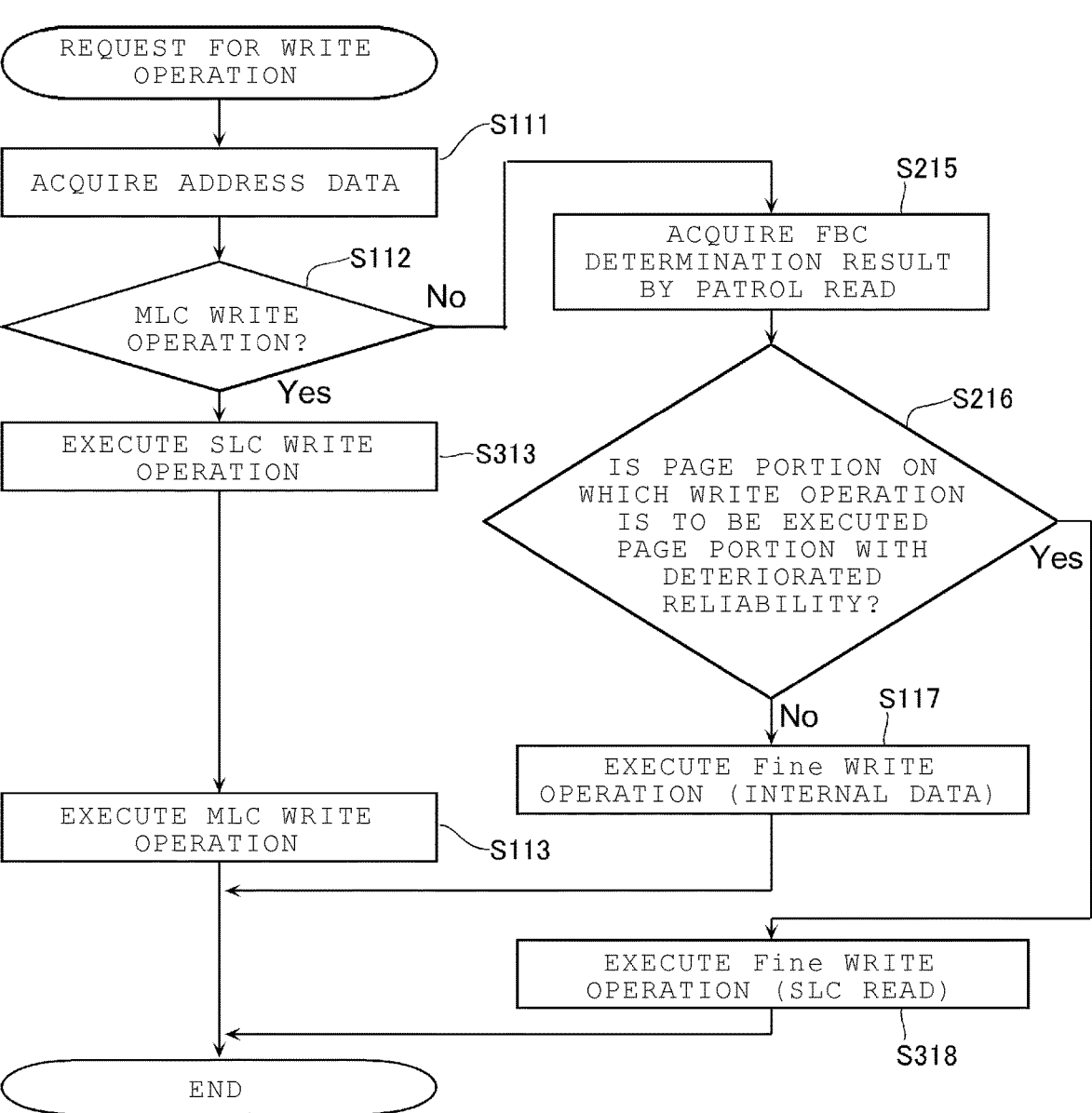
FIG. 47 is a schematic flowchart illustrating an operation of a controller CD according to a seventh embodiment.

FIG. 47 is a schematic flowchart illustrating the operation of the controller CD when executing the write operation. FIG. 47 illustrates the operation of the controller CD when a request for the write operation occurs.

The operation shown in FIG. 47 is basically executed in the same manner as the operation described with reference to FIG. 37. However, in the operation shown in FIG. 47, after step S112 is executed and before step S113 is executed, step S313 described with reference to FIG. 38 is executed. Further, in the operation shown in FIG. 47, step S318 described with reference to FIG. 38 is executed instead of step S118 in FIG. 37.

In the seventh embodiment, step S313 may be executed after executing step S113.

Other Embodiments

The memory systems according to the first to seventh embodiments are described above. However, these configurations and operations are merely examples, and the specific configurations and operations may be adjusted as appropriate.

For example, in the first to seventh embodiments, the example is described in which the MLC write operation for storing 2 bits of data in the memory cell MC and the Fine write operation for further storing 2 bits of data in the memory cell MC in which 2 bits of data is stored are combined to store 4 bits of data in the memory cell MC in two stages.

However, in the first and second embodiments, the data stored in the memory cell MC by the first stage write operation may be 1 bit, or may be 3 bits or more. In the third to seventh embodiments, the data stored in the memory cell MC by the first stage write operation may be 3 bits or more. In the first to seventh embodiments, the data stored in the memory cell MC by the second stage write operation may be 1 bit, or may be 3 bits or more.

Further, the data stored in the memory cell MC after the end of the second stage write operation may be 3 bits, or may be 5 bits or more.

For example, the data stored in the memory cell MC after the end of the second stage write operation is set to a (a is an integer greater than or equal to 3) bits, the data stored in the memory cell MC by the first stage write operation is set to b (b is a positive integer less than a) bits, and the data stored in the memory cell MC by the second stage write operation is set to c (c is a positive integer equal to (a-b)) bits.

In this case, by the first stage write operation, each of the plurality of memory cells MC in the page portion PGP is set to any one of $2^b$ states. That is, the threshold voltages of the plurality of memory cells MC in the page portion PGP are controlled so as to belong to any one of $2^b$ threshold voltage distributions (threshold voltage regions). Among these $2^b$ threshold voltage distributions, the threshold voltage distribution corresponding to a lowest voltage level corresponds to the erased state.

By the second stage write operation, each of the plurality of memory cells MC controlled into the $2^b$ states is further set to any one of $2^b$ states. With this, each of the plurality of memory cells MC in the page portion PGP is set to any one of $2^a$ states. That is, each of the threshold voltages of the plurality of memory cells MC corresponding to the $2^b$ threshold voltage distributions is further controlled so as to belong to any one of $2^c$ threshold voltage distributions (threshold voltage regions). With this, each of the threshold voltages of the plurality of memory cells MC in the page portion PGP is controlled so as to belong to any one of $2^a$ threshold voltage distributions. Among these $2^a$ threshold voltage distributions, the threshold voltage distribution corresponding to the lowest voltage level corresponds to the erased state.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
   a nonvolatile memory including a memory cell transistor; and
   a controller configured to write multi-bit data into the memory cell transistor through a first write operation of writing a first part of the multi-bit data and not a second part of the multi-bit data to the memory cell transistor, and then a second write operation of writing the first and second parts of the multi-bit data to the memory cell transistor after the first write operation, wherein
   the controller is configured to, during writing of the multi-bit data,
       determine an amount of time that has passed since the first write operation to the memory cell transistor;
       determine whether or not the determined amount of time is less than a threshold amount or greater than the threshold amount, comparing the determined amount of time with the threshold amount;
       perform the second write operation to the memory cell transistor in a first manner when it is determined that the determined amount of time is less than the threshold amount; and
       perform the second write operation to the memory cell transistor in a second manner when it is determined that the determined amount of time is greater than the threshold amount,
   in the second write operation in the first manner, the controller inputs the second part of the multi-bit data, and not the first part, into the nonvolatile memory, and causes the nonvolatile memory to read the first part of the multi-bit data from the memory cell transistor and write the read first part of the multi-bit data and the input second part of the multi-bit data into the memory cell transistor, and
   in the second write operation in the second manner, the controller inputs the first and second parts of the multi-bit data into the nonvolatile memory, and causes the nonvolatile memory to write the input first and second parts of the multi-bit data into the memory cell transistor.

2. The memory system according to claim 1, further comprising:
   a volatile memory,
   the controller is configured to store the multi-bit data in the volatile memory when performing the writing of the multi-bit data, and when the controller performs the second write operation in the second manner, the controller reads the first part of the multi-bit data from the volatile memory and inputs the first part of the multi-bit data read from the volatile memory into the nonvolatile memory.

3. The memory system according to claim 1, wherein when the controller performs the second write operation in the second manner, the controller receives the first part of the multi-bit data read from the memory cell transistor and inputs bit data obtained from the received first part of the multi-bit data into the nonvolatile memory.

4. The memory system according to claim 3, wherein the controller is further configured to perform data detection and correction with respect to the received first part of the multi-bit data to obtain the bit data.

5. The memory system according to claim 1, wherein the first part of the multi-bit data is two or more bits and the second part of the multi-bit data is two or more bits.

6. A memory system comprising:
a nonvolatile memory including a memory cell transistor; and
a controller configured to write multi-bit data into the memory cell transistor through a first write operation of writing a first part of the multi-bit data and not a second part of the multi-bit data to the memory cell transistor, and then a second write operation of writing the first and second parts of the multi-bit data to the memory cell transistor after the first write operation, wherein
the controller is configured to, during writing of the multi-bit data,
determine a number of error bits included in the first part of the multi bit data written through the first write operation into the memory cell transistor and read therefrom;
determine whether the determined number of error bits is greater than a threshold number or less than the threshold number, comparing the determined number of error bits with the threshold number;
perform the second write operation to the memory cell transistor in a first manner, when it is determined that the determined number of error bits is less than the threshold number; and
perform the second write operation to the memory cell transistor in a second manner, when it is determined that the determined number of error bits is greater than the threshold number,
in the second write operation in the first manner, the controller inputs the second part of the multi-bit data, and not the first part, into the nonvolatile memory, and causes the nonvolatile memory to read the first part of the multi-bit data from the memory cell transistor and write the read first part of the multi-bit data and the input second part of the multi-bit data into the memory cell transistor, and
in the second write operation in the second manner, the controller inputs the first and second parts of the multi-bit data into the nonvolatile memory, and causes the nonvolatile memory to write the input first and second parts of the multi-bit data into the memory cell transistor.

7. The memory system according to claim 6, further comprising:
a volatile memory,
the controller is configured to store the multi-bit data in the volatile memory when performing the writing of the multi-bit data, and when the controller performs the second write operation in the second manner, the controller reads the first part of the multi-bit data from the volatile memory and inputs the first part of the multi-bit data read from the volatile memory into the nonvolatile memory.

8. The memory system according to claim 7, wherein when the controller performs the second write operation in the second manner, the controller receives the first part of the multi-bit data read from the memory cell transistor and inputs bit data obtained from the received first part of the multi-bit data into the nonvolatile memory.

9. The memory system according to claim 8, wherein the controller is further configured to perform data detection and correction with respect to the received first part of the multi-bit data to obtain the bit data.

10. The memory system according to claim 6, wherein the controller is further configured to control the nonvolatile memory to transmit the first part of the multi-bit data in the memory cell transistor to the controller when the second write operation has not been performed during a predetermined period of time from the first write operation.

11. The memory system according to claim 10, wherein the controller is further configured to perform data detection and correction with respect to the first part of the multi-bit data transmitted from the nonvolatile memory.

12. The memory system according to claim 6, wherein the first part of the multi-bit data is two or more bits and the second part of the multi-bit data is two or more bits.

13. A memory system comprising:
a nonvolatile memory including a first memory cell transistor, a second memory cell transistor, and a third memory cell transistor; and
a controller configured to:
write multi-bit data into the first memory cell transistor through a first write operation of writing a first part of the multi-bit data and not a second part of the multi-bit data to the first memory cell transistor, and then a second write operation of writing the first and second parts of the multi-bit data to the first memory cell transistor after the first write operation; and
perform a third write operation of writing first one or more bits of the first part into the second memory cell transistor and second one or more bits of the first part into the third memory cell transistor,
wherein the controller is configured to, during the writing of the multi-bit data into the first memory cell transistor, perform the second write operation in a first manner, in which the controller:
causes the nonvolatile memory to read the first one or more bits and the second one or more bits of the first part from the second and third memory cell transistors, respectively,
inputs the second part of the multi-bit data from the controller into the nonvolatile memory; and
causes the nonvolatile memory to write the first part of the multi-bit data including the first one or more bits and the second one or more bits read from the second and third memory transistors and the input second part of the multi-bit data into the first memory cell transistor.

14. The memory system according to claim 13, wherein the controller performs the third write operation during the writing of the multi-bit data before the first write operation.

15. The memory system according to claim 13, wherein the controller is configured to:
determine an amount of time that has passed since the first write operation; and perform the third write operation when the determined amount of time is greater than a threshold amount.

16. The memory system according to claim 15, wherein the controller is configured to, during writing of the multi-bit data into the first memory cell transistor:

perform the second write operation in the first manner, when the determined amount of time is greater than the threshold amount; and perform the second write operation in a second manner, when the determined amount of time is less than the threshold amount, wherein in the second write operation in the second manner, the controller:

causes the nonvolatile memory to read the first part of the multi-bit data from the first memory cell transistor;

inputs the second part of the multi-bit data from the controller into the nonvolatile memory; and causes the nonvolatile memory to write the first part of the multi-bit data read from the first memory cell transistor and the input second part of the multi-bit data into the first memory cell transistor.

17. The memory system according to claim 13, wherein the controller is configured to:

determine a number of error bits included in the first part of the multi bit data written into the first memory cell transistor through the first write operation and read therefrom; and perform the third write operation when the number of error bits is greater than a threshold number.

18. The memory system according to claim 15, wherein the controller is configured to, during writing of the multi-bit data into the first memory cell transistor:

perform the second write operation in the first manner, when the number of error bits is greater than the threshold number; and perform the second write operation in a second manner, when the number of error bits is less than the threshold number, wherein in the second write operation in the second manner, the controller:

causes the nonvolatile memory to read the first part of the multi-bit data from the first memory cell transistor;

inputs the second part of the multi-bit data from the controller into the nonvolatile memory; and causes the nonvolatile memory to write the first part of the multi-bit data read from the first memory cell transistor and the input second part of the multi-bit data into the first memory cell transistor.

19. The memory system according to claim 13, wherein the controller is further configured to control the nonvolatile memory to transmit the first part of the multi-bit data in the first memory cell transistor to the controller when the second write operation has not been performed during a predetermined period of time from the first write operation.

20. The memory system according to claim 19, wherein the controller is further configured to perform data detection and correction with respect to the first part of the multi-bit data transmitted from the nonvolatile memory.

* * * * *